(12) United States Patent
Mirica et al.

(10) Patent No.: US 11,486,850 B2
(45) Date of Patent: Nov. 1, 2022

(54) METAL-ORGANIC FRAMEWORKS AS ION-TO-ELECTRON TRANSDUCERS AND DETECTORS

(71) Applicant: Trustees of Dartmouth College, Hanover, NH (US)

(72) Inventors: Katherine A. Mirica, Hanover, NH (US); Lukasz K. Mendecki, White River Junction, VT (US)

(73) Assignee: Trustees of Dartmouth College, Hanover, NH (US)

( * ) Notice: Subject to any disclaimer, the term of this patent is extended or adjusted under 35 U.S.C. 154(b) by 451 days.

(21) Appl. No.: 16/636,081

(22) PCT Filed: Aug. 13, 2018

(86) PCT No.: PCT/US2018/046510
§ 371 (c)(1),
(2) Date: Feb. 3, 2020

(87) PCT Pub. No.: WO2019/033104
PCT Pub. Date: Feb. 14, 2019

(65) Prior Publication Data
US 2021/0164930 A1  Jun. 3, 2021

Related U.S. Application Data

(60) Provisional application No. 62/544,355, filed on Aug. 11, 2017.

(51) Int. Cl.
*G01N 27/333* (2006.01)
*G01N 27/30* (2006.01)

(52) U.S. Cl.
CPC ....... *G01N 27/3335* (2013.01); *G01N 27/308* (2013.01)

(58) Field of Classification Search
None
See application file for complete search history.

(56) References Cited

U.S. PATENT DOCUMENTS

| 9,546,887 B1 | 1/2017 | Talin et al. |
| 2010/0176006 A1 | 7/2010 | Bickford et al. |
| (Continued) | | |

FOREIGN PATENT DOCUMENTS

| WO | WO-19032804 A1 | 2/2019 |
| WO | WO-19033104 A1 | 2/2019 |
| WO | WO-19236799 A1 | 12/2019 |

OTHER PUBLICATIONS

International Search Report and Written Opinion for PCT/US18/46510, dated Oct. 24, 2018.
(Continued)

*Primary Examiner* — J. Christopher Ball
(74) *Attorney, Agent, or Firm* — Shackelford, Bowen, McKinley & Norton LLP

(57) ABSTRACT

Embodiments of the present disclosure pertain to ion-selective electrodes that include a metal-organic framework and an electrode surface. The metal-organic framework is associated with the electrode surface in a manner that forms an interface between the metal-organic framework and the electrode surface. Additional embodiments pertain to methods of detecting an ion in a sample by associating the sample with the ion-selective electrodes of the present disclosure. The metal-organic frameworks of the ion-selective electrodes mediate ion-to-electron transduction through the interface between the metal-organic and the electrode surface. Thereafter, the presence or absence of the ion in the sample is detected by detecting a change in potential of the ion-selective electrode and correlating the change in the potential to the presence or absence of the ion. The metal organic frameworks may simultaneously mediate ion sens- (Continued)

ing and ion-to-electron transduction through the interface between the metal-organic frameworks and the electrode surface.

20 Claims, 25 Drawing Sheets

(56) References Cited

U.S. PATENT DOCUMENTS

2015/0338367 A1  11/2015  Hu et al.
2016/0231233 A1  8/2016  Wang et al.
2018/0306740 A1  10/2018  Mirica et al.

OTHER PUBLICATIONS

International Preliminary Report on Patentability for PCT/US18/46510, dated Feb. 2, 2020.
Li et al.; Graphene-Based Nanohybrids for Advanced Electrochemical Sensing; Electroanalysis, vol. 27, Issue 9, 2015, p. 2098-2115.
Iswarya et al. Metal Organic Framework (MOF-5) for sensing of volatile organic compounds. *J. App. Sci.*, 2012(12); 1681-1685.
Stassen et al. Towards metal-organic framework based field effect chemical sensors: UiO-66-NH2 for nerve agent detection. *Chem. Sci.*, 2016(7); 5827-5832.
Jana, and Nataraja. Fluorescent Metal-Organic Frameworks for selective sensing of toxic cations (Tl3+, Hg2+) and highly oxidizing anions ((CrO4)2−, (Cr2O7)2−, (MnO4)−). *ChemPlusChem*, 2017(82); 1153.
Wang et al. A metal-organic framework and conducting polymer based electrochemical sensor for high performance cadmium ion detection. *J. Mater. Chem. A*, 2017(5); 8385-8393.
Campbell, M. G.; Liu, S. F.; Swager, T. M.; Dincă, M. Chemiresistive Sensor Arrays from Conductive 2D Metal-Organic Frameworks. *J. Am. Chem. Soc.* 2015, 137, 13780-13783.
Sheberla, D.; Bachman, J. C.; Elias, J. S.; Sun, C.-J.; Shao-Horn, Y.; Dincă, M. Conductive MOF Electrodes for Stable Supercapacitors with High Areal Capacitance. *Nat. Mater.* 2016, 16, 220-224.
Li, H.; Eddaoudi, M.; O'Keeffe, M.; Yaghi, O. M. Design and Synthesis of an Exceptionally Stable and Highly Porous Metal-Organic Framework. *Nature* 1999, 402, 276-279.
Farha, O. K.; Özgür Yazaydm, A.; Eryazici, I.; Malliakas, C. D.; Hauser, B. G.; Kanatzidis, M. G.; Nguyen, S. T.; Snurr, R. Q.; Hupp, J. T. De Novo Synthesis of a Metal-organic Framework Material Featuring Ultrahigh Surface Area and Gas Storage Capacities. *Nat. Chem.* 2010, 2, 944-948.
Dey, C.; Kundu, T.; Biswal, B. P.; Mallick, A.; Banerjee, R. Crystalline Metal-Organic Frameworks (MOFs): Synthesis, Structure and Function. *Acta Crystallogr. Sect. B Struct. Sci. Cryst. Eng. Mater.* 2014, 70, 3-10.
Vázquez, M.; Bobacka, J.; Ivaska, A.; Lewenstam, A. Influence of Oxygen and Carbon Dioxide on the Electrochemical Stability of poly(3,4-Ethylenedioxythiophene) Used as Ion-to-Electron Transducer in All-Solid-State Ion-Selective Electrodes. *Sens. Actuators B Chem.* 2002, 82, 7-13.
Lai, C.-Z.; Fierke, M. A.; Stein, A.; Buhlmann, P. Ion-Selective Electrodes with Three-Dimensionally Ordered Macroporous Carbon as the Solid Contact. *Anal. Chem.* 2007, 79, 4621-4626.
Sun, L.; Campbell, M. G.; Dincă, M. Electrically Conductive Porous Metal-Organic Frameworks. *Angew. Chem. Int. Ed.* 2016, 55, 3566-3579.
Clough, A. J.; Skelton, J. M.; Downes, C. A.; de la Rosa, A. A.; Yoo, J. W.; Walsh, A.; Melot, B. C.; Marinescu, S. C. Metallic Conductivity in a Two-Dimensional Cobalt Dithiolene Metal-Organic Framework. *J. Am. Chem. Soc.* 2017, 139, 10863-10867.
Dou, J.-H.; Sun, L; Ge, Y.; Li, W.; Hendon, C. H.; Li, J.; Gul, S.; Yano, J.; Stach, E. A.; Dincă, M. Signature of Metallic Behavior in the Metal-Organic Frameworks M3 (Hexaiminobenzene)2 (M = Ni, Cu). *J. Am. Chem. Soc.* 2017, 139, 13608-13611.
Huang, X.; Sheng, P.; Tu, Z.; Zhang, F.; Wang, J.; Geng, H.; Zou, Y.; Di, C.; Yi, Y.; Sun, Y. A.; Zhu, D. Two-Dimensional π-d Conjugated Coordination Polymer with Extremely High Electrical Conductivity and Ambipolar Transport Behavior. *Nat. Commun.* 2015, 6, 7408.
Campbell, M. G.; Sheberla, D.; Liu, S. F.; Swager, T. M.; Dincă, M. Cu3 (Hexaiminotriphenylene)2: An Electrically Conductive 2D Metal-Organic Framework for Chemiresistive Sensing. *Angew. Chem. Int. Ed.* 2015, 54, 4349-4352.
Smith, M. K.; Mirica, K. A. Self-Organized Frameworks on Textiles (SOFT): Conductive Fabrics for Simultaneous Sensing, Capture, and Filtration of Gases. *J. Am. Chem. Soc.* 2017, 139, 16759-16767.
Smith, M. K.; Jensen, K. E.; Pivak, P. A.; Mirica, K. A. Direct Self-Assembly of Conductive Nanorods of Metal-Organic Frameworks into Chemiresistive Devices on Shrinkable Polymer Films. *Chem. Mater.* 2016, 28, 5264-5268.
Ko, M.; Aykanat, A.; Smith, M. K.; Mirica, K. A. Drawing Sensors with Ball-Milled Blends of Metal-Organic Frameworks and Graphite. *Sensors* 2017, 17, 2192.
Yao, M.-S.; Lv, X.-J.; Fu, Z.-H.; Li, W.-H.; Deng, W.-H.; Wu, G.-D.; Xu, G. Layer-by-Layer Assembled Conductive Metal-Organic Framework Nanofilms for Room-Temperature Chemiresistive Sensing. *Angew. Chem.* 2017, 56, 16510-16514.
Li, W.-H.; Ding, K.; Tian, H.-R.; Yao, M.-S.; Nath, B.; Deng, W.-H.; Wang, Y.; Xu, G. Conductive Metal-Organic Framework Nanowire Array Electrodes for High-Performance Solid-State Supercapacitors. *Adv. Funct. Mater.* 2017, 27, 1702067.
Feng, D.; Lei, T.; Lukatskaya, M. R.; Park, J.; Huang, Z.; Lee, M.; Shaw, L.; Chen, S.; Yakovenko, A. A.; Kulkarni, A.; Xiao, J.; Fredrickson, K.; Tok, J. B.; Zou, X.; Cui, Y.; Bao, Z. Robust and Conductive Two-Dimensional Metal-organic Frameworks with Exceptionally High Volumetric and Areal Capacitance. *Nat. Energy* 2018, 3, 30-36.
Sheberla, D.; Sun, L.; Blood-Forsythe, M. A.; Er, S.; Wade, C. R.; Brozek, C. K.; Aspuru-Guzik, A.; Dincă, M. High Electrical Conductivity in Ni3(2,3,6,7,10,11-Hexaiminotriphenylene)2, a Semiconducting Metal-Organic Graphene Analogue. *J. Am. Chem. Soc.* 2014, 136, 8859-8862.
Campbell, M.; Dincă, M. Metal-Organic Frameworks as Active Materials in Electronic Sensor Devices. *Sensors* 2017, 17, 1108.
Hendon, C. H.; Rieth, A. J.; Korzyński, M. D.; Dinca, M. Grand Challenges and Future Opportunities for Metal-Organic Frameworks. *ACS Cent. Sci.* 2017, 3, 554-563.
Fierke, M. A.; Lai, C.-Z.; Buhlmann, P.; Stein, A. Effects of Architecture and Surface Chemistry of Three-Dimensionally Ordered Macroporous Carbon Solid Contacts on Performance of Ion-Selective Electrodes. *Anal. Chem.* 2010, 82, 680-688.
Tamura, H.; Kumami, K.; Kimura, K.; Shono, T. Simultaneous Determination of Sodium and Potassium in Human Urine or Serum Using Coated-Wire Ion-Selective Electrodes Based on Bis(crown Ether)s. *Mikrochim. Acta* 1983, 80, 287-296.
Taner, B.; Deveci, P.; Üstündağ, Z.; Keskin, S.; Özcan, E.; Osman Solak, A. Modification of Glassy Carbon Electrode by the Electrochemical Oxidation of 3-aminophenylcalix[4]pyrrole in Nonaqueous Media. *Surf. Interface Anal.* 2012, 44, 185-191.

METAL-ORGANIC FRAMEWORKS AS ION-TO-ELECTRON TRANSDUCERS AND DETECTORS

CROSS-REFERENCE TO RELATED APPLICATIONS

This application claims priority to U.S. Provisional Patent Application No. 62/544,355, filed on Aug. 11, 2017. The entirety of the aforementioned application is incorporated herein by reference.

STATEMENT REGARDING FEDERALLY SPONSORED RESEARCH

This invention was made with government support under W911NF-17-1-0398 awarded by the Department of Defense. The government has certain rights in the invention.

BACKGROUND

Current methods and potentiometric sensors for detecting ions suffer from numerous limitations, such as limited charge transport, limited mechanical stability, sensitivity to environmental factors, limited conductivity, limited detection speed, inefficient fabrication processes, and limited operational lifetimes. Various embodiments of the present disclosure address the aforementioned limitations.

SUMMARY

In some embodiments, the present disclosure pertains to ion-selective electrodes that include a metal-organic framework and an electrode surface. The metal-organic framework is associated with the electrode surface in a manner that forms an interface between the metal-organic framework and the electrode surface. In addition, the metal-organic framework is capable of mediating ion-to-electron transduction through the interface.

In some embodiments, the ion-selective electrodes of the present disclosure also include a potentiostat, a wiring that electrically connects the electrode surface to the potentiostat, and an output display that is electrically connected to the potentiostat. In some embodiments, the ion-selective electrodes of the present disclosure also include an ion-selective membrane for capturing an ion.

In some embodiments, the present disclosure pertains to methods of detecting an ion in a sample by associating the sample with the ion-selective electrodes of the present disclosure. After association, the metal-organic frameworks of the ion-selective electrodes mediate ion-to-electron transduction through the interface between the metal-organic frameworks and the electrode surface. Thereafter, the presence or absence of the ion in the sample is detected by detecting a change in potential of the ion-selective electrode and correlating the change in the potential to the presence or absence of the ion.

In some embodiments, the metal-organic frameworks of the ion-selective electrodes of the present disclosure also serve as a membrane (e.g., a layer or a chelator) for capturing ions. In some embodiments, the metal organic frameworks simultaneously mediate ion sensing and ion-to-electron transduction through the interface between the metal-organic frameworks and the electrode surface.

In some embodiments, the metal-organic frameworks simultaneously serve as an ion recognition sensor, an ion-to-electron transducer, and an electrode. In some embodiments, the metal-organic frameworks serve as an electrode component, such as the electrode surface.

In some embodiments, the methods of the present disclosure can also be utilized to detect the concentration of the ion. In some embodiments, the ion to be detected includes, without limitation, anions, cations and combinations thereof. In some embodiments, the ion to be detected includes, without limitation, $Ca^{2+}$, $Co^{2+}$, $Mg^{2+}$, $Zn^{2+}$, $Pb^{2+}$, $Ni^{2+}$, $Cu^{2+}$, $Na^+$, $K^+$, $NH_4^+$, and combinations thereof. In some embodiments, the ion to be detected includes, without limitation, $CH_3COO^-$, $NO_3^-$, $ClO_4^-$, $Cl^-$, $I^-$, $F^-$, $Br^-$, $SO_4^{2-}$, $S_2O_8^{2-}$, $Cr_2O_7^{2-}$, and combinations thereof.

Additional embodiments of the present disclosure pertain to methods of making the ion-selective electrodes of the present disclosure by associating a metal-organic framework with an electrode surface to result in the formation of an interface between the metal-organic framework and the electrode surface. In some embodiments, the methods of the present disclosure also include a step of associating an ion-selective membrane with a surface of metal-organic frameworks.

DESCRIPTION OF THE DRAWINGS

FIG. 8 shows various spectra for different ion-selective electrodes.

FIG. 24 shows the results of water layer tests.

DETAILED DESCRIPTION

Figure 1A:
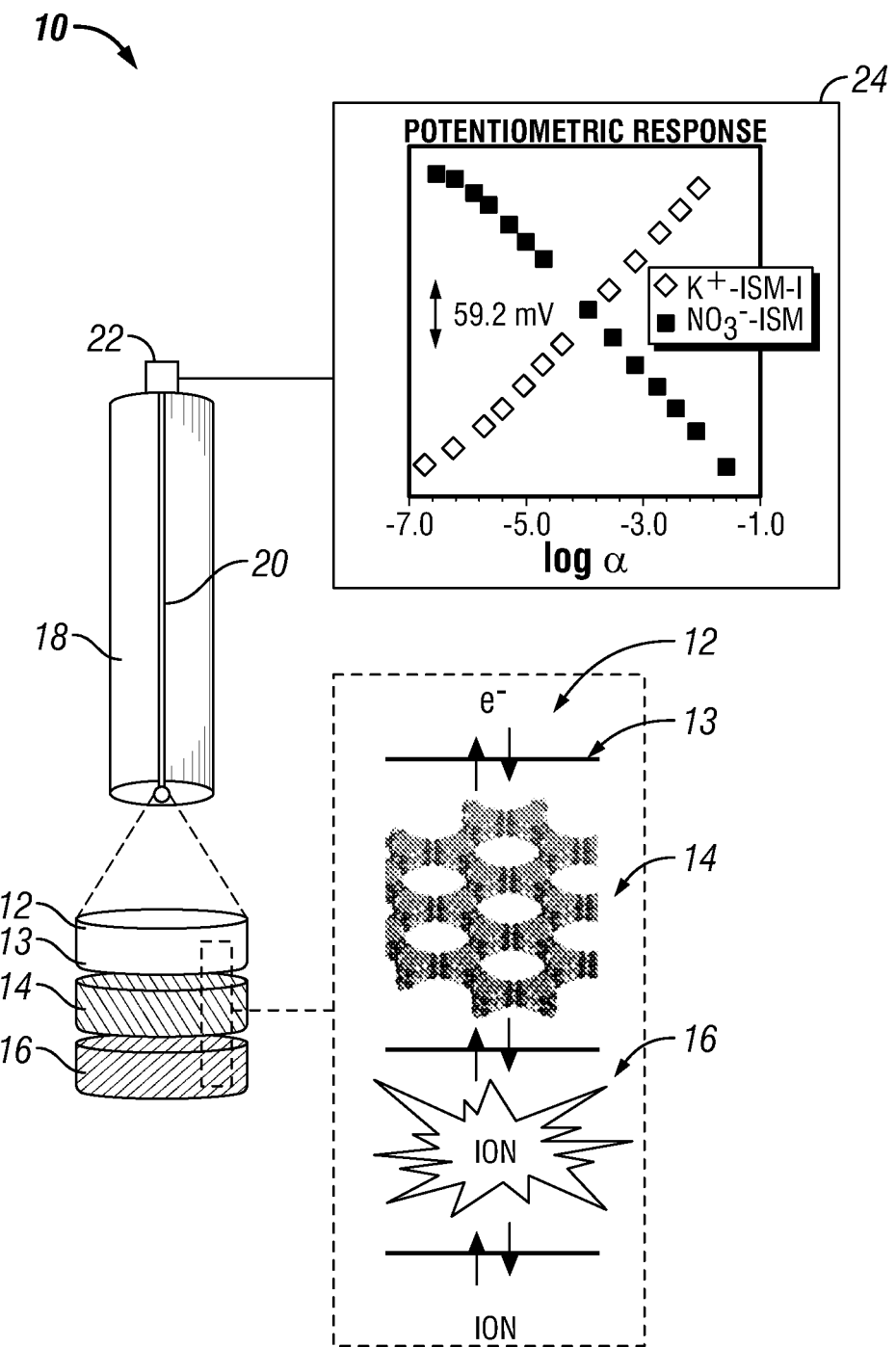
FIG. 1A depicts an ion-selective electrode.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components that includes one unit and elements or components that include more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Potentiometric sensors are an important class of analytical devices with broad utility in clinical and environmental analysis. Driven by the progress at the interfaces of analytical, supramolecular, and materials chemistry, modern potentiometric devices have evolved from mechanically fragile liquid-filled ion-selective electrodes into solid-contact electrodes (SCEs) with optimal sensitivity, exceptional selectivity, and fast response time. This new generation of SCEs, based on a layered device architecture that includes an electrical contact coated with an ion-to-electron transducer, and further protected by an ion-selective membrane (ISM), seeks to achieve outstanding analytical performance with stable and robust device design capable of long-term analysis without deterioration in performance.

While recent advancements in the development of ISMs and ion-to-electron transducing materials have led to significant progress in potentiometric detection, overcoming the existing chemical limitations of available materials capable of forming well-defined interfaces between the electrode and the ISM may enhance broad implementation of SCEs in chemical sensing.

Achieving stable and reliable measurements using SCEs can depend on several conditions, such as: i) reversible ion-to-electron signal transduction; ii) non-polarizable interface with high exchange current density; iii) absence of any side reactions; and (iv) the absence of a thin water layer at the ISM/electrode interface. Efforts to fulfil the aforementioned criteria through the implementation of conductive polymers and porous carbon-based materials as ion-to-electron transducers have facilitated major advancements in potentiometry, thereby giving rise to stable and robust potentiometric devices to date.

Nonetheless, the existing classes of materials exhibit trade-offs and limitations in the context of SCEs. While conductive polymers—such as poly(octylthiophene) (POT), poly(3,4-ethylenedioxythiophene) (PEDOT) and polypyrrole (PPy)—can provide hydrophobicity (e.g., contact angle of water of 50° and 100° measured on glassy carbon electrode surfaces modified with either PEDOT-polystyrene sulfonate (PSS) or Ppy-perfluorooctanesulfonate, respectively) and high redox capacitance (e.g., 10 µF-200 µF), their performance can also be diminished by: i) variations in the crystallinity that can alter charge transport; ii) dopant-dependent changes in glass transition temperature that may affect mechanical stability of the transducer layer; iii) sensitivity to $O_2$, $CO_2$, pH and light that can lead to drift; iv) dependence of conductivity upon conformational changes; and v) slowness of redox influenced conformational changes.

Nanostructured carbon-based materials, such as carbon nanotubes (CNTs), graphene, fullerenes, and three-dimensional ordered mesoporous carbons (3DOM) have been recently shown to perform the function of ion-to-electron signal transduction via the formation of the electrical double layer at the membrane/electrode interface. The inherent hydrophobicity of these materials, combined with optimal electrical conductivity and high capacitance (e.g., 625 µF for 3DOM and 302 µF for single-walled CNTs), reinforce the advantageous use of nanostructured materials as components for the development of SCEs.

However, several limitations to the use of carbon materials in sensing devices can also limit their implementation, including: i) limited control over the structure and electronic properties of the nanostructured carbon materials that may influence the electrical conductivity of the material (e.g., CNTs); ii) requirement for expensive and sophisticated instrumentation for fabrication; iii) harsh synthetic conditions during the manufacturing process, such as high pressure and temperature; and iv) limited control over the amount and type of impurities introduced during the fabrication process. Despite recent improvements in fabrication methods of SCEs based on carbon materials and conductive polymers, fundamental research focused on integrating novel conductive materials that exhibit the required characteristics of ion-to-electron transduction, high capacitance, and substantial hydrophobicity can promote future advancements in potentiometry.

Moreover, while the signal stability of ISEs can be improved with the application of conductive layers, the overall performance of ISEs is nonetheless dictated by the ion-selective membrane. This approach allows a full utilization of existing ion recognition centers and membrane formulations to produce potentiometric sensors with optimal sensitivity and selectivity towards targeted analytes. However, the operational lifetime of these electrodes is highly dependent on the solubility of the components in the polymeric matrix and is further limited by their leaching out of the membrane.

Over several years, large advancements in analytical and organic chemistry offered a vast number of approaches to minimize the extent to which the active components diffuse out of the sensing layer, and consequently, to improve the performance of potentiometric sensors. The most logical and intuitive approach involved chemical modifications of sensing components such as the addition of long alkyl chains to improve the hydrophobicity of studied molecules or their direct attachment to the polymer backbone to minimize or prevent leaching. However, imposed changes in the solubility of the derivatized molecules often resulted in the phase separation within the polymeric matrix, while the distribution of covalently attached components within the polymer could not be controlled using conventional polymerization methods (e.g. free-radical polymerization).

Furthermore, the above-described structural modifications are cumbersome and often involve multistep synthesis. Therefore, structural modifications can in turn increase ISE fabrication costs and complexity.

A such, in view of the aforementioned limitations, a need exists for the development of ion-selective electrodes with a one-component hybrid material that simultaneously acts as an ion recognition center and a signal transducer. A need also exists for more facile processes for fabricating the aforementioned ion-selective electrodes. Various embodiments of the present disclosure address the aforementioned needs.

In some embodiments, the present disclosure pertains to ion-selective electrodes that include a metal-organic framework and an electrode surface. The metal-organic framework includes one or more metals and one or more ligands coordinated with the one or more metals. In addition, the metal-organic framework is associated with the electrode surface in a manner that forms an interface between the metal-organic framework and the electrode surface. In various embodiments, the ion-selective electrodes of the present disclosure also include a body, a potentiostat, a wiring that electrically connects the electrode surface to the potentiostat, and an output display that is electrically connected to the potentiostat. In additional embodiments, the ion-selective electrodes of the present disclosure also include an ion-selective membrane that is associated with a surface of the metal-organic framework.

In more specific embodiments illustrated in FIG. 1A, the ion-selective electrodes of the present disclosure can be in the form of ion-selective electrode 10. In this embodiment, ion-selective electrode 10 includes metal-organic framework layer 14, electrode surface 12, body 18, potentiostat 22, wiring 20 that electrically connects electrode surface 12 to potentiostat 22, and output display 24 that is electrically connected to potentiostat 22. Metal-organic framework layer 14 is associated with electrode surface 12 in such a manner that forms interface 13 between metal-organic framework layer 14 and electrode surface 12. In addition, ion-selective electrode 10 can include ion-selective membrane 16 that is associated with a surface of metal-organic framework layer 14.

Figure 1B:
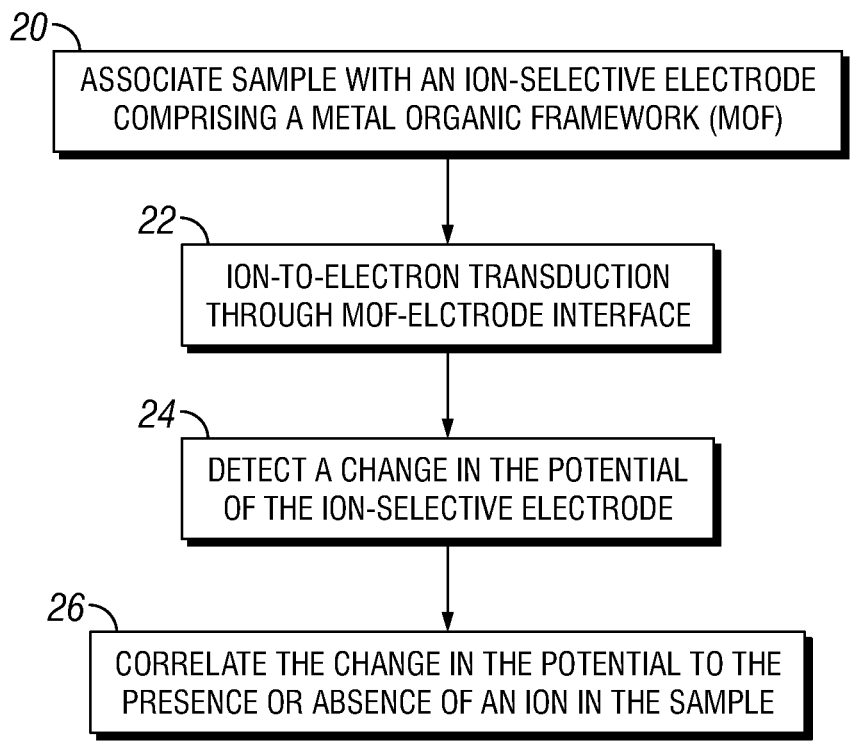
FIG. 1B illustrates a method of detecting an ion in a sample.

In additional embodiments, the present disclosure pertains to methods of detecting an ion in a sample. In some embodiments, the methods of the present disclosure utilize the ion-selective electrodes of the present disclosure to detect an ion in a sample. In some embodiments illustrated in FIG. 1B, the ion detection methods of the present disclosure include a step of associating the sample with an ion-selective electrode that includes a metal-organic framework, an electrode surface, and an interface between the metal-organic framework and the electrode surface (step 20). Thereafter, the metal-organic framework mediates ion-to-electron transduction through the interface (step 22). The ion-selective electrode detects the presence or absence of the ion in the sample by detecting a change in potential of the ion-selective electrode (step 24) and correlating the change in the potential to the presence or absence of the ion (step 26). In some embodiments, the metal-organic framework simultaneously mediates ion sensing and ion-to-electron transduction through the interface.

Figure 1C:
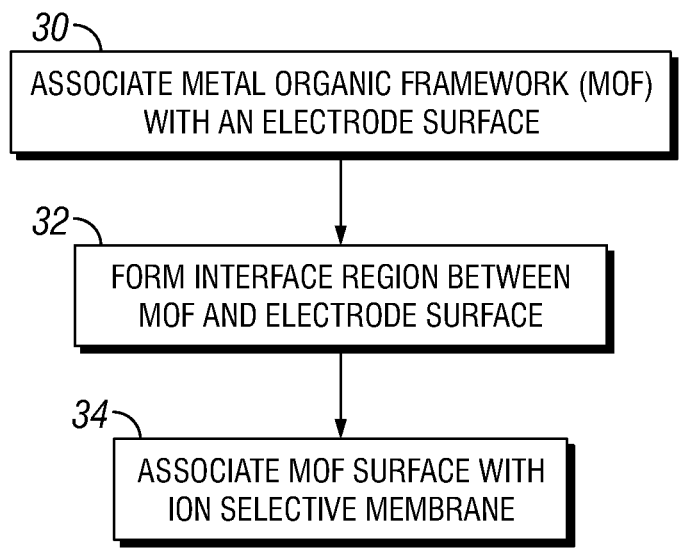
FIG. 1C illustrates a method of forming an ion-selective electrode.

In further embodiments, the present disclosure pertains to methods of making the ion-selective electrodes of the present disclosure. In some embodiments illustrated in FIG. 1C, the methods of the present disclosure include a step of associating a metal-organic framework with an electrode surface (step 30) to result in the formation of an interface between the metal-organic framework and the electrode surface (step 32). In some embodiments, the methods of the present disclosure also include a step of associating an ion-selective membrane with a surface of the metal-organic framework (step 34).

As set forth in more detail herein, the ion-selective electrodes and methods of the present disclosure can have numerous embodiments. In particular, the ion-selective electrodes of the present disclosure can include various types of metal-organic frameworks, electrode surfaces, interfaces, optional ion-selective membranes, and other components. Moreover, various methods may be utilized to detect various ions in various samples through the use of the ion-selective membranes of the present disclosure. In addition, various methods may be utilized to fabricate the ion-selective electrodes of the present disclosure.

Ion-Selective Electrodes

The ion-selective electrodes of the present disclosure generally include a metal-organic framework, an electrode surface, and an interface between the metal-organic frameworks and the electrode surface. In some embodiments, the ion-selective electrodes of the present disclosure also may also include an ion-selective membrane. As set forth in more detail herein, the ion-selective electrodes of the present disclosure can include various metal-organic frameworks, electrode surfaces, interfaces, and ion-selective membranes. Moreover, the ion-selective electrodes of the present disclosure can include numerous other components.

Metal-Organic Frameworks

The ion-selective electrodes of the present disclosure can include various types of metal-organic frameworks. In general, metal-organic frameworks include one or more metals and one or more ligands coordinated with the one or more metals.

The metal-organic frameworks of the present disclosure can include various types of ligands. For instance, in some embodiments, the ligands include, without limitation, organic ligands, hexatopic ligands, polydentate functional groups, aromatic ligands, phthalocyanine-based ligands, metallophthalocyaline-based ligands, naphthalocyanine-based ligands, tridentate ligands, triphenylene-based ligands, triphenylene derivatives, hexahydroxytriphenylene-based organic linkers, hexaiminotriphenlyene-based organic linkers, thiol-based ligands, and combinations thereof.

In some embodiments, the metal-organic framework ligands include tridentate ligands. In some embodiments, the metal-organic framework ligands include thiol-based ligands. In more specific embodiments, the metal-organic framework ligands include triphenylene-based ligands. In some embodiments, the triphenylene-based ligands include, without limitation, 2,3,5,6,10,11-hexahydroxytriphenylene (HHTP), 2,3,5,6,10,11-hexaiminotriphenylene (HITP), 2,3,5,6,10,11-hexathiotriphenylene (HTTP), and combinations thereof.

The metal-organic framework ligands can have various structures. For instance, in some embodiments, the metal-organic framework ligands have semiquinone structures. In some embodiments, the metal-organic framework ligands have quinone structures. In some embodiments, the metal-organic framework ligands include ion binding moieties. In some embodiments, the ion binding moieties are specific for a particular ion to be detected by the methods of the present disclosure.

The metal-organic frameworks of the present disclosure can also include various types of metals. For instance, in some embodiments, the metal-organic framework metals include, without limitation, divalent metals, transition metals, iron, nickel, copper, cobalt, zinc, manganese, platinum, palladium, gold, bismuth, chromium, magnesium, tin, and combinations thereof.

The metal-organic framework metals may be in various forms. For instance, in some embodiments, more than one type of metal may be used at once within the same metal-organic framework. In some embodiments, the metal-organic framework metals may be in the form of at least one of metal ions, metal clusters, metallic nodes, metal catecholates, metal salts, and combinations thereof.

In more specific embodiments, the metal-organic framework metals include divalent metal ions. In some embodiments, the divalent metal ions include, without limitation, cobalt (II), nickel (II), copper (II), and combinations thereof.

In additional embodiments, the metal-organic framework metals include nickel. In some embodiments, the nickel may be in the form of at least one of nickel (II) nodes, $Ni(OAc)_2$, $NiCl_2$, and combinations thereof.

Various ligands and metals may be combined to form various metal-organic frameworks. For instance, in some embodiments, the metal-organic frameworks of the present disclosure include, without limitation, $Co_3HTTP_2$, $Ni_3HTTP_2$, $Cu_3HTTP_2$, $Co_3HHTP_2$, $Ni_3HHTP_2$, $Cu_3HHTP_2$, and combinations thereof.

The metal-organic frameworks of the present disclosure can include various structures. For instance, in some embodiments, the metal-organic frameworks of the present disclosure have a porous structure. In some embodiments, the metal-organic frameworks of the present disclosure include a plurality of micropores that have diameters of less than or about 2 nm. In some embodiments, the metal-organic frameworks of the present disclosure include a plurality of micropores with diameters of less than about 2 nm. In some embodiments, the metal-organic frameworks of the present disclosure include a plurality of micropores with diameters of about 2 nm.

In some embodiments, the metal-organic frameworks of the present disclosure have a two-dimensional structure. In some embodiments, the metal-organic frameworks of the present disclosure are in the form of a packed network.

In some embodiments, the metal-organic frameworks of the present disclosure are in crystalline form. For instance, in some embodiments, the metal-organic frameworks include a long range crystalline order. In some embodiments, the metal-organic frameworks are in the form of crystallites. In some embodiments, the metal-organic frameworks are in the form of porous and ordered crystalline frameworks. In some embodiments, the metal-organic frameworks are in the form of porous coordination polymers with limited or no crystallinity.

In some embodiments, the metal-organic frameworks are arranged in the form of a lattice. In some embodiments, the metal-organic frameworks are arranged in the form of a two-dimensional Kagome lattice.

The metal-organic frameworks of the present disclosure may also have various shapes. For instance, in some embodiments, the metal-organic frameworks are in the form of nanorods. In some embodiments, the metal-organic frameworks are in the form of rod-shapes crystallites. In some embodiments, the metal-organic frameworks can be in the form of sheets or irregular shapes.

In some embodiments, the metal-organic frameworks of the present disclosure may be in the form of a layer, a powder, a compressed powder, a pellet, a pencil-lead, a free-standing film, a substrate-supported film, or combinations of such forms. In some embodiments, the metal-organic frameworks of the present disclosure are in the form of a layer, such as a stacked layer structure. In some embodiments, the metal-organic framework layer has a thickness ranging from about 10 microns to about 100 microns. In some embodiments, the metal-organic framework layer has a thickness ranging from about 20 microns to about 65 microns. In some embodiments, the metal-organic framework layer has a thickness of about 20 microns, a thickness of about 40 microns, or a thickness of about 65 microns.

The metal-organic frameworks of the present disclosure can also include various surface areas. For instance, in some embodiments, the metal-organic frameworks constitute a surface area ranging from about 10 $m^2/g$ to about 1,000 $m^2/g$. In some embodiments, the metal-organic frameworks have a surface area ranging from about 50 $m^2/g$ to about 500 $m^2/g$. In some embodiments, the metal-organic frameworks have a surface area ranging from about 300 $m^2/g$ to about 500 $m^2/g$. In some embodiments, the metal-organic frameworks have a surface area ranging from about 400 $m^2/g$ to about 500 $m^2/g$.

The metal-organic frameworks of the present disclosure can have various physical properties. For instance, in some embodiments, the metal-organic frameworks of the present disclosure have a net neutral charge. In some embodiments, the metal-organic frameworks of the present disclosure have a net neutral charge in the absence of potentially charge-balancing counter-ions. In some embodiments, the metal-organic frameworks of the present disclosure have a negative charge in the presence of charge-balancing cations. In some embodiments, the metal organic-frameworks of the present disclosure have a positive charge in the presence of charge-balancing anions.

The metal-organic frameworks of the present disclosure can also have various ion selectivities. In some embodiments, the metal-organic frameworks of the present disclosure have different ion selectivities based on different metal-organic framework contents. For instance, in some embodiments, metal-organic frameworks may be selective for particular cations or anions. In more specific embodiments, metal-organic frameworks that include $Cu_3HHTP_2$ may be selective for copper ions. In some embodiments, metal-organic frameworks that include $Ni_3HHTP_2$ may be selective for $NO_3^-$ ions.

The metal-organic frameworks of the present disclosure can also have various electrical properties. For instance, in some non-limiting embodiments, the metal-organic frameworks of the present disclosure have a capacitance of at least about 200 µF. In some embodiments, the metal-organic frameworks of the present disclosure have a capacitance of at least about 150 µF. In some embodiments, the metal-organic frameworks of the present disclosure have a capacitance of at least about 100 µF. In some embodiments, the metal-organic frameworks of the present disclosure have a capacitance of at least about 20 µF.

The metal-organic frameworks of the present disclosure can serve various functions in the ion-selective electrodes of the present disclosure. For instance, in some embodiments, the metal-organic frameworks of the present disclosure serve as an ion membrane for capturing ions. In some embodiments, the metal-organic frameworks of the present disclosure capture ions through chelation. In some embodiments, the metal-organic frameworks of the present disclosure capture ions in ion-selective electrodes that lack any additional ion-selective membranes, conductive layers or components for capturing ions.

In some embodiments, the metal-organic frameworks of the present disclosure can mediate ion-to-electron transduction through interface regions between the metal-organic frameworks and electrode surfaces of ion-selective electrodes. In some embodiments, the metal-organic frameworks of the present disclosure mediate ion-to-electron transduction through the interface regions between metal-organic frameworks and electrode surfaces by transducing a charge in the form of ions through the interface and onto the electrode surface in the form of electrons. In some embodiments, the ion-to-electron transduction occurs reversibly.

In some embodiments, the metal-organic frameworks of the present disclosure can simultaneously serve as an ion recognition sensor and an ion-to-electron transducer. For instance, in some embodiments, the metal-organic frameworks of the present disclosure are able to simultaneously recognize ions in a sample and transduce the ions into an electronic signal for recordation by the ion-selective electrodes of the present disclosure.

In some embodiments, the ability of metal-organic frameworks of the present disclosure to simultaneously serve as an ion recognition sensor and an ion-to-electron transducer can significantly improve the potential stability of the ion-selective electrodes of the present disclosure. In some embodiments, the aforementioned ability may circumvent the need for the ion-selective electrodes of the present disclosure to contain a separate ion-selective membrane.

In some embodiments, the metal-organic frameworks of the present disclosure serve as an electrode or an electrode component (e.g., electrode surface). For instance, in some embodiments, conductive metal-organic frameworks can have a direct function as a porous electrode. In some embodiments, the metal-organic frameworks of the present disclosure can simultaneously serve as an ion recognition sensor, an ion-to-electron transducer, and an electrode (e.g., a conductive electrode or an electrode component, such as an electrode surface). In some embodiments, the aforementioned ability may allow for the ion-selective electrodes of the present disclosure to achieve potentiometric detection in a more facile manner while circumventing the need for additional ion-selective electrode components.

Electrode Surfaces

The metal-organic frameworks of the present disclosure may be associated with electrode surfaces of ion-selective membranes in various manners. For instance, in some embodiments, metal-organic frameworks are associated with electrode surfaces in such a manner that allows metal-organic frameworks to serve as both an ion recognition sensor and an ion-to-electron transducer.

In some embodiments, the metal-organic frameworks are conformally coated on an electrode surface. In some embodiments, the metal-organic frameworks are integrated onto the electrode surface. In some embodiments, the metal-organic frameworks form a layer on an electrode surface. In some embodiments, the metal-organic frameworks are in ohmic contact with an electrode surface.

The electrode surfaces of ion-selective membranes can be in various forms. For instance, in some embodiments, the electrode surface is in the form of a conductive substrate. In some embodiments, the conductive substrate is in the form of a transparent conductive film. In more specific embodiments, the electrode surface is in the form of a gold conductive substrate, carbon conductive substrate, copper substrate, platinum substrate, or combinations thereof.

In additional embodiments, the metal-organic frameworks of the present disclosure serve as the electrode surface. For instance, in some embodiments, a surface of the metal-organic frameworks of the present disclosure serves as the electrode surface. In some embodiments, the metal-organic frameworks of the present disclosure serve as the electrode surface in the form of a conductive substrate.

Interfaces

In the present disclosure, interfaces generally refer to regions of an ion-selective electrode between an electrode surface and metal-organic frameworks (e.g., interface 13 shown in FIG. 1A). In some embodiments where metal-organic frameworks serve as the electrode surface, the interface may represent a region within the metal-organic frameworks.

The interfaces of the present disclosure can have various properties. For instance, in some embodiments, the interface is hydrophobic. In some embodiments, the interface is non-polarizable. In some embodiments, the interface has low contact resistance. In some embodiments, the interface is non-polarizable and has high exchange current density.

In some embodiments, the interfaces of the present disclosure can have various advantageous effects. For instance, in some embodiments, the interfaces of the present disclosure can further facilitate ion-to-electron transduction through the interface regions.

Ion-Selective Membrane

In some embodiments, the ion-selective electrodes of the present disclosure can also include an ion-selective membrane (e.g., ion-selective membrane 16 in FIG. 1A). In some embodiments, the ion-selective membrane is utilized to capture an ion.

The ion-selective membranes of the present disclosure may be positioned at various regions of the ion-selective electrodes. For instance, in some embodiments, the ion-selective membrane is associated with a surface of metal-organic frameworks. In some embodiments, the metal-organic framework surface that is associated with the ion-selective membrane is a surface opposite of the metal-organic framework surface associated with the electrode surface.

The ion-selective membranes of the present disclosure may be associated with metal-organic frameworks in various manners. For instance, in some embodiments, the ion-selective membrane is coated on a surface of metal-organic frameworks. In some embodiments, the association of an ion-selective membrane with metal-organic frameworks forms an additional interface region, such as a low contact resistance interface region.

The ion-selective electrodes of the present disclosure may include various types of ion-selective membranes. For instance, in some embodiments, the ion-selective membranes of the present disclosure include, without limitation, cation-selective membranes, anion-selective membranes, and combinations thereof. In some embodiments, the ion-selective membrane is a polymer-based membrane. In some embodiments, the polymer-based membrane includes, without limitation, poly(octylthiophene) (POT), poly(3,4-ethylenedioxythiophene) (PEDOT), polypyrrole (PPy), polystyrene sulfonate (PSS), polyvinyl chloride (PVC), poly(methyl) methacrylate (PMMA), poly(decyl) methacrylate (PDMA) and combinations thereof.

In some embodiments, the ion-selective membrane includes one or more molecules. In some embodiments, the ion-selective membrane includes, without limitation, ionophores (ion-chelator), ion-exchangers, plasticizers, polymers, and combinations thereof. In some embodiments, the molecules include, without limitation, sodium tetrakis[3,5-bis(trifluoromethyl)phenyl]borate (NaTFPB), bis(2-ethylhexyl) sebacate (DOS), tridodecylmethylammonium chloride (TDMACl), and combinations thereof.

In some embodiments, the ion-selective membrane is selective for a particular ion. In some embodiments, the ion-selective membrane is selective for a cation. In more specific embodiments, the ion-selective membrane is a potassium-selective membrane. In some embodiments, the potassium-selective membrane includes, without limitation, potassium ionophore II, sodium tetrakis[3,5-bis(trifluoromethyl)phenyl]borate (NaTFPB), high molecular weight polyvinyl chloride (PVC), bis(2-ethylhexyl) sebacate (DOS), and combinations thereof.

In some embodiments, the ion-selective membrane is selective for an anion. In more specific embodiments, the ion-selective membrane is a nitrate-selective membrane that includes, without limitation, tridodecylmethylammonium chloride (TDMACl), high molecular weight polyvinyl chloride (PVC), bis(2-ethylhexyl) sebacate (DOS), and combinations thereof.

Additional Electrode Components

In various embodiments, the ion-selective electrodes of the present disclosure can also include additional electrode components. For instance, in some embodiments, the ion-selective electrodes of the present disclosure can include a body (e.g., body 18 shown in FIG. 1A). In some embodiments, the body is a polymer-based body, such as a body composed of polyvinyl chloride (PVC). In some embodiments, the body is a Teflon-based body.

In some embodiments, the ion-selective electrodes of the present disclosure can also include a potentiostat (e.g., potentiostat 22 shown in FIG. 1A). In some embodiments, the ion-selective electrodes of the present disclosure can also include a wiring (e.g., wiring 20 shown in FIG. 1A) that electrically connects the electrode surface to the potentiostat. In some embodiments, the wiring is a copper wiring. In some embodiments, the ion-selective electrodes of the present disclosure can also include an output display (e.g., output display 24 in FIG. 1A) that is electrically connected to the potentiostat.

Ion-Selective Electrode Structures and Properties

The ion-selective electrodes of the present disclosure can include various structures and properties. For instance, in some embodiments, the ion-selective electrodes of the present disclosure have a layered structure. In some embodiments, the ion-selective electrodes of the present disclosure are substantially hydrophobic. In some embodiments, the ion-selective electrodes of the present disclosure are resistive to changes induced by the presence of various environmental factors, such as oxygen, $N_2$, and light.

In some embodiments, the ion-selective electrodes of the present disclosure exhibit optimal capacitance. For instance, in some embodiments, the ion-selective electrodes of the present disclosure exhibit capacitance of more than about 200 µF.

In some embodiments, the ion-selective electrodes of the present disclosure exhibit optimal potential stability. For instance, in some embodiments, the ion-selective electrodes of the present disclosure exhibit a potential stability drift of about 10-12 µA/h under polarizing condition of 1 nA.

In some embodiments, the ion-selective electrodes of the present disclosure exhibit near-Nernstian behavior. For instance, in some embodiments, the ion-selective electrodes of the present disclosure exhibit near-Nernstian behavior of about 50-60 mV/sec.

The ion-selective electrodes of the present disclosure may be in various forms. For instance, in some embodiments, the ion-selective electrodes of the present disclosure may include, without limitation, carbon electrodes, glassy carbon electrodes, gold electrodes, solid contact electrodes, and combinations thereof. In more specific embodiments, the ion-selective electrodes of the present disclosure may include glassy carbon electrodes.

Methods of Detecting Ions in a Sample

In additional embodiments, the present disclosure pertains to methods of detecting an ion in a sample. In some embodiments, the methods of the present disclosure include a step of associating the sample with an ion-selective electrode of the present disclosure such that the metal-organic framework of the ion-selective electrode mediates ion-to-electron transduction through the interface between metal-organic frameworks and the electrode surface. Thereafter, the ion-selective electrode detects the presence or absence of the ion in the sample by detecting a change in potential of the ion-selective electrode and correlating the change to the presence or absence of the ion.

As set forth in more detail herein, various methods may be utilized to associate various samples containing various ions with various ion-selective electrodes. Moreover, various methods may be utilized to detect the presence or absence of ions in a sample.

Samples

The methods of the present disclosure may be utilized to detect ions from various samples. The samples may be in various forms. For instance, in some embodiments, the sample is in gaseous form, liquid form, solid form, or combinations of such forms. In some embodiments, the sample is in liquid form. In some embodiments, the sample is in the form of an aqueous solution.

In some embodiments, the sample is in solid form. In some embodiments, the sample is in the form of a membrane. In some embodiments, the membrane is associated with a surface of the metal-organic framework.

Detection of Ions

The methods of the present disclosure may be utilized to detect various ions from samples. For instance, in some embodiments, the ion to be detected includes, without limitation, anions, cations and combinations thereof.

In some embodiments, the ion to be detected includes a cation. In some embodiments, the cation includes, without limitation, $Ca^{2+}$, $Co^{2+}$, $Mg^{2+}$, $Zn^{2+}$, $Pb^{2+}$, $Ni^{2+}$, $Cu^{2+}$, $Na^+$, $K^+$, $NH_4^+$, and combinations thereof.

In some embodiments, the ion to be detected includes an anion. In some embodiments, the anion includes, without limitation, $CH_3COO^-$, $NO_3^-$, $ClO_4^-$, $Cl^-$, $I^-$, $F^-$, $Br^-$, $SO_4^{2-}$, $S_2O_8^{2-}$, $Cr_2O_7^{2-}$, and combinations thereof.

Association of Samples with Ion-Selective Electrodes

Various methods may be utilized to associate samples with ion-selective electrodes. For instance, in some embodiments, the association occurs by flowing the sample through an ion-selective electrode. In some embodiments, the association occurs by incubating the sample with the ion-selective electrode.

In some embodiments, the association of a sample with ion-selective electrodes occurs in an active manner, where an active step is taken to associate samples with the ion-selective electrodes (e.g., actively flowing the sample through the ion-selective electrodes). In some embodiments, the association occurs in a passive manner, such as through the passive incubation of the ion-selective electrodes with the sample.

The association of a sample with ion-selective electrodes can occur in various manners. For instance, in some embodiments, the association results in the reversible association of any ion in the sample with the metal-organic frameworks of the ion-selective electrodes. In some embodiments, the association results in the selective association of a specific ion in the sample with the metal-organic frameworks of ion-selective electrodes.

In some embodiments, the association also results in filtration, pre-concentration, and capture of ions in a sample by the metal-organic frameworks of the ion-selective electrodes. In some embodiments, the association, filtration, pre-concentration and capture of the ions occur simultaneously.

Detection of a Change in Potential of the Ion-Selective Electrodes

Various methods may also be utilized to detect a change in potential of the ion-selective electrodes. For instance, in some embodiments, the change in the potential of the ion-selective electrode is detected by detecting a change in voltage of the ion-selective electrode over time.

In some embodiments, the change in the potential of the ion-selective electrode is detected by detecting a change in voltage of the ion-selective electrode over time when compared to a reference electrode not associated with the sample. In some embodiments, the detected change in voltage is represented by an increase in voltage over time. In some embodiments, the detected change in voltage is represented by a decrease in voltage over time.

Additional methods of detecting a change in potential of the ion-selective electrodes can also be envisioned.

Correlating a Change in Potential to Presence or Absence of Ions

Various methods may also be utilized to correlate a change in potential of ion-selective electrodes to the presence or absence of an ion. For instance, in some embodiments, the change in the potential of the ion-selective electrode is correlated to the presence or absence of an ion by comparing the change in the potential to the change in potential of the ion-selective electrode in response to known ions. In some embodiments, the change in the potential of the ion-selective electrode is correlated to the presence or absence of an ion by comparing the change in the potential to potentiometric slopes of known ions.

Additional methods of correlating a change in potential of ion-selective electrodes to the presence or absence of an ion can also be envisioned.

Modes of Ion Detection

The methods of the present disclosure can be utilized to detect ions in various manners. For instance, in some embodiments, the methods of the present disclosure can be utilized to detect a single ion. In some embodiments, the methods of the present disclosure can be utilized to detect multiple ions.

In some embodiments, the methods of the present disclosure can be utilized to detect the concentration of an ion. For instance, in some embodiments, ions may be detected at concentrations of less than about $7 \times 10^{-7}$ M. In some embodiments, ions may be detected at concentrations of less than about $6 \times 10^{-7}$ M.

Without being bound by theory, the methods of the present disclosure can be utilized to detect ions through various mechanisms. For instance, in some embodiments that were described previously, the metal-organic frameworks of ion-selective electrodes mediate ion-to-electron transduction through the interface between metal-organic frameworks and the electrode surface in order to detect ions. In some embodiments that were also described previously, the metal-organic frameworks of ion-selective electrodes simultaneously mediate ion sensing and ion-to-electron transduction through the interface in order to detect ions.

Methods of Making Ion-Selective Electrodes

Additional embodiments of the present disclosure pertain to methods of making the ion-selective electrodes of the present disclosure. In some embodiments, the methods of the present disclosure include a step of associating a metal-organic framework with an electrode surface to result in the formation of an interface between the metal-organic framework and the electrode surface.

Various methods may be utilized to associate metal-organic frameworks with an electrode surface. For instance, in some embodiments, the association occurs by applying a dispersion of metal-organic frameworks onto the electrode surface. In some embodiments, the metal-organic frameworks are in a solvent. In some embodiments, the solvent is an organic solvent, such as acetonitrile.

In some embodiments, the association occurs by drop-casting a metal-organic framework dispersion onto the electrode surface. In some embodiments, the association occurs by compressing a metal-organic framework powder onto the electrode surface. In some embodiments, the association occurs by spin-coating a metal-organic framework dispersion onto the electrode surface. In some embodiments, the association occurs by electrodeposition of a metal-organic framework from ligand and metal components in solution.

In some embodiments, the methods of the present disclosure also include a step of associating an ion-selective membrane with a surface of metal-organic frameworks. In some embodiments, the aforementioned association steps may also be utilized to associate an ion-selective membrane with a surface of metal-organic frameworks.

The ion-selective electrode fabrication methods of the present disclosure may be utilized to control the ion selectivity of the formed electrodes. For instance, in some embodiments, selectivity of the ion-selective electrode to different ions can be controlled by selecting metal-organic frameworks with metal nodes that are specific for a particular ion. In some embodiments, selectivity of the ion-selective electrode to different ions can be controlled by selecting metal-organic frameworks with ligands that are selective for a particular ion. For instance, in some embodiments, the selected metal-organic frameworks may have ligands with ion-binding moieties that are specific for a particular ion.

In some embodiments, selectivity of the ion-selective electrodes to different ions can be controlled by selecting metal-organic frameworks with particular pore sizes. In some embodiments, selectivity of the ion-selective electrodes to different ions can be controlled by selecting metal-organic frameworks with metals that are selective for a particular ion.

Applications and Advantages

As set forth in more detail in Examples 1 and 2, Applicants have identified at least four advantageous characteristics of the ion-selective electrodes and ion detection methods of the present disclosure for broad implementation in potentiometry. First, Applicants have determined that metal-organic frameworks that are associated with the ion-selective electrodes of the present disclosure (e.g., $M_3HHTP_2$ MOF) possess optimal electrical conductivity, thereby allowing their implementation as electrical components in ion-selective electrodes. Second, metal-organic frameworks can be synthesized in a facile manner by linking inorganic metal ions with ligands through solution-phase self-assembly to create crystalline frameworks with permanent porosity. Third, conductive metal-organic frameworks have high double layer capacitance that is a function of their large surface area and accessible nanopores, thus fulfilling the criteria for obtaining ion-selective electrodes with high potential stability. Fourth, large degree of structural control and compositional modularity, achieved through bottom-up approaches to fabricating the ion-selective electrodes of the present disclosure, can allow for the integration of specific and desired ion binding moieties into metal-organic frameworks. For instance, the specific ion binding properties in $M_3HHTP_2$ MOFs may arise from the homogenous distribution of oxygen atoms (hard base) within the pores of the conductive network that stabilizes metal ions (hard acids) according to the hard-soft acid-base theory.

As also set forth in more detail in Examples 1 and 2, the ion-selective electrodes and ion detection methods of the present disclosure provide at least three fundamental advances in the area of functional material design for the development of single-component ion-selective electrodes for the detection of ions (e.g., ionic analytes) in various samples (e.g., aqueous solutions). First, Applicants have demonstrated that metal-organic frameworks associated with the ion-selective electrodes of the present disclosure can simultaneously act as ion-recognition centers and ion-to-electron signal transducers, thus minimizing the number of components required to assemble conventional solid-contact ion-selective electrodes. Second, Applicants have demonstrated that, by changing the metal center within a metal-organic framework's network, the nature and magnitude of response to ions in a sample (e.g., a solution) can be altered. As such, in some embodiments, the methods of the present disclosure can be utilized for the development of single-component ion-selective electrodes in which selectivity to different ions could be controlled through altering the metal nodes in the metal-organic framework.

Third, Applicants have demonstrated that various metal-organic frameworks (e.g., $Cu_3HHTP_2$ and $Ni_3HHTP_2$ MOFs) are resistive to changes induced by the presence of oxygen and light, thus expanding the potential application of the ion-selective electrodes of the present disclosure for prolonged sample monitoring for various purposes (e.g., environmental analysis). In these configurations, the disclosed sensors exhibit optimal performance characteristics including near-Nernstian behavior, wide response range and good signal stability towards many different cations and anions. Moreover, the resulting potentiometric devices exhibit good signal stability, limited photosensitivity and high resistivity to interfering gases such as oxygen.

As also set forth in more detail in Examples 1 and 2, the ion-selective electrodes of the present disclosure provide at least five practical advantages: i) large bulk capacitance; ii) low contact resistance at the interface between metal-organic frameworks and electrode surfaces or at the interface between metal-organic frameworks and ion-selective membranes; iii) compatibility with the detection of both cations and anions; iv) high potential stability facilitated by the suppression of the formation of a water layer at the interface between metal-organic frameworks and electrode surfaces; v) high structural modularity and ease of synthesis of different ion-selective electrode components (e.g., through aqueous self-assembly); vi) reduction in the number of components required to assemble conventional solid contact ion-selective electrodes; vii) the nature and magnitude of response to ions in a sample (e.g., a solution) can be altered by selecting different metal centers in a metal-organic framework, thus replacing the need for complicated optimization protocols; and viii) high resistivity to changes induced by the presence of oxygen and light.

As such, the ion-selective electrodes and ion detection methods of the present disclosure can find numerous applications, such as applications where high signal stability, with ideally no potential drift, is particularly important. Such applications can include continuous monitoring of an ion over an extended time period. Such applications can also include industrial process monitoring, clinical analysis and environmental testing. More specific applications can include routine monitoring of blood potassium, and detection of $NO_3^-$ in biological and environmental samples.

ADDITIONAL EMBODIMENTS

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Conductive Metal-Organic Frameworks as Ion-to-Electron Transducers in Potentiometric Sensors This Example describes an unexplored property of conductive metal-organic frameworks (MOFs) as ion-to-electron transducers in the context of potentiometric detection. Several conductive two-dimensional (2D) MOF analogs were drop-cast onto a glassy carbon electrode and then covered with an ion-selective membrane to form a potentiometric sensor. The resulting devices exhibited optimal sensing properties towards anions and cations, characterized by a near-Nernstian response and over four order of magnitude linear range. Impedance and chronopotentiometric measurements revealed the presence of large bulk capacitance (204.1±2.2 µF) and good potential stability (drift of 11.1±0.5 µA/h). Potentiometric water test and contact angle measurements showed that this class of materials exhibited hydrophobicity, and inhibited the formation of water layer at the electrode/membrane interface, resulting in a highly stable sensing response with a potential drift as low as 11.1 µA/h.

The MOFs that includes metallic nodes (i.e., Ni, Cu and Co) interconnected with triphenylene-based organic linkers (2,3,6,7,10,11-hexahydroxytriphenylene—HHTP) arranged in a Kagome lattice (FIG. 2) were integrated into layered device architectures to produce functional potentiometric devices.

Applicants believe that conductive MOFs possess at least three unique characteristics for potential utility in potentiometry. First, the class of 2D MOFs used in this Example exhibits good conductivity that rivals that of carbon-based materials, making them suitable candidates for electronically transduced signal in analytical devices. Second, being highly porous, conductive MOFs have high surface areas on par with those reported for nanoporous carbons. This characteristic is important for obtaining high capacitance necessary for facilitating ion-to-electron transduction and obtaining high potential stability. Third, these materials can be synthesized from metal ions interconnected with ligands through solution-phase self-assembly to produce highly ordered, crystalline structures. This bottom-up synthetic approach provides structural control and compositional modularity, facilitating for the development of conductive materials with predictable and tuneable properties.

The synthetic control over structure offers a potential advantage over pyrolytic carbons and conductive polymers in terms of chemical control of batch-to-batch structural reproducibility and application-specific tunability. The synthetic conditions for MOF preparation are significantly milder than those typically employed in the synthesis of porous carbons, and may offer molecular level control of interfaces, materials composition, and device performance. Based on these unique characteristics, Applicants reasoned that conductive MOFs can be designed to exhibit ion-to-electron transduction, high capacitance, and substantial hydrophobicity desirable for advancing the field of potentiometric detection.

Example 1.1. Materials and Instruments

Bis[(benzo-15-crown-5)-15-ylmethyl] pimelate (potassium ionophore II), valinomycin (potassium ionophore I), sodium tetrakis[3,5-bis(trifluoromethyl)phenyl]borate (NaTFPB), tridodecylmethylammonium chloride (TDMACl), high molecular weight polyvinyl chloride (PVC), bis(2-ethylhexyl) sebacate (DOS) were purchased from Sigma Aldrich. 2,3,6,7,10,11-hexahydroxytriphenylene (HHTP) was purchased for TCI Chemicals. All chemicals were of analytical reagent grade. Solutions of metal ions were prepared in ultra-pure water obtained with Pico Pure 3 water system (resistance 18 MΩ cm$^{-1}$).

Working solutions of different metal ions were prepared by serial dilutions of a 1 M stock solution. Glassy carbon electrode (3 mm in diameter) were purchased from CH instruments, USA. Scanning Electron Microscopy (SEM) and Energy Dispersive X-ray Spectroscopy (EDX) was performed using a Hitachi TM3000 SEM (Tokyo, Japan) equipped for X-ray microanalysis with a Bruker Edax light element Si(Li) detector (Billerica, Mass.). EmStat MUX16 potentiostat (Palm Instruments BV, Netherlands) was used for electrochemistry. The z-dimension (height) for all electrodes were collected using a Zygo NewView 7300 Light Interferometer equipped with a 10× lens. X-ray photoelectron spectroscopy (XPS) experiments were conducted using a Physical Electronics Versaprobe II X-ray Photoelectron Spectrometer under ultrahigh vacuum (base pressure 10-10 mbar). The measurement chamber was equipped with a monochromatic Al (Kα) X-ray source. Both survey and high-resolution spectra were obtained using a beam diameter of 200 µm. The spectra were processed with CasaXPS software. Powder X-ray diffraction (PXRD) measurements were performed with a Bruker D8 diffractometer equipped with a Ge-monochromated 2.2 kW (40 kV, 40 kA) CuKα (α=1.54 Å) radiation source and a NaI scintillation counter detector (Billerica, Mass.).

Example 1.2. Synthesis and Characterization of Conductive MOFs

The synthesis of metal-organic frameworks using organic linker 2,3,6,7,10,11-hexahydroxytriphenylene was adapted from Yaghi and coworkers (*Chem. Mater.* 2012, 24, 3511-3513).

Synthesis of $Ni_3HHTP_2$. To a 100 mL round bottom flask, 500 mg of HHTP and 767 mg of $Ni(OAc)_2.4H_2O$ were added. 70 mL of deionized water was then added to the round bottom flask. The resulting suspension was sonicated for 15 minutes. The reaction mixture was then heated for 24 h at 85° C. under stirring and air. The flask was left to cool for 1 h at room temperature and the reaction product was filtered with a ceramic funnel and a filter paper. The solid precipitate was then washed with ultra-pure water (1000 mL) and acetone (300 mL). The resulting black powder was transferred into a glass vial and dried overnight under vacuum (20 mTorr) at 85° C.

Synthesis of $Cu_3HHTP_2$. To a 50 mL round bottom flask, 100 mg of HHTP and 154 mg of copper (II) trifluoroacetylacetonate were added. 20 mL of deionized water was then added to the round bottom flask. The resulting suspension was sonicated for 15 minutes. The reaction mixture was then heated for 24 h at 70° C. under stirring and air. The flask was left to cool for 1 h at room temperature and the reaction product was filtered with a ceramic funnel and a filter paper. The solid precipitate was then washed with ultra-pure water (1000 mL) and acetone (300 mL). The resulting black powder was transferred into a glass vial and dried overnight under vacuum (20 mTorr) at 85° C.

Synthesis of $Co_3HHTP_2$. To a 50 mL round bottom flask, 50 mg of HHTP and 74 mg of $CoCl_2.6H_2O$ were added. 20 mL of deionized water was then added to the round bottom flask. The resulting suspension was sonicated for 15 minutes. The reaction mixture was then heated for 24 h at 70° C. under stirring and air. The flask was left to cool for 1 h at room temperature and the reaction product was filtered with a ceramic funnel and a filter paper. The solid precipitate was then washed with ultra-pure water (1000 mL) and acetone (300 mL). The resulting black powder was transferred into a glass vial and dried overnight under vacuum (20 mTorr) at 85° C.

Example 1.3. Characterization of $M_3HHTP_2$ MOFs (M=Co, Ni, Cu)

Figure 3A:
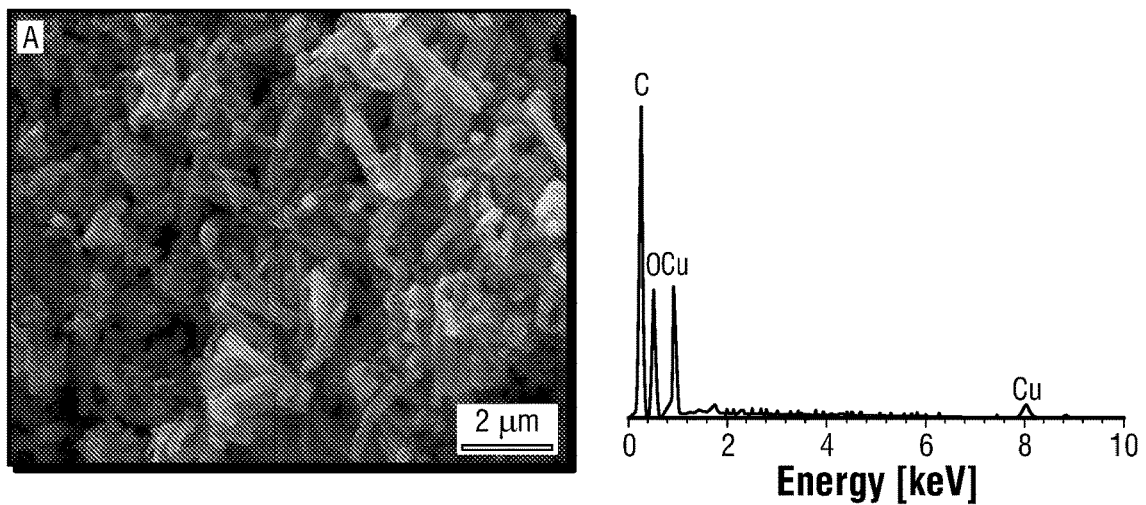
FIG. 3 shows scanning electron microscopy (SEM) results and accompanied energy dispersive X-ray spectroscopy (EDX) analysis collected for different metal-organic frameworks (MOFs), including $Cu_3HHTP_2$ MOF (FIG. 3A), $Ni_3HHTP_2$ MOF (FIG. 3B), and $Co_3HHTP_2$ MOF (FIG. 3C). SEM revealed the assembly of $M_3HHTP_2$ conductive MOFs into nanocrystalline structures while EDX confirmed the presence of organic-inorganic hybrid materials as reported for other HHTP based MOFs.
Figure 3B:
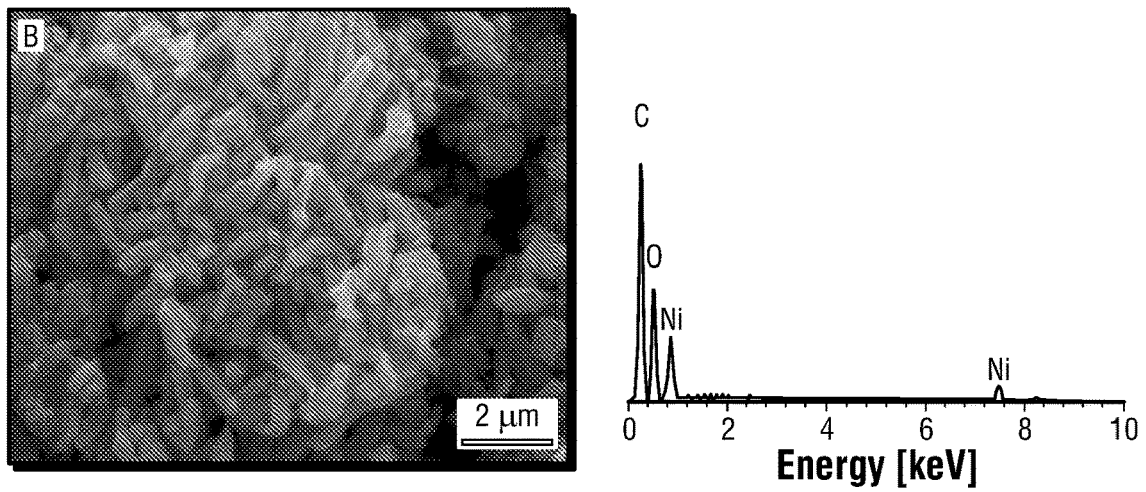
Figure 3C:
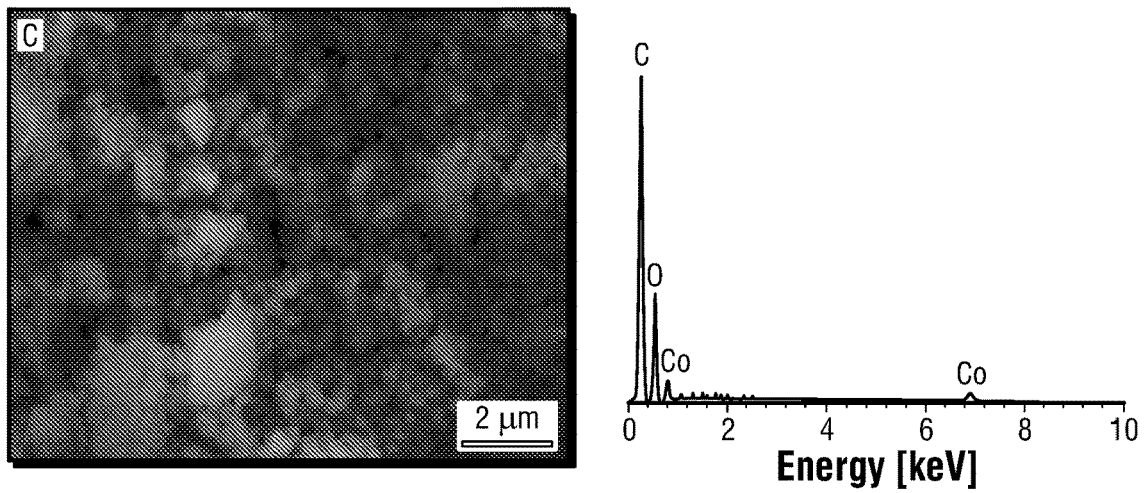
Figure 4:
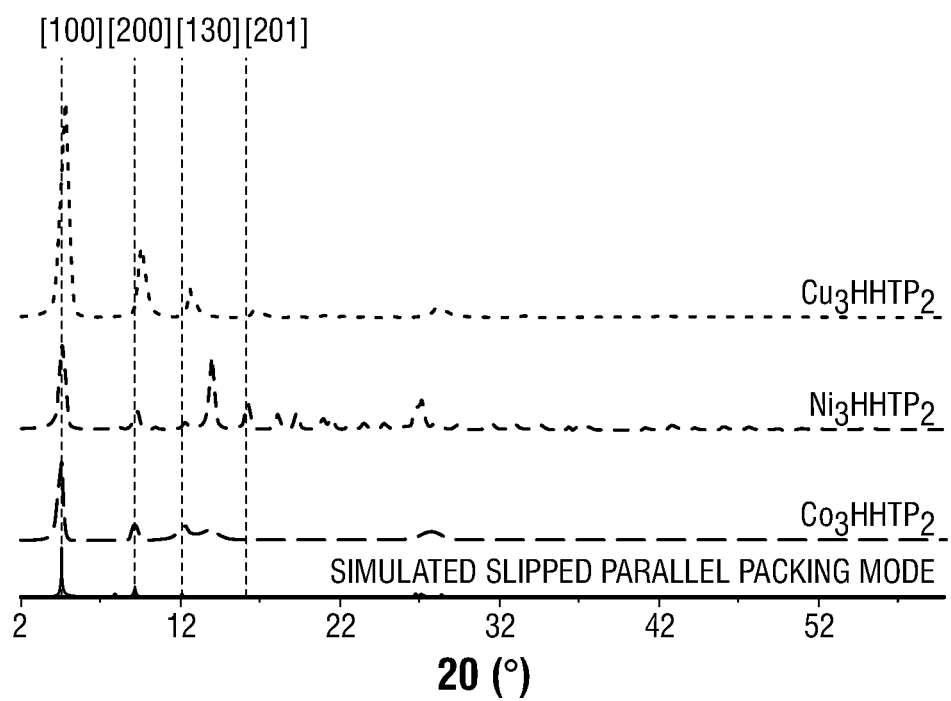
FIG. 4 shows experimental (colored) and simulated slipped parallel powder X-Ray Diffraction patterns without the presence of interpolated layer obtained for bulk $Cu_3HHTP_2$, $Ni_3HHTP_2$ and $Co_3HHTP_2$ MOFs. The observed pXRD patterns of $Cu_3HHTP_2$, $Ni_3HHTP_2$, and $Co_3HHTP_2$ MOF are consistent with previous reports.
Figure 5A:
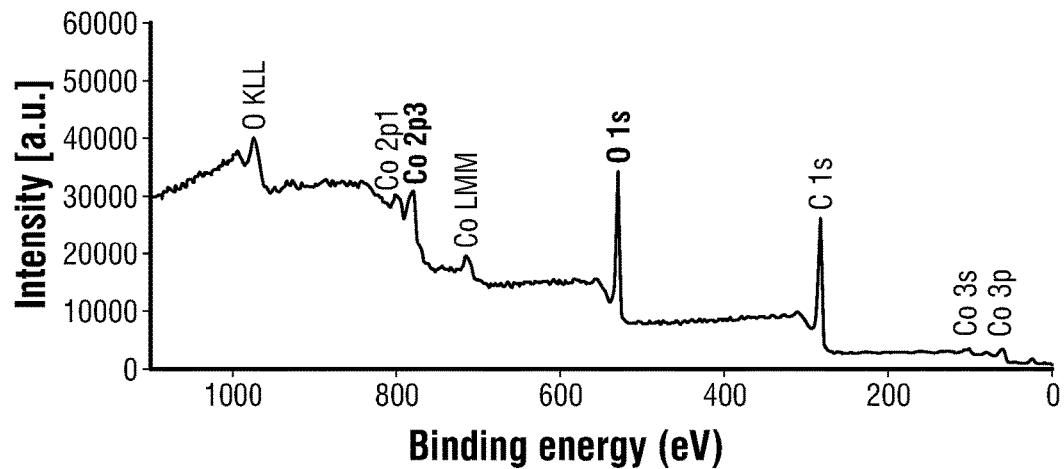
FIG. 5A is an energy survey scan. Also shown are high-resolution spectra in the O1s (FIG. 5B), and Co2p3 (FIG. 5C) regions.
Figure 5B:
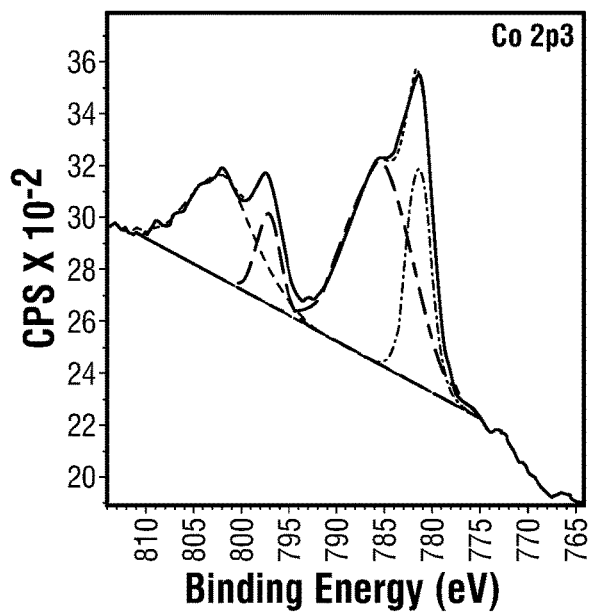
FIG. 5 shows X-ray photoelectron spectroscopy (XPS) spectra obtained for the $Co_3HHTP_2$ MOFs.
Figure 5C:
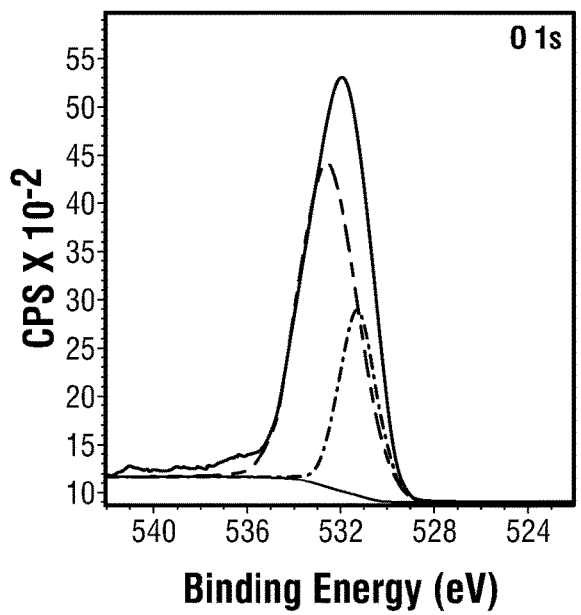
Figure 6A:
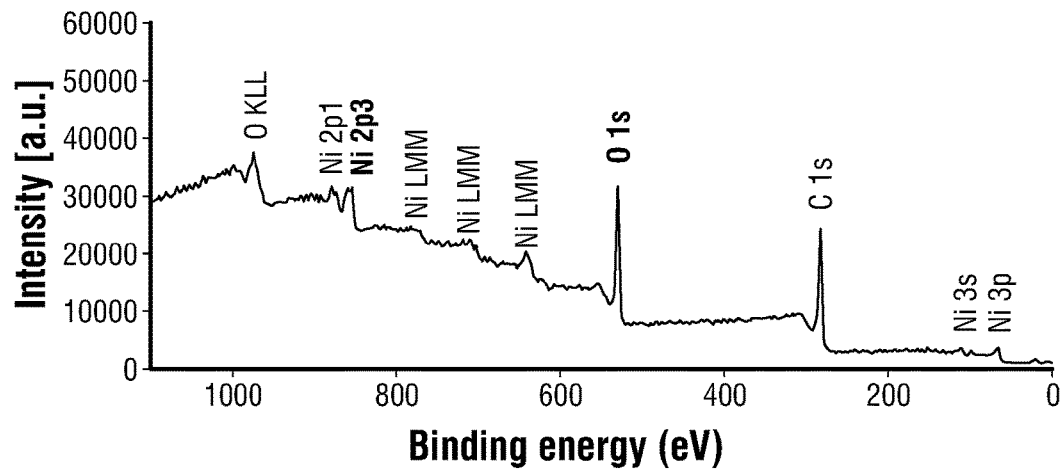
FIG. 6A is an energy survey scan. Also shown are high-resolution spectra in the O1s (FIG. 6B), and Ni2p3 (FIG. 6C) regions.
Figure 6B:
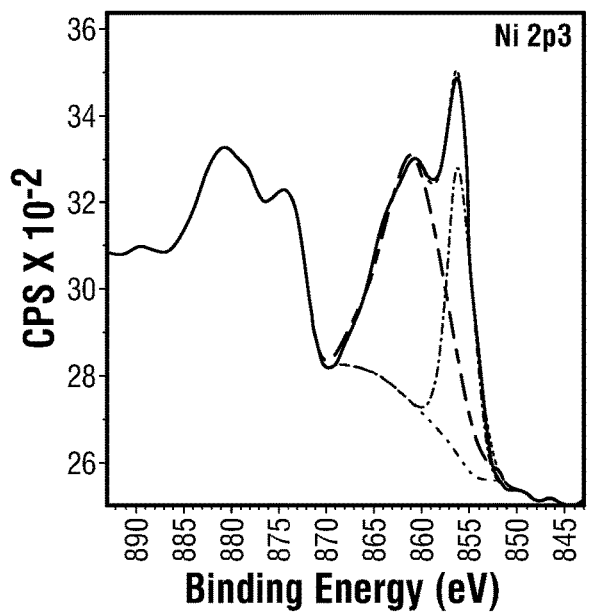
FIG. 6 shows XPS spectra obtained for the $Ni_3HHTP_2$ MOFs.
Figure 6C:
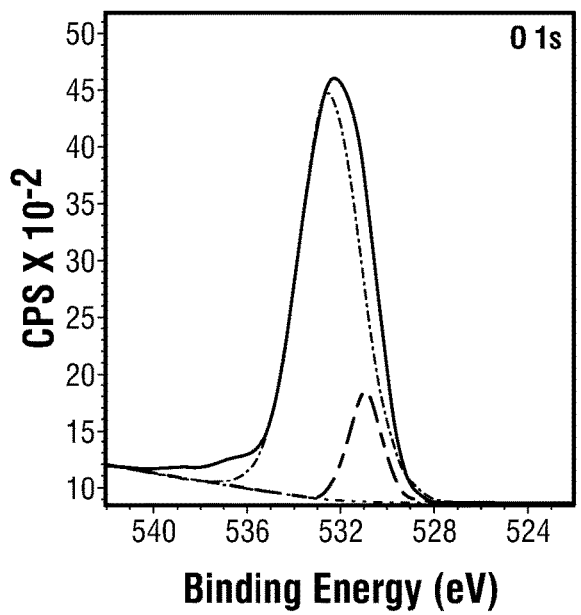
Figure 7A:
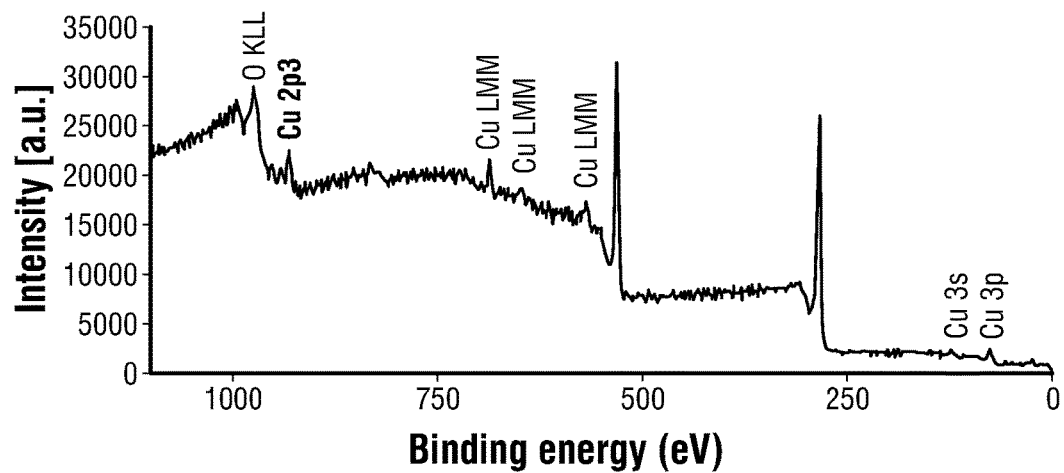
FIG. 7A is an energy survey scan. Also shown are high-resolution spectra in the O1s (FIG. 7B), and Cu2p3 (FIG. 7C) regions.
Figure 7B:
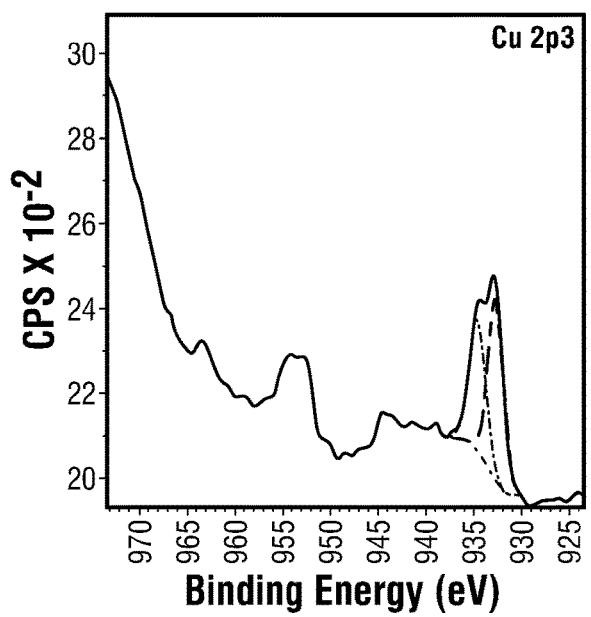
FIG. 7 shows XPS spectra obtained for the $Cu_3HHTP_2$ MOFs.
Figure 7C:
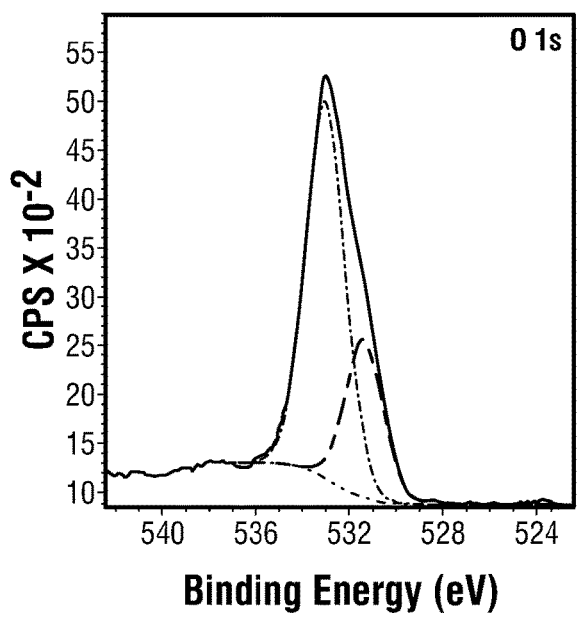

Scanning electron microscopy (SEM) revealed the presence of distinct rod-shaped crystallites in $Ni_3HHTP_2$ and $Cu_3HHTP_2$ MOFs and non-uniform nanoscale morphology in $Co_3HHTP_2$ MOF (FIG. 3). The presence of metals (Co, Ni, and Cu) and C, H, O atoms in the bulk of each MOF was confirmed by EDX spectroscopy (FIG. 3). pXRD revealed stacked layered structure consistent with previous reports (FIG. 4). XPS showed exclusive presence of $Ni^{2+}$ in $Ni_3HHTP_2$ and mixed valency in $Co_3HHTP_2$ ($Co^{2+}/Co^{3+}$) and $Cu_3HHTP_2$ ($Cu^{1+}/Cu^{2+}$) MOFs with no additional counterions, suggesting that the redox-active triphenylene ligand maintains charge neutrality in the framework (FIGS. 5-7). These results are consistent with other reports of similar materials.

Example 1.4. Preparation of MOF Dispersion

The MOF-dispersion was prepared by transferring 1.0 mg of a selected MOF into an eppendorf tube containing 1.0 mL of acetonitrile. The same tube was then sonicated for 4 h at 25° C. to give a homogenous dispersion.

Example 1.5. Preparation of $K^+$ and $NO_3^-$ Sensing Membranes

Traditional potassium selective membranes contained 10 mmol $kg^{-1}$ of valinomycin ($K^+$-ISM-I) or potassium ionophore II ($K^+$-ISM-II), 5 mmol $kg^{-1}$ of NaTFPB, 33.3 wt % PVC and 66.6 wt % DOS. $NO_3^-$-ISM contained 5.0 mmol $kg^{-1}$ of TDMACl, PVC (33.2 wt %) and DOS (66.4 wt %). The above-mentioned components were then dissolved in 1.5 mL of THF and the resulting mixture was vortexed for 30 min for complete dissolution.

Example 1.6. Preparation of MOF-Coated Electrodes (GCE/MOF)

The intermediate conductive layer consisting of $M_3HHTP_2$ MOFs was prepared by drop casting 5.0 µL aliquots of each conductive MOF directly onto a solid contact. The electrodes were then dried under nitrogen for 3 h before electrochemical measurements were carried out.

Example 1.7. Preparation of ISEs (GCE/MOF/ISM)

For potentiometric measurements, a dispersion of selected MOF (prepared as described in Example 1.4) was drop cast onto the carbon-based electrode and dried for 3 h at room temperature. An aliquot (10 µL) of the ion-selective membrane was drop cast onto the previously deposited MOF, and the electrodes were left at room temperature to dry overnight. The following day, the resulting ISEs were conditioned in $1.0 \times 10^{-3}$ M potassium chloride solution for 24 h prior to the potentiometric and impedance experiments. Membrane thicknesses were measured using digital micrometer. For the long-term stability test, each electrode was only used once (during initial measurement) and then stored in dark, at room temperature under air atmosphere, for three weeks in the distilled water and reused.

Example 1.8. Preparation of Coated Wire Electrodes (GCE/ISM)

Coated wire electrodes (CWEs) were prepared by drop casting (10 µL) of the ion-selective membrane suspension directly onto the top of a glassy carbon electrode. Each device was then dried at room temperature for 24 h and then immersed in 5 mL of the $1.0 \times 10^{-3}$ M KCl solution for an additional 24 h.

Example 1.9. Potentiometric Measurements

Potentiometric responses of all electrodes were recorded using EmStat MUX16 potentiostat (Palm Instruments BV, Netherlands) in a stirred solution against a double-junction Ag/AgCl reference electrode with a 1 M KCl bridge electrolyte (Sigma Aldrich) at room temperature. For all potentiometric measurements at least three independent $NO_3^-$ and $K^+$-ISEs were used.

Example 1.10. Electrochemical Impedance Spectroscopy

All impedance measurements were performed by using an Ivium Technologies CompactStat Impedance Analyser (Ivium Technologies). The EIS measurements of the deposited MOF layer and ion-selective membranes were conducted using established techniques. Briefly, impedance spectra were collected using excitation amplitude of 0.01 V within the frequency range spanning from 100 kHz to 0.01 Hz for the GCE/MOF electrodes. However, higher amplitude (0.1 V) was used for electrodes consisting of a selected MOF-layer and an ion-selective membrane to improve the overall signal to noise ratio. A conventional three electrodes set-up was used for all impedance measurements using glassy carbon working electrode, platinum auxiliary electrode and a silver-silver chloride electrode as the reference. Each measurement was performed at open-circuit potential in 0.1 M aqueous solution of potassium chloride at room temperature. All impedance spectra were fitted to equivalent circuits using the IviumStat software version 2.0. All measurements were done at least in triplicate.

Example 1.11. Cyclic Voltammetry

Cyclic voltammetry experiments were carried out at room temperature in a conventional three-electrode set-up using Ag/AgCl (1 M) reference electrode, platinum wire and glassy carbon as the auxiliary and working electrode respectively. 0.1 M KCl was used as background electrolyte for all voltammetric measurements were run under nitrogen atmosphere.

Example 1.12. Chronopotentiometric Characterization

A constant current of −1.0 nA was applied to the working electrode for 60 s followed by a reversed current of the same magnitude for the same length of time. The resulting electromotive force was recorded in a solution of 0.1 M KCl at room temperature. All measurements were carried out in a three-electrode configuration using the ISEs under Example as working electrodes. The reference electrode was an Ag/AgCl/KCl (3 M) and the auxiliary electrode was a platinum wire.

Figure 8A:
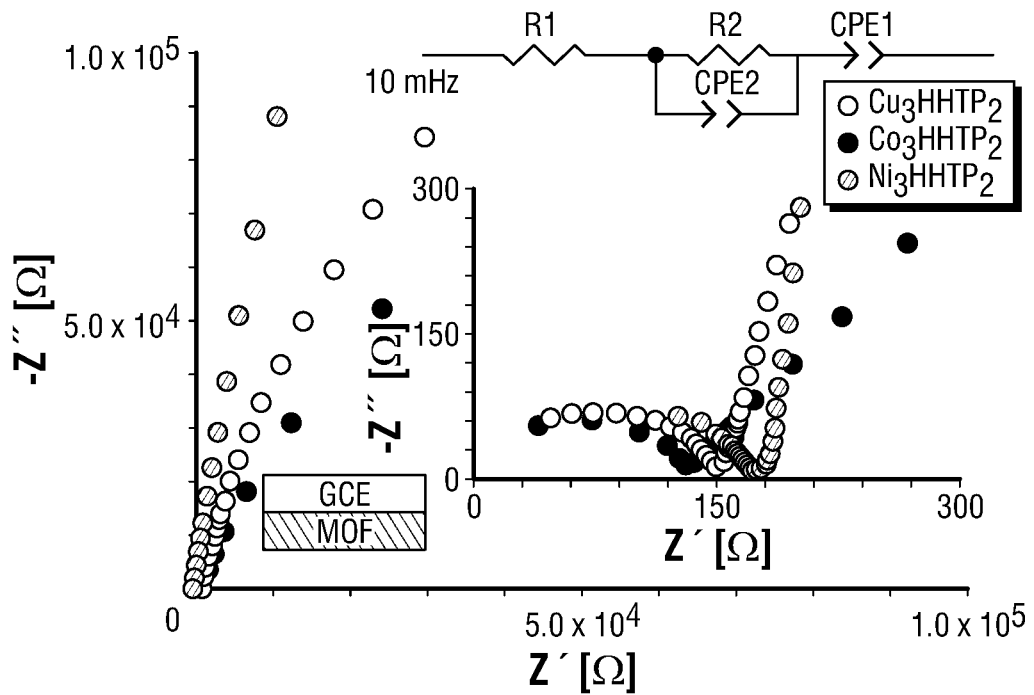
FIG. 8A shows electrochemical impedance spectroscopy (EIS) spectra obtained for a drop-cast layer of either $Co_3HHTP_2$, $Ni_3HHTP_2$, or $Cu_3HHTP_2$ MOFs deposited on glassy carbon electrodes.

Example 1.13. Measuring the Charge Transfer Resistance, Capacitance, and Diffusional Impedance of Conductive MOFs Using Electrochemical Impedance Spectroscopy To evaluate ion-to-electron transduction, Applicants dropcasted aqueous suspensions of $M_3HHTP_2$ MOFs on top of glassy carbon electrodes (GCE) to obtain a layered device. In this configuration, electrochemical impedance spectroscopy (EIS) was used to achieve simultaneous measurement of three desirable parameters: i) bulk capacitance, ii) charge transfer resistance, and iii) diffusion-induced impedance. FIG. 8A illustrates the Nyquist plot of the EIS spectrum recorded in 0.1 M KCl solution for three distinct devices (GCE/MOF) that includes GCE electrodes with a drop cast layer of $Co_3HHTP_2$ (blue), $Ni_3HHTP_2$ (green), and $Cu_3HHTP_2$ (red) MOFs. This spectrum (FIG. 8A) exhibits three discrete features: i) a straight line angled at almost 90° exhibiting only slight curvature at lower frequencies characteristic of optimal capacitance; ii) the presence of a partial semicircle in the high-to-intermediate frequency range characteristic of ohmic charge transfer resistance; and iii) lack of Warburg impedance as evidenced by the absence of a line inclined at 45° in the low frequency range.

The straight line angled at almost 90° in the low frequency region (1 Hz-10 mHz; Z': 280.0Ω to 1.2 kΩ) of the Nyquist plot (FIG. 8A) represents the capacitance of the MOF film. The solution resistance (R1) for 0.1 M KCl was estimated at R1=140Ω, and was consistent with the literature. The capacitance of the MOF can be computed from the total impedance of the electrode at low frequency data (1 Hz-10 mHz) in FIG. 8A. Fitting this data with the constant phase element in an equivalent circuit shown in FIG. 8A gave a substantial capacitance of 204.1±2.2 µF and phase value of 0.93 for $Ni_3HHTP_2$ MOF (60±5 µm thickness), 176.6±3.1 µF and phase value of 0.84 for the $Cu_3HHTP_2$ MOF (60±5 µm thickness, FIG. 9), and 157.1±1.7 µF and phase value of 0.75 for $Co_3HHTP_2$ MOF (60±5 µm thickness, FIG. 9).

Since, the CPE phase values indicated the behavior of optimal capacitors (phase value of 1), the units of capacitance (Farads) were used instead. Without being bound by theory, Applicants attribute the large values of recorded bulk capacitance for all studied MOFs to the presence of interconnected nanopores within the MOF lattice that are permeable to the electrolyte, and the presence of a large number of conductive pathways for electron transport within the drop-cast MOF film. These recorded values are within the same order of magnitude as those for conductive polymers, such as PEDOT-PSS (204 µF), or single-walled CNTs (302 µF), and are approximately 10 times lower than one reported for colloidally imprinted mesoporous (CIM) carbon, which was used to fabricate the most stable ion-selective-electrode to this date. The large magnitude of capacitance of CIM carbon could be attributed to the presence of large interconnected mesopores (diameter of ~24 nm) that are readily accessible for the electrolyte diffusion, in comparison to the micropores found in 2D $M_3HXTP_2$ MOFs (M=Cu, Ni and Co; diameter of ~1.8 nM), which define the available surface area, and consequently capacitance of the MOF.

Figure 8B:
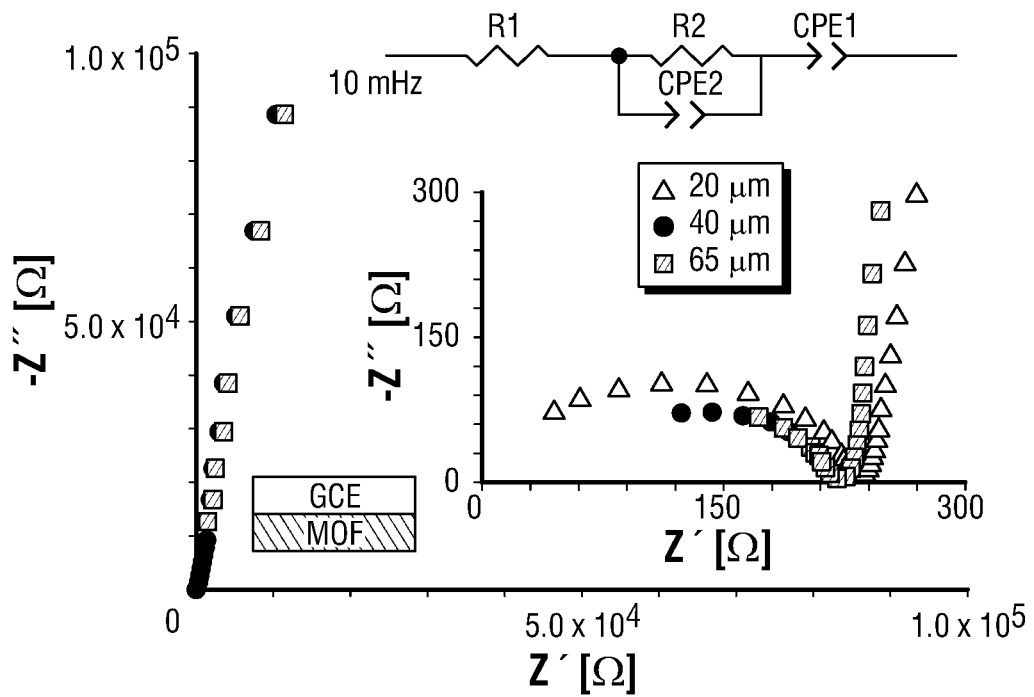
FIG. 8B shows impedance spectra obtained for the glassy carbon electrodes (GCE) coated with different thicknesses of drop cast $Ni_3HHTP_2$ layers: 20±8 μm (red triangles), 40±5 μm (blue circles), and 60±5 μm (black squares). Inset shows a zoomed-in representation of the high frequency impedance data (100 kHz-3 Hz). Inset shows a zoomed-in representation of the high frequency impedance data (100 kHz-3 Hz). In both cases (FIGS. 8A and 8B), the proposed equivalent circuit includes the resistance of the solution (R1), charge transfer resistance (R2), and two constant phase elements (CPE1 and CPE2). Frequency range: 100 kHz-10 mHz; amplitude potential: 0.01 V; solution: 0.1 M KCl.

To examine the dependence of the low frequency capacitance on MOF film thickness, Applicants prepared three electrodes with different thicknesses of the conductive $Ni_3HHTP_2$ MOF layer (20±8 µm, 40±5 µm and 60±5 µm) and performed impedance measurements. Increasing the thickness, and consequently the surface area, of the underlying MOF layer intensified the magnitude of capacitance 152.6±1.0 µF, 154.6±0.7 µF, and 204.1±2.2 µF for thicknesses of 20±8 µm, 40±5 µm and 60±5 µm, respectively), indicating that this parameter represents a bulk capacitance of the studied $Ni_3HHTP_2$ MOFs (FIG. 8B).

The small increase in capacitance of 2.0 µF when the $Ni_3HHTP_2$ MOF layer thickness was varied from 20±8 µm to 40±5 µm may be a function of inhomogeneity of the MOF film deposited on the electrode surface. For example, the drop-casting method can result in the formation of 'islands' of material, which may lead to poor electrical contact between the MOF and electrode, thus diminishing the magnitude of observed capacitance. The increase in capacitance of 49.5 µF with the MOF layer thickness from 40±5 µm to 60±5 µm may arise from the: i) increased amount of MOF material being available for electrolyte wetting; ii) enhanced electrical contact between the layers of drop-cast MOF and the electrode; and iii) increase in the density of states in the MOF material.

Figure 10A:
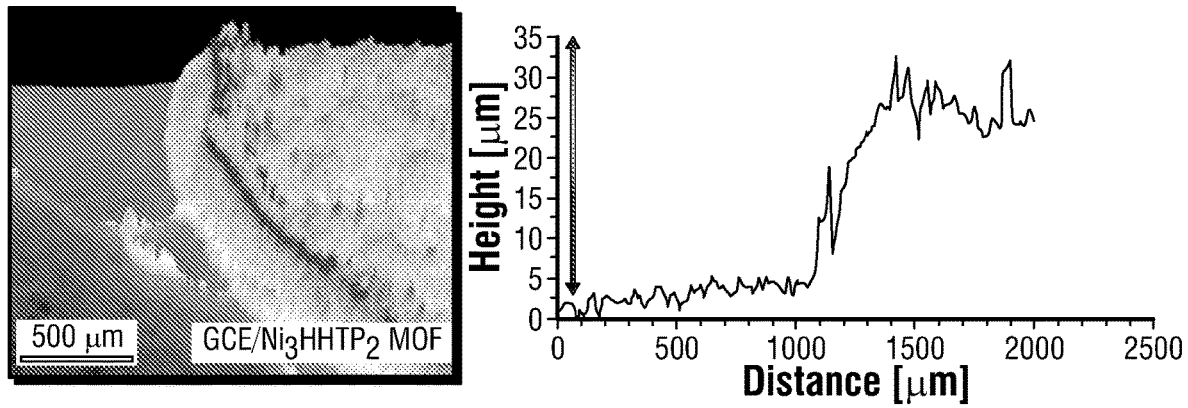
FIG. 10 shows interferometer data for the GCE/MOF electrodes prepared by drop casting 2 μL (FIG. 10A), 5 μL (FIG. 10B) and 10 μL (FIG. 10C) of $Ni_3HHTP_2$-MOF suspension (1 mg/mL) onto a surface of glassy carbon electrodes. The difference in height between the blue and red regions were used to calculate the thickness of the MOF layer.
Figure 10B:
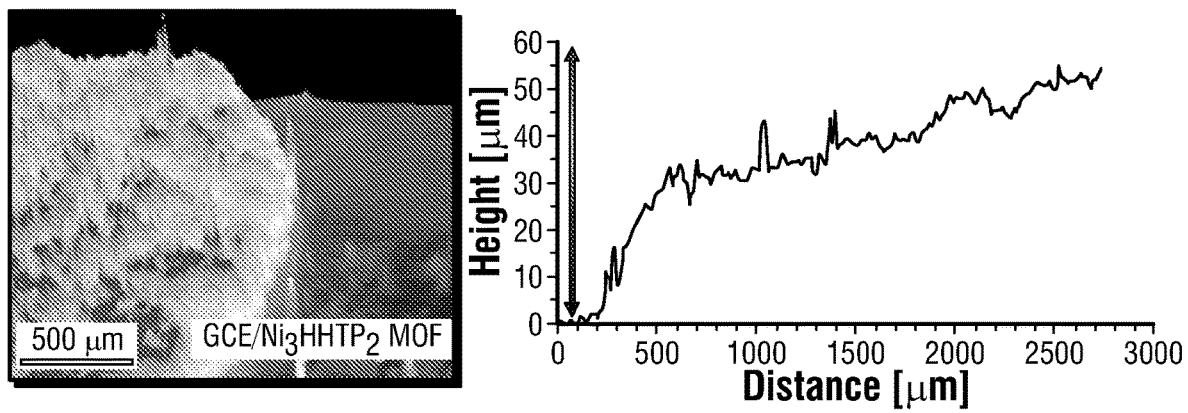
Figure 10C:
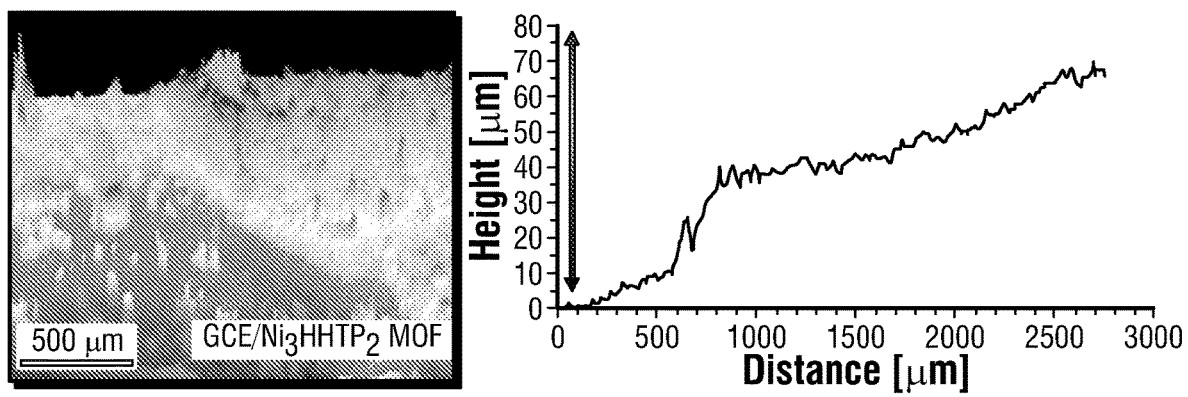

The presence of small impedance in the high-to-intermediate frequency region (100 kHz to 3 Hz; Z': 44.0Ω-250.0Ω) characterized by the partial semicircle in FIG. 8B indicated ohmic resistance rather than double-layer capacitance as typically observed for ISEs based on conductive polymers. In this electrode configuration, the magnitude of this resistance varied with the thickness of deposited conductive MOF layer (FIG. 8B inset): increasing the thickness of the MOF layer from 20±8 µm, 40±5 µm, to 60±5 µm diminished the magnitude of recorded impedance from 186 Ω, 95Ω to 35Ω, respectively (FIGS. 8B and 10).

These findings indicate that conductivity of a MOF is the major contribution to the ohmic resistance since MOF itself can act as electronic conductor. Increasing the thickness of the conductive film would lead to the increase in the number of possible conductive pathways in a layered device, and thus diminish the magnitude of the observed ohmic resistance. These observations are consistent with prior findings, demonstrating that the increase in the thickness of the layer of carbon nanotubes correlates with diminished charge transfer resistance in potentiometric measurements.

Applicants did not observe the characteristic straight line inclined at 45° indicative of Warburg impedance associated with the diffusion-limited transport of electrolyte through the pores of the material. This observation indicates that ions can diffuse into/through the MOF network without the significant contribution from the mass transport resistance.

Figure 11A:
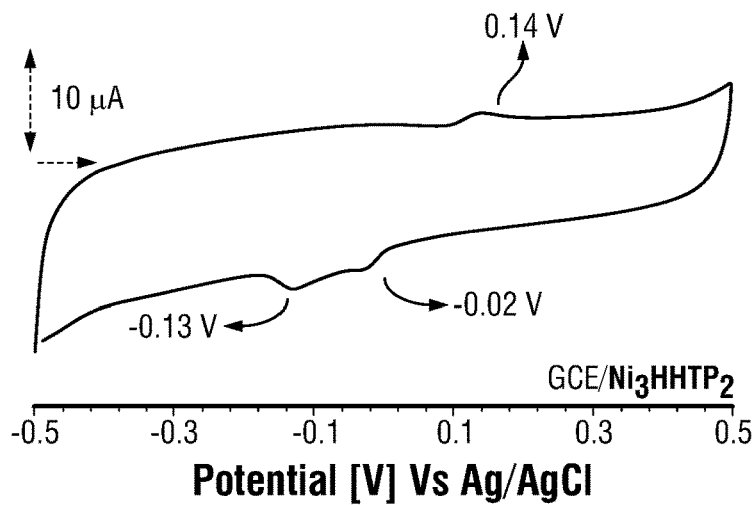
FIG. 11 shows cyclic voltammograms obtained for glassy carbon electrodes coated with 60 μm layers of $Ni_3HHTP_2$ (FIG. 11A), $Co_3HHTP_2$ (FIG. 11B), and $Cu_3HHTP_2$ (FIG. 11C) MOFs. Experimental parameters-scan rate: 50 mV/sec, background electrolyte: 0.1 M KCl and scanning range: −0.5 V to 0.5 V. The arrow indicates scan direction.
Figure 11B:
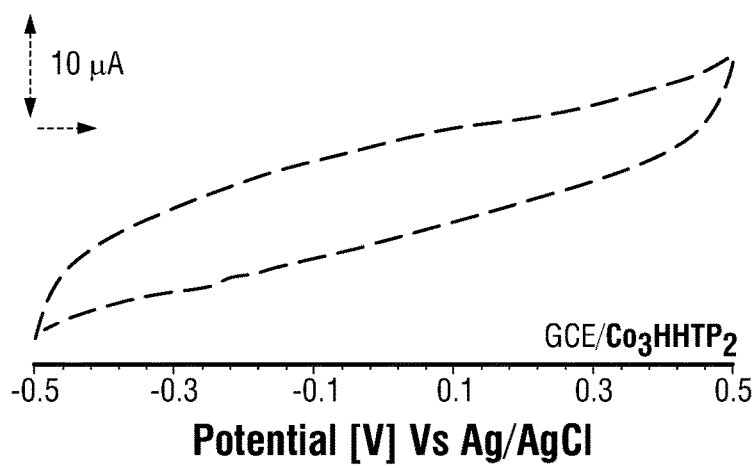
Figure 11C:
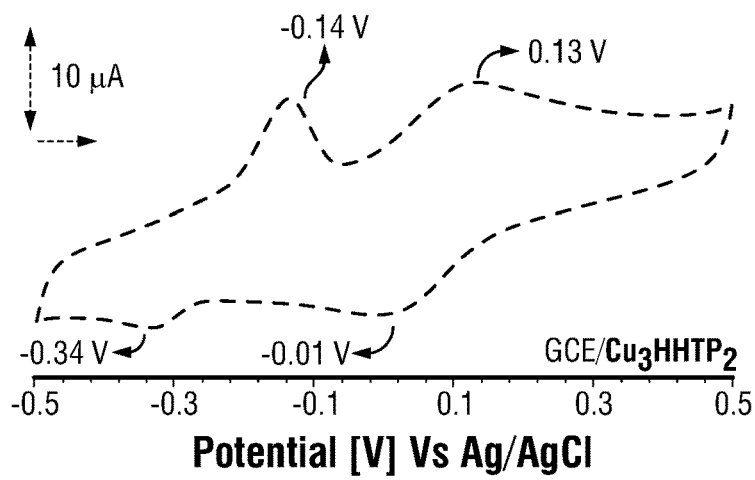

Additional analysis using cyclic voltammetry (FIG. 11 and associated discussion) revealed that the electrochemical behavior of $M_3HHTP_2$ MOFs was influenced by the identity of the metal centers embedded within the MOFs, as evidenced by the characteristically different CV profiles for $Ni_3HHTP_2$, $Cu_3HHTP_2$ and $Co_3HHTP_2$ MOFs (FIG. 11). The observed voltammetric behavior may be explained by the redox activity of HHTP ligand that can undergo reversible redox transformations between catechol, semiquinone, and quinone forms. Given that MOFs exhibit permanent porosity, changes in the cumulative pore volume as a function of the MOF layer thickness may be further manifested by the unique voltammetry of these materials.

Without being bound by theory, Applicants hypothesize that the electrochemical double layer charging, characterized by the rectangular shape of the potential-current response, plays a role in the capacitive behavior of $Ni_3HHTP_2$ MOF and $Co_3HHTP_2$-based ISEs. Moreover, the presence of reversible redox peaks in the cyclic voltammograms of $Cu_3HHTP_2$/GCE electrodes, together with large capacitive behavior, as confirmed with EIS measurements, may indicate that the redox pseudo-capacitance is the dominant charge-storage mechanism in $Cu_3HHTP_2$ MOFs. The presence of small redox peaks in the CV of $Ni_3HHTP_2$ MOFs may also indicate partial contribution of redox pseudo-capacitance to the total capacitance in $Ni_3HHTP_2$ MOF, thus providing highest capacitance amongst all studied $M_3HHTP_2$ MOF.

Figure 12:
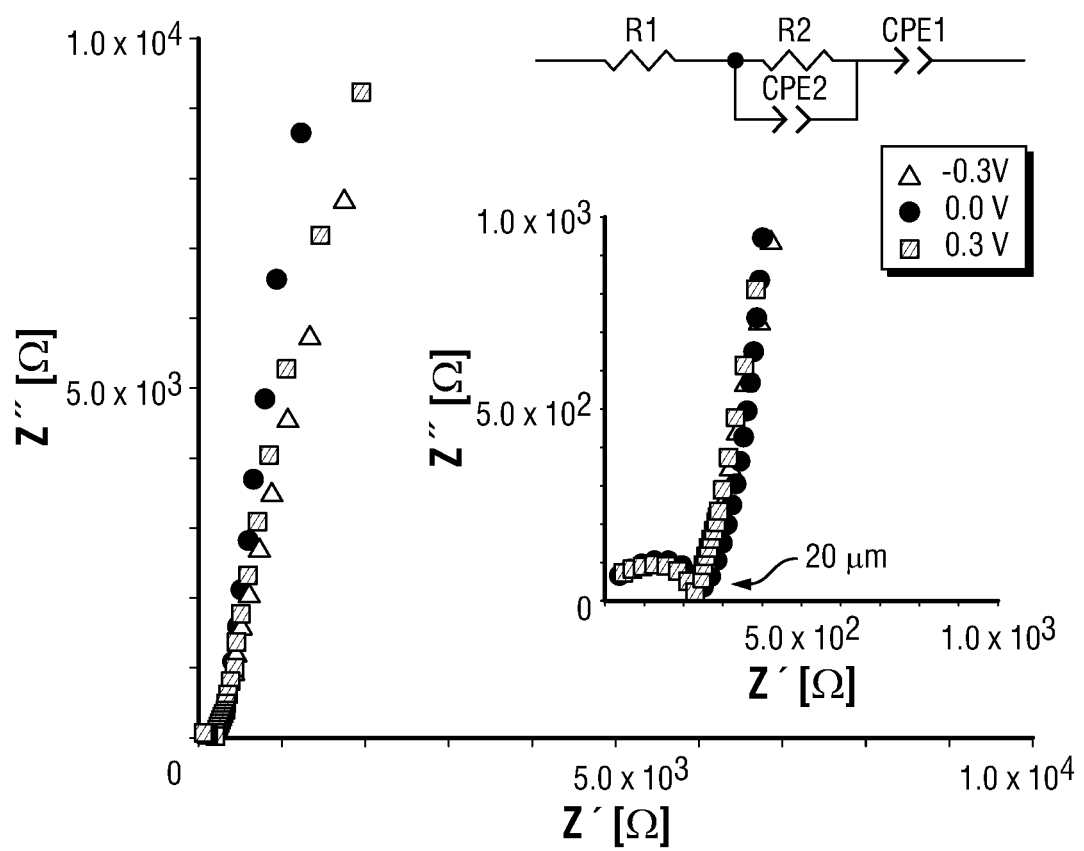
FIG. 12 shows on the left panel impedance spectrum obtained for glassy carbon electrodes at three different applied potenitals (0.0 V—blue circles; 0.3 V—black squares; and −0.3 V red triangles) with drop cast $Ni_3HHTP_2$ MOF layer (2 μL aliquot of MOF solution—20 μm thickness). The right panel shows a zoomed in representation of the high frequency impedance data for the same electrode configuration (100 kHz-3 Hz). No significant difference in response characteristics was observed for the studied electrodes. This demonstrates that the total capacitance of the system is independent of the faradic process observed during cyclic voltammetry measurements. Frequency range: 100 kHz-10 mHz; amplitude potential: 0.01 V; solution: 0.1 M KCl.

To examine whether the presence of the faradaic process influences the impedance response of the MOFs, Applicants performed EIS measurements at three different potentials (−0.3 V, 0.0 V, and 0.3 V) for $Ni_3HHTP_2$. The change in magnitude of the applied potential did not significantly influence the outcome of the impedance measurements, indicating the recorded capacitance to be independent of the redox processes observed in cyclic voltammetry (FIG. 12). Taken together, these results confirm that conductive MOF-based materials possess substantial capacitance, ohmic resistance, and charge transfer characteristics suitable for serving the function of ion-to-electron transducers in ISEs, and satisfy the first major criteria in SCE development.

Figure 13A:
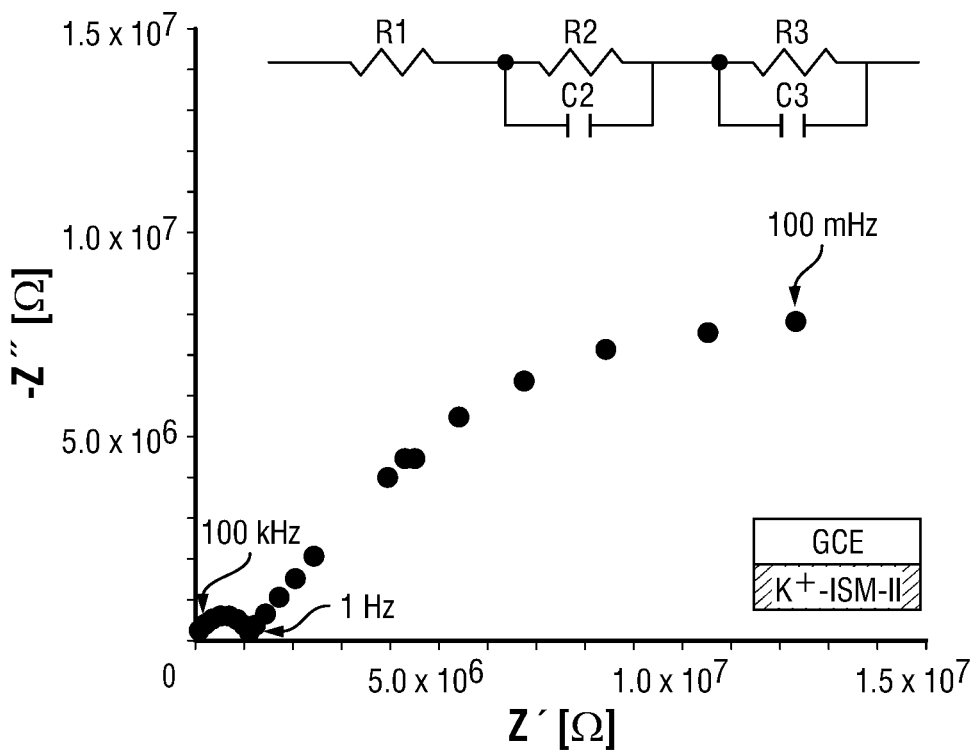
FIG. 13 shows the impedance spectra of potassium ion-selective membranes ($K^+$-ISM-II) deposited onto bare glassy carbon electrode (FIG. 13A) and the same $K^+$ ISM-II deposited on top of $Ni_3HHTP_2$ MOF/GCE substrate (FIG. 13B). Inset demonstrates zoomed in impedance response at high frequency spectral region. The equivalent circuits used for fitting impedance data are shown in the top right corner of each presented spectrum. Frequency range: 100 kHz-10 mHz; amplitude potential: 0.1 V; solution: 0.1 M KCl.
Figure 13B:
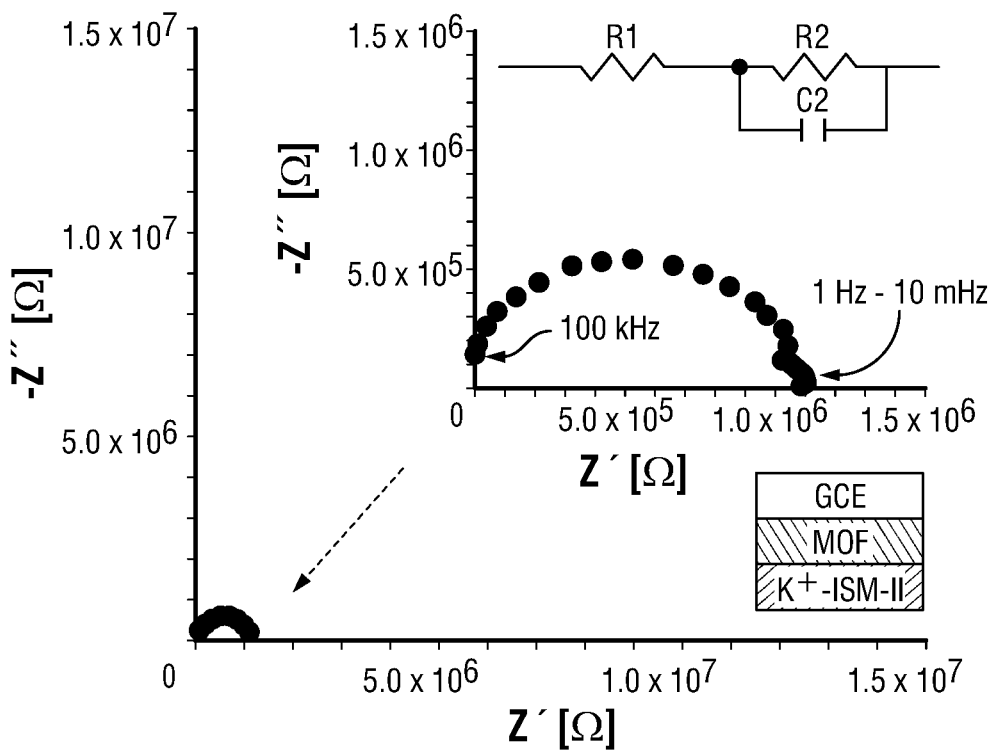

Example 1.14. Quantifying the Efficiency of Ion-to-Electron Transduction by Integrating Conductive MOFs into Solid-State Ion-Selective Electrode Devices Applicants focused subsequent experimental efforts on the use of $Ni_3HHTP_2$ for the development of stable ISEs due to its highest bulk capacitance that would facilitate ion-to-electron transduction and provide substantial signal stability during potentiometric measurements. To assess the function of conductive MOFs as ion-to-electron signal transducers in potentiometry, Applicants used impedance measurements to compare the electrochemical performance of two device configurations fabricated by sequential drop casting of distinct layers (FIG. 13). The first device configuration involved the direct deposition of the $K^+$-ISM-II on top of glassy carbon electrode (GCE) to create a two-layer device: $GCE/K^+$-ISM-II (FIG. 13A). The second device configuration employed a $Ni_3HHTP_2$ MOF thin film sandwiched between the GCE and $K^+$-ISM-II to create a three-layer device ($GCE/MOF/K^+$-ISM-II, FIG. 13B) capable of enhanced signal transduction.

For the control $GCE/K^+$-ISM-II configuration (FIG. 13A), impedance measurements revealed the presence of a small semicircle at high frequency range followed by the partial arc at lower frequencies (1 Hz-10 mHz; Z': 1.1 MΩ to 12.3 MΩ). Applicants attributed the presence of the high-frequency semicircle (100 kHz-1 Hz; Z': 60.0Ω to 1.0 MΩ) to the bulk resistance in parallel with geometric capacitance of the drop-casted $K^+$-ISM-II. The bulk membrane resistance (1.0±0.2 MΩ) was extracted from the impedance model shown in FIG. 13A. The second 'larger' partial semicircle originated from the large charge transfer resistance at the interface between the ion-selective membrane and glassy carbon electrode. This second spectral feature indicated ineffective of ion-to-electron transduction in the simple two-layer $GCE/K^+$-ISM-II device configuration.

In contrast to FIG. 13A, the impedance spectrum recorded for the $GCE/MOF/K^+$-ISM-II devices (FIG. 13B) showed only one high-frequency spectral component (100 kHz-1 Hz; Z': 59.0Ω to 1.1 MΩ), which Applicants attributed to the bulk properties (resistance in parallel with geometric capacitance) of the ion-selective membrane (1.0±0.3 MΩ). Notably, the absence of a second semicircle in the low frequency region of the spectrum for the $GCE/MOF/K^+$-ISM-II devices was characteristic of the low charge transfer resistance at ISM/MOF interface. In addition, cyclic voltammetry of both device architectures could not be studied due to the high resistance of the PVC-based ion-selective membrane. The stark contrast between FIGS. 13A and 13B suggests that the ion-to-electron signal transduction at all interfaces, as well as the phase-transfer of ions through the solution/membrane interface in $GCE/MOF/K^+$-ISM-II device configuration, proceeded in a reversible manner and were kinetically fast. Thus, EIS measurements confirmed that the presence of the conductive MOF between the solid contact and the ion-selective membrane strongly facilitates ion-to-electron signal transduction.

Figure 14:
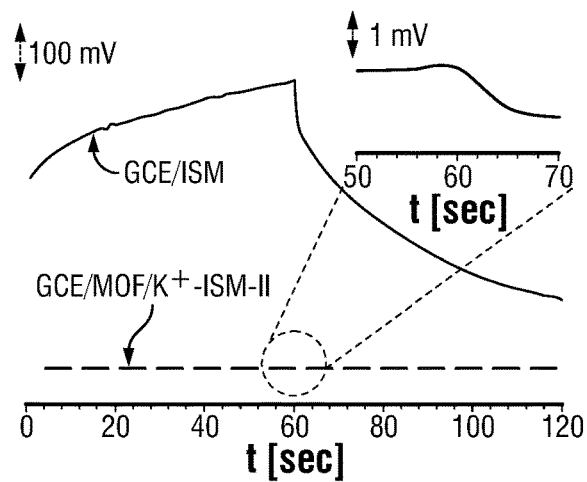
FIG. 14 shows chronopotentiograms obtained during the analysis of $K^+$-ISM-II based ion-selective electrodes (ISEs) under polarizing conditions. The top panel shows $K^+$-ISM-II applied directly onto a GCE contact without the MOF as undelaying conductive layer. The bottom panel shows a $GCE/Ni_3HHTP_2$ MOF/$K^+$-ISM-II electrode. The inset demonstrates a close-up of response obtained for the $GCE/Ni_3HHTP_2$ MOF/$K^+$-ISM-II. Experimental conditions: applied current +1 nA for 60 seconds followed by −1 nA for 60 seconds. Background solution was 0.1 M KCl.

Example 1.15. Potential Stability of MOF-Containing Potentiometric Sensors Under Polarizing Conditions Applicants employed constant current chronopotentiometry to evaluate the ability of a representative 2D MOF to provide a non-polarizable interface with high exchange current density, and thus to improve signal stability of potentiometric devices. High signal stability, with ideally no potential drift, is particularly important in applications where the continuous monitoring of an analyte over an extended time period is required. Larger potential drifts (_1 mV/h) can be tolerated during the short-term measurements if the electrodes undergo frequent calibrations. To make this assessment, Applicants compared the potential stability under polarizing conditions of two layered device configurations previously examined by EIS: a control $GCE/K^+$-ISM-II and $GCE/MOF/K^+$-ISM-II. Each device was firstly subjected to +1 nA for 60 sec, after which the direction of the current was reversed for the same time interval (−1 nA, 60 sec), and the potential response was recorded. The potential versus time curves (E/t) for the analysed $GCE/K^+$-ISM-II and $GCE/MOF/K^+$-ISM-II devices are shown in FIG. 14. The potential jump that occurs during the reversal of applied current can be used directly to estimate the total resistance of the electrode (Eq. 1)

$$R = E/I \qquad (Eq.\ 1)$$

In this equation, R represents the resistance of the electrode, E is potential of the electrode and I is the current. The bulk membrane resistance calculated from chronopotentiometric experiments was in close agreement with data extracted from EIS measurements (1.0 MΩ for GCE/MOF/$K^+$-ISM-II electrodes).

The polarizability of the electrodes was further evaluated from the slope (potential over time) at longer times (FIG. 14). In the absence of MOF layer (GCE/ISM), a substantial drift of 2615.0±13.9 μV/sec, under polarizing conditions (−1 nA applied), was observed. While, the layer of conductive MOF in the GCE/MOF/K+-ISM-II configuration significantly stabilized the electrode resulting in the drift of 14.6±1.1 μV/sec. The potential drift (14.6±1.1 μV/sec) estimated from constant-current chronopotentiometry under polarizing conditions may also be related to the low frequency capacitance of a solid-contact. Using the E/t curves to calculate the capacitance of the electrode (E/t=i/C) gave a substantial capacitance for $GCE/MOF/K^+$-ISM-II devices (60.6±1.4 μF), that was 150 times larger than that of GCE/$K^+$-ISM-II (0.4±0.1 μF). These results indicate that the MOF conductive layer contributes significantly towards the potential stability of tested devices under polarizing conditions, and that the stability of fabricated electrodes is on par with other ISEs based on graphene (14.6 μV drift with 1 nA applied) or single-walled CNTs (17.0 μV drift with 1 nA applied).

Example 1.16. Potentiometric Ion Sensing Using Conductive MOFs as Ion-to-Electron Transducers To demonstrate the applicability of conductive MOFs as the ion-to-electron transducers in the development of solid-state ion-selective electrodes in this proof-of-concept Example, Applicants fabricated and evaluated the performance of potassium (model cation) and nitrate (model anion) potentiometric sensors. Routine monitoring of blood potassium is one of the examples where potassium selective electrodes can make the most significant impact, while the detection of $NO_3^-$ has biological and environmental significance.

Figure 15A:
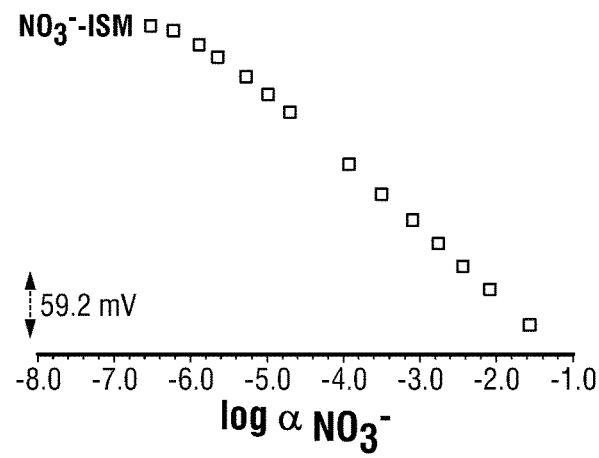
FIG. 15 shows a potentiometric response of GCE/MOF/ISM devices to model anions and cations. In this electrode configuration, the $Ni_3HHTP_2$ MOF was drop-cast directly onto the glassy carbon electrode and then the resulting conductive layer was covered with either $NO_3^-$-ISM (red squares) (FIG. 15A), $K^+$ ISM-I (blue diamonds) (FIG. 15B), and $K^+$-ISM-II (green triangles) (FIG. 15B) selective polymeric membrane. For the $K^+$ ISM-I electrodes a near-Nernstian slope of 58.2±1.0 mV decade$^{-1}$ and a nanomolar limit of detection (LODs) of 5.01±0.01×10$^{-7}$ M was observed. The $K^+$-ISM-II exhibited a near-Nernstian slope of 54.1±1.0 mV decade$^{-1}$ with LODs found at 6.76±0.03×10$^{-6}$ M, while 56.3±0.5 mV decade$^{-1}$ slope with LODs of 6.31±0.01×10$^{-7}$ M was obtained for $NO_3^-$-ISM electrodes.
Figure 15B:
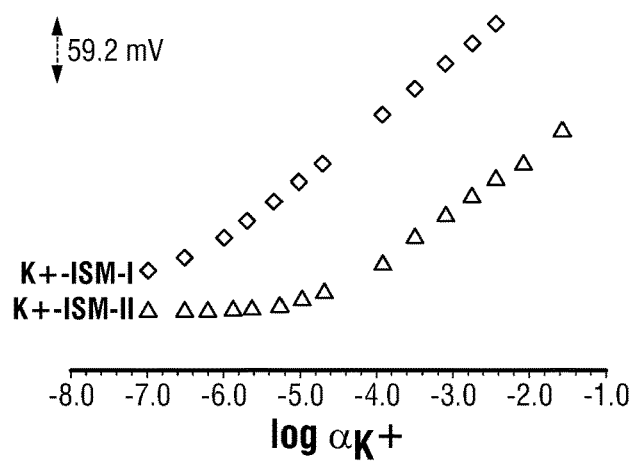
Figure 16:
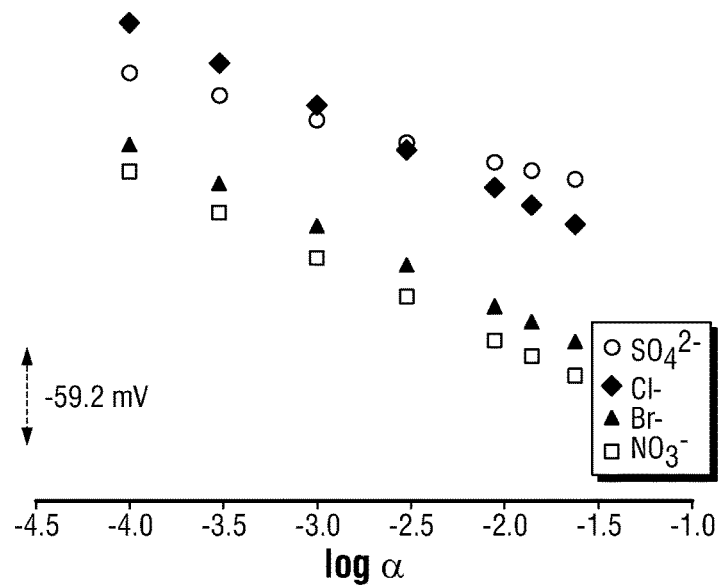
FIG. 16 shows potentiometric responses of glassy carbon electrodes coated with $Ni_3HHTP_2$ and then covered with the $NO_3^-$-ISM for various cations: $Cl^-$ (green diamonds), $NO_3^-$ (red squares), $Br^-$ (black triangles) and $SO_4^{2-}$ (grey circles).

Applicants employed the electrode configuration in which the MOF layer is drop-casted on the glassy carbon electrode and then covered with an ion-selective membrane to produce a potentiometric sensor. The potentiometric responses of fabricated $NO_3^-$-ISM electrodes that includes of $Ni_3HHTP_2$ MOF sandwiched between GCE and $NO_3^-$-ISM (GCE/MOF/$NO_3^-$-ISM) are depicted in FIG. 15. Near-Nernstian responses (56.3±0.5 mV decade$^{-1}$) were observed for all tested electrodes with the detection limits (6.31±0.01×10$^{-7}$ M) and selectivity coefficient values closely matching those reported for other solid-contact electrodes equipped with ISM for nitrate detection (FIGS. 15-16 and Table 1).

TABLE 1

Selectivity coefficients and experimental slopes obtained for K$^+$-ISM-II containg $Ni_3HHTP_2$ MOF as underlying conductive layer. (K$^+$ slope = 55.4 ± 0.8 mV).

| Cation | $Ca^{2+}$ | $Na^+$ | $NH_4^+$ |
|---|---|---|---|
| log $K^{POT}$ | −3.28 ± 0.02 | −0.86 ± 0.10 | −0.82 ± 0.05 |
| Slope [mV] | 24.3 ± 1.9 | 55.7 ± 1.7 | 54.4 ± 2.1 |

Figure 17:
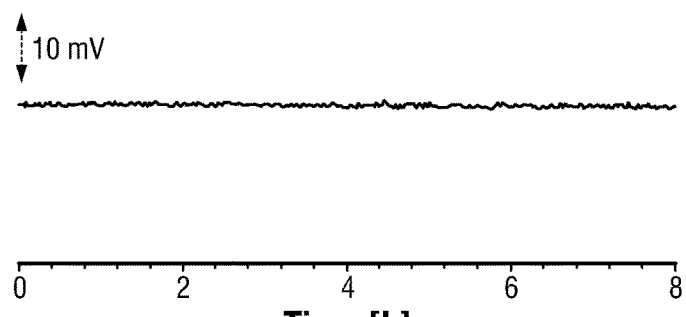
FIG. 17 shows short term stability of GCE/MOF/$NO_3^-$-ISM immersed in 1.0×10$^{-3}$ M $NH_4NO_3$. Good potential stability with minimal drift was recorded for the electrodes with $Ni_3HHTP_2$ used as ion-to-electron transducer. The electrodes were prepared according to the protocols described in the Experimental section.
Figure 18:
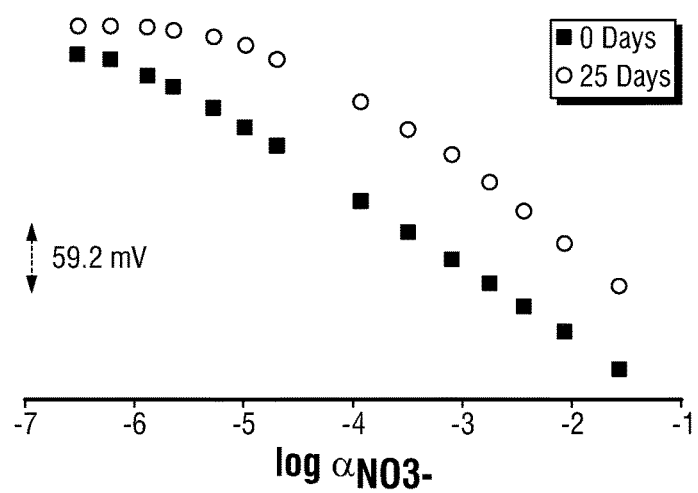
FIG. 18 shows long term stability of GCE/MOF/$NO_3^-$-ISM electrodes immersed in 1.0×10$^{-3}$ M $NH_4NO_3$. Minimal change in standard potential (~10 mV±3) was recorded for the electrodes with $Ni_3HHTP_2$ used as ion-to-electron transducers. The electrodes were stored in ultra-pure water for 25 days prior to the potentiometric experiments. The deterioration in the detection limits of these electrodes could be attributed to leaching of membrane components from the polymeric matrix into the sample solution during storage. The electrodes were prepared according to the protocols described in the Experimental section.
Figure 19:
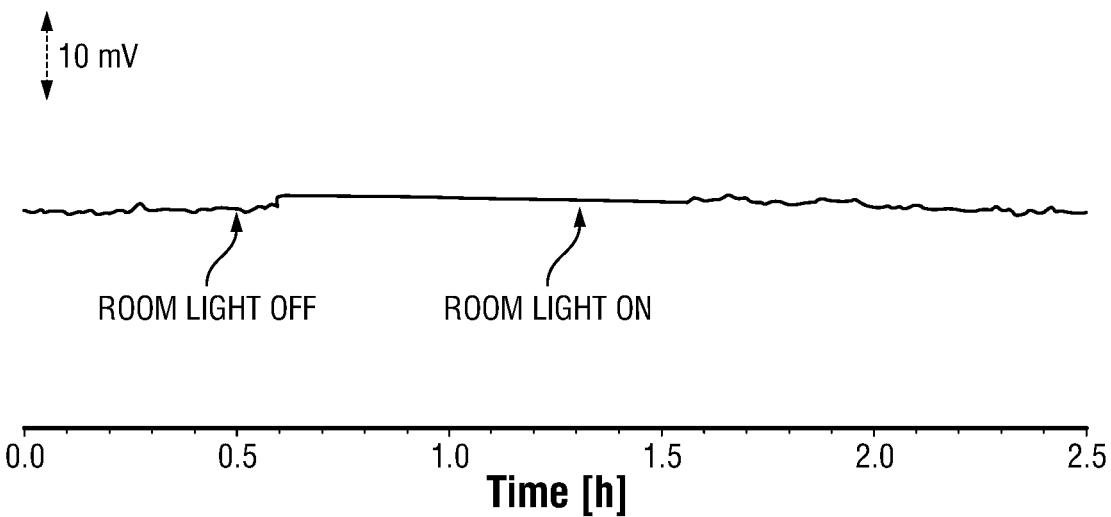
FIG. 19 shows light stability of GCE/MOF/$K^+$-ISM-II electrodes immersed in 1.0×10$^{-3}$ M KCl. Minimal potential drift was observed for the electrodes with $Ni_3HHTP_2$ used as ion-to-electron transducers upon switching the room lights on and off.

Moreover, tested electrodes demonstrated good short-term (11.1±0.5 μA/h) and long-term potential stability (15 mV change in recorded standard potential, E°, after 25 days) and exhibited minimal (<1 mV) photosensitivity (FIGS. 17-19). In particular, the potential drift estimated from continuous potentiometric measurements for 8 h was 11.1±0.5 μA/h, thus confirming optimal potential stability of resulting GCE/MOF/ISM electrodes, whose magnitude is comparable to ISEs based on 3DOM carbon (11.7 μA/h) or graphene (12.6 μA/h).

Figure 20:
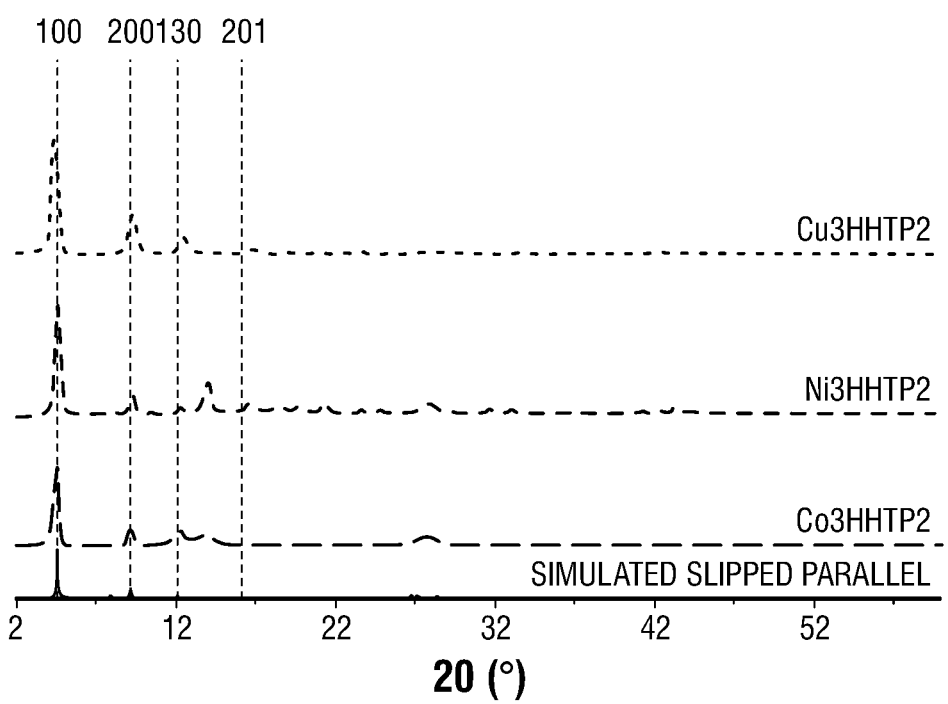
FIG. 20 shows experimental (colored) and simulated slipped parallel powder X-Ray diffraction patterns without the presence of interpolated layer obtained for $Cu_3HHTP_2$, $Ni_3HHTP_2$ and $Co_3HHTP_2$ MOFs after potentiometric measurements with $K^+$-ISM-II electrodes. The observed pXRD patterns of $Cu_3HHTP_2$, $Ni_3HHTP_2$, and $Co_3HHTP_2$ MOFs matched those of bulk powder and are consistent with previous reports. These findings indicate that the crystallinity of the MOF is retained both during and after analytical measurements.

In addition, Applicants observed that the crystallinity of $M_3HHTP_2$ MOFs (M=Cu, Ni and Co) was retained after potentiometric analysis with MOFs used as ion-to-electron transducers (FIG. 20). Applicants' findings from potentiometric and impedance measurements demonstrate that conductive MOFs can be successfully used as signal transducers for the development of potentiometric sensors for the detection of cations and anions with promising performance characteristics.

Figure 21A:
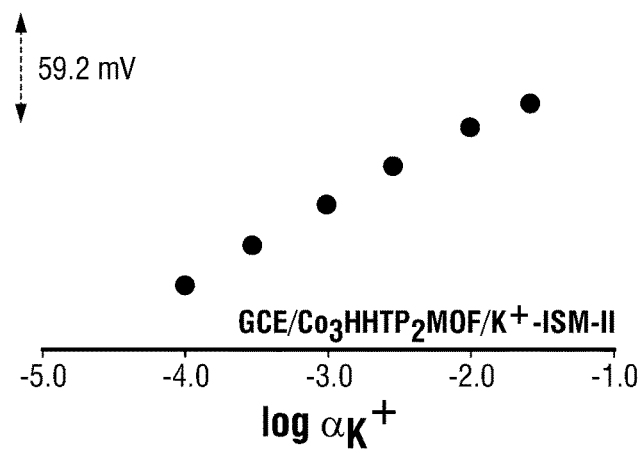
FIG. 21 shows potentiometric responses of $M_3HHTP_2$ based ISE for $K^+$-ISM-II. In this electrode configuration, either 10 μL of $Ni_3HHTP_2$ (FIG. 21A), $Co_3HHTP_2$ (FIG. 21B) or $Cu_3HHTP_2$ (FIG. 21C) suspensions were drop cast directly onto the glassy carbon electrode and then the resulting conductive layer was covered with potassium selective polymeric membrane (10 μL of the $K^+$-ISM-II membrane solution as described in the 'Preparation of $K^+$ and $NO_3^-$ sensing membranes'). The slopes obtained for the $Ni_3HHTP_2$ MOF/$K^+$-ISM-II, $Co_3HHTP_2$ MOF/$K^+$-ISM-II, and $Cu_3HHTP_2$ MOF/$K^+$-ISM-II were 55.1±1.2 mV/decade, 56.2±1.0 mV/decade and 52.6±2.1 mV/decade, respectively.
Figure 21B:
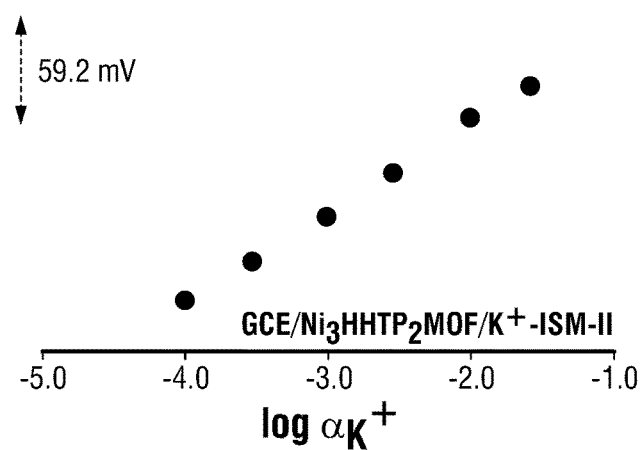
Figure 21C:
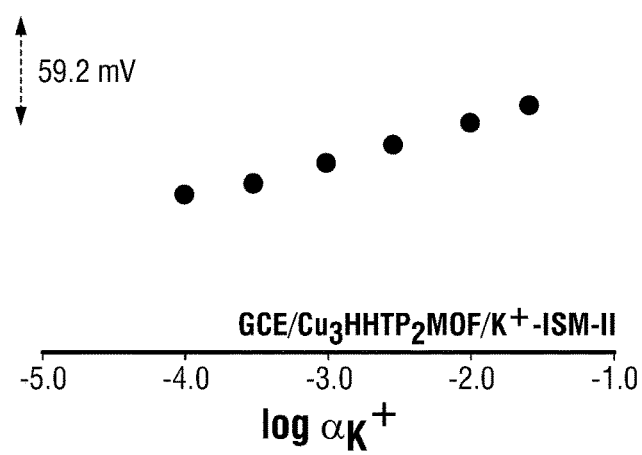

To demonstrate the general applicability of conductive MOFs as ion-to-electron transducers in potentiometric detection, Applicants fabricated K$^+$-ISM-II electrodes containing $Ni_3HHTP_2$ MOF sandwiched between GCE and K$^+$-ISM-II (GCE/MOF/K$^+$-ISM-II). The calibration curve for potassium ions (FIG. 15B, green triangles) displayed a near-Nernstian slope of 54.1±1.0 mV decade$^{-1}$ and a micromolar limit of detection of 6.76±0.03×10$^{-6}$ M. Similar linear response range was obtained for the three MOF analogues included in this Example, demonstrating the general applicability of conductive MOFs in the development of ISEs (FIG. 21).

Performance characteristics of GCE/MOF/K$^+$-ISM-II devices were similar to other potentiometric devices employing analogous K$^+$-ISM-II ion-selective membranes. Small differences between the reported detection limits of devices with similar ISM and those reported here may arise from the presence of transmembrane ion-fluxes (from the inner filling solution to the sample) that are readily observed in ISEs based on the liquid contact.

To confirm that the response characteristics (slope, detection limits) of potassium sensors were primarily a function of the ion-selective membrane, rather than the choice of the ion-to-electron transducer, Applicants performed additional sensing experiments by using valinomycin as an ionophore within the ion-selective membrane to generate K$^+$-ISEs-I (FIG. 15). Applicants observed a near-Nernstian slope of 58.2±1.0 mV decade$^{-1}$ and a nanomolar limit of detection of 5.01±0.01×10$^{-7}$ M, which showed an improvement in detection limit compared to potentiometric devices employing this ionophore in conjunction with using single-walled CNTs (5.00×10$^{-6}$ M), graphene (6.31×10$^{-7}$ M) or CIM carbon (3.98×10$^{-6}$ M) as ion-to-electron transducers.

Figure 22:
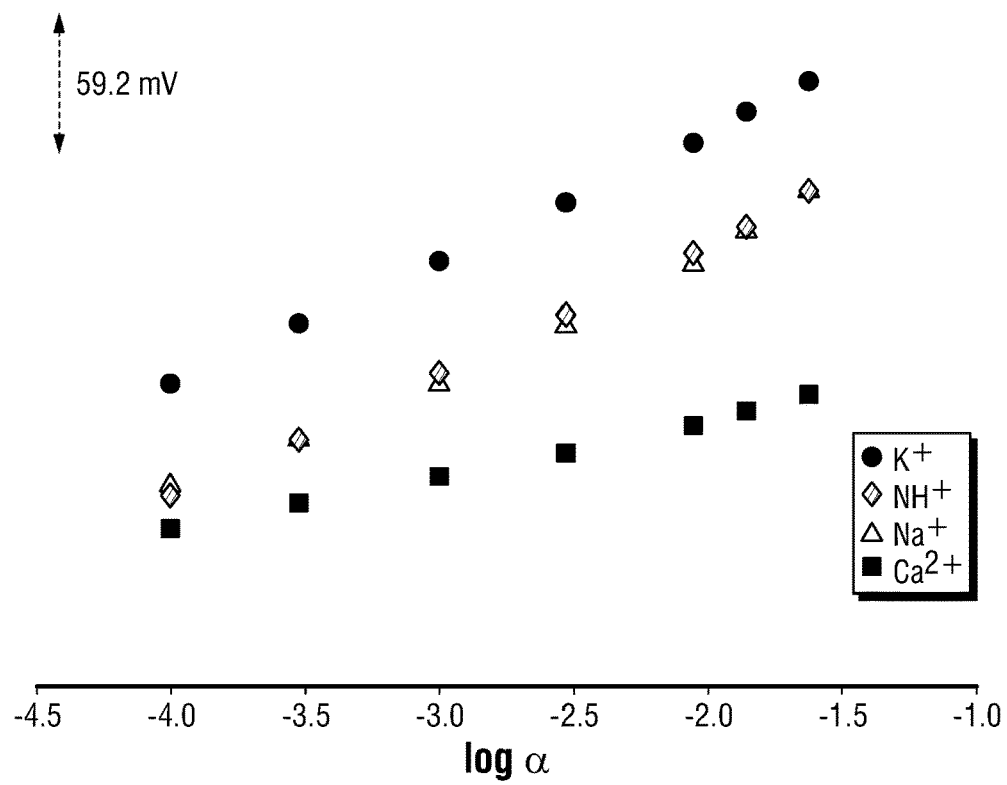
FIG. 22 shows potentiometric responses of glassy carbon electrodes coated with $Ni_3HHTP_2$ and then covered with the $K^+$-ISM-II for various cations: $K^+$ (blue circles), $NH_4^+$ (green diamonds), $Na^+$ (black triangles) and $Ca^{2+}$ (grey squares).

The selectivity of potentiometric K$^+$ sensors (GCE/MOF/K$^+$-ISM-II and GCE/MOF/K$^+$-ISM-I) was characterized using an unbiased separate solution method. Each device was firstly conditioned in a solution of less discriminated interfering ions prior to the performed potentiometric measurements. Table 2 and FIG. 22 show the selectivity values and corresponding experimental slopes obtained for Na$^+$, $NH_4^+$ and $Ca^{2+}$ (log $K_{POT}$–$Ca^{2+}$: −3.28±0.02, Na$^+$: −0.86±0.10, and $NH_4^+$-0.82±0.05).

TABLE 2

Selectivity coefficients and experimental slopes obtained for $NO_3^-$-ISM electrodes containg $Ni_3HHTP_2$ MOF as underlying conductive layer ($NO_3^-$ slope = −56.3 ± 0.5 mV).

| Cation | $SO_4^{2-}$ | $Cl^-$ | $Br^-$ |
|---|---|---|---|
| log $K^{POT}$ | −3.15 ± 0.01 | −1.82 ± 0.01 | −0.48 ± 0.05 |
| Slope [mV] | −28.7 ± 0.9 | −55.2 ± 1.3 | −55.0 ± 1.0 |

Additional potentiometric analysis of GCE/MOF/K$^+$-ISM-I electrodes revealed good match with theoretically expected selectivity levels (log $K_{POT}$–$Ca^{2+}$: −5.46±0.09, Na$^+$: −4.10±0.01, and $NH_4^+$: −2.12±0.05; Table 3 and FIG. 23). Together, these findings indicate that 2D conductive MOFs can be used to construct sensitive and selective potentiometric sensors with improved signal stability.

TABLE 3

Selectivity coefficients and experimental slopes obtained for K$^+$-ISM-I containg $Ni_3HHTP_2$ MOF as underlying conductive layer. (K$^+$ slope = 57.3 ± 0.2 mV).

| Cation | $Ca^{2+}$ | $Na^+$ | $NH_4^+$ |
|---|---|---|---|
| log $K^{POT}$ | −5.46 ± 0.09 | −4.10 ± 0.01 | −2.12 ± 0.05 |
| Slope [mV] | 25.1 ± 0.9 | 51.0 ± 0.5 | 55.9 ± 1.0 |

Example 1.17. Assessing the Potential Stability of GCE/MOF/K$^+$-ISM-II and Devices GCE/MOF/$NO_3^-$-ISM Using the Aqueous Layer Test A formation of the undesirable water layer at the membrane/electrode interface can cause substantial signal instability (stability condition iv) and electrode drift, which hinders the application of SCEs for long-term sample analysis. Such a water layer can act as a small reservoir that can undergo ion-exchange with ions from the sample solution contacting an ion-selective membrane. In that instance, the transmembrane ion flux from the water layer into the sample solution can diminish the performance of the electrode in terms of detection limits through the contamination of membrane/solution phase boundary. Recent experimental reports demonstrated that ISEs containing either 3DOM carbon or PEDOT/PSS conductive polymer as ion-to-electron transducers possessed increased signal stability during potentiometric measurements due to large interfacial capacitance and high hydrophobicity of the transducer layer. Applicants thus hypothesized that the hydrophobicity of 2D MOFs employed in this Example would inhibit the formation of water layer at the membrane/electrode interface, and thus minimize the effect of transmembrane ion-fluxes.

To assess the degree of water layer formation at the electrode/membrane interface, Applicants performed contact angle measurements and carried out a potentiometric water layer test. Contact angle measurements were performed by dropping 1.0 μL water aliquot onto the surface of MOF coated glassy carbon electrode (MOF layer thickness-60 μm; membrane thickness—110±10 μm). The contact angle obtained for this electrode configuration was 74±0.4°, indicating substantial hydrophobicity of the studied surface (FIG. 25) in contrast to unmodified glassy carbon electrode with contact angle estimated at approximately 50°.

Even though, the observed contact angle is lower than 104° and 132° reported for CIM carbon and PEDOT-$C_{14}$ (tetrakis(pentafluorophenyl)borate), respectively, Applicants anticipated that the extent of water layer formation at the electrode/membrane interface would be minimal giving rise to high signal stability during potentiometric measurements.

Figure 24A:
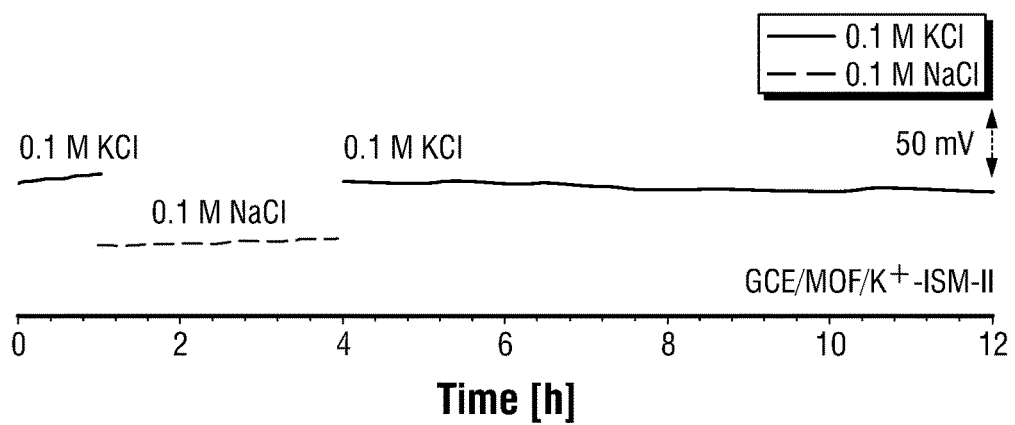
FIG. 24A shows water film tests of solid-contact K+-ISM-II electrodes based on the GCE/MOF/K+-ISM-II configuration. At t=1 h, the primary ion solution (0.1 M KCl) was exchanged to 0.1 M NaCl, and after 3 h, the sample was replaced by the initial solution for 8 h.
Figure 24B:
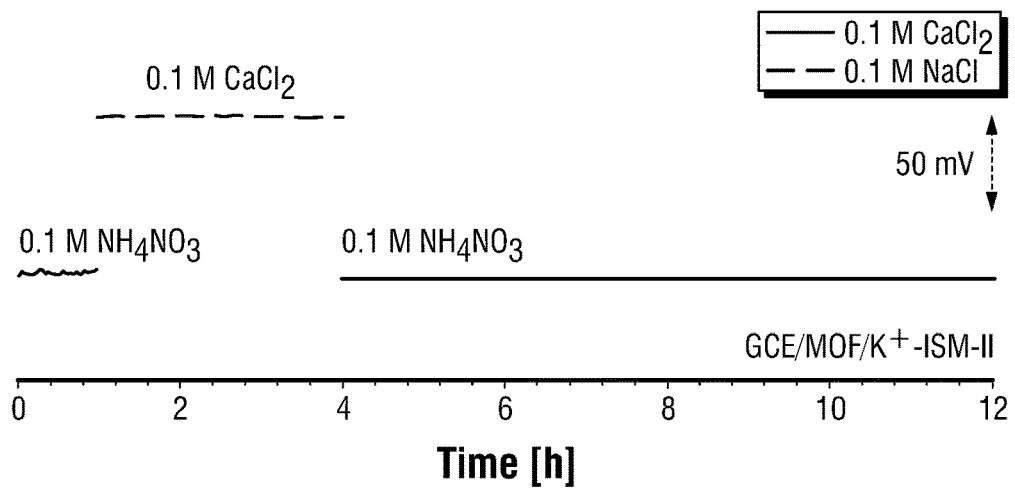
FIG. 24B shows the potentiometric water layer test of GCE/MOF/$NO_3^-$—ISM electrodes. At t=1 h, the primary analyte solution (0.1 M $NH_4NO_3$) was exchanged to 0.1 M $CaCl_2$, and after 3 h, the sample was replaced by the initial solution for 8 h.

A potentiometric water layer test was conducted by placing the GCE/MOF/$NO_3^-$—ISM electrode sequentially into 0.1 M $NH_4NO_3$, 0.1 M $CaCl_2$ and 0.1 M $NH_4NO_3$ solutions. Immediately after the primary solution was replaced by 0.1 M $CaCl_2$, a large change in the electromotive force was observed directly reflecting the selectivity of the electrodes (FIG. 24A). The same electrode also in 0.1 M $CaCl_2$ showed minimal potential drift, indicating that the $NO_3^-$ ions at the membrane/electrode interface (water layer) were not replaced to a significant extent by $Cl^-$ ions. After placing the electrodes back into the primary ion solution, the MOF-based devices exhibited very small potential drift, demonstrating that the extent of water layer formation was significantly reduced for the ISEs utilizing MOF as a conductive layer in between the polymeric membrane and solid contact. Similarly, potentiometric water test of GCE/MOF/$K^+$-ISM-II electrodes (FIG. 24B) revealed only very small potential drift upon changing from primary ion solution (0.1 M KCl) to interfering ion solution (0.1 M NaCl) and back to targeted analyte indicating good ability of $Ni_3HHTP_2$ MOFs to minimize the extent of water layer formation at the electrode/ISM interface.

Example 1.18. Summary

In summary, this Example describes the first experimental demonstration of efficient ion-to-electron transduction facilitated by conductive MOFs. This material's property facilitates the implementation of conductive metal-organic frameworks in potentiometric detection. The generality of this approach is established by integrating several analogues of 2D conductive MOFs into solid-state potentiometric devices (coated with ion-selective membrane) to achieve potentiometric determination of $K^+$ and $NO_3^-$ ions in aqueous solutions. The sensors exhibit optimal performance characteristics, including near-Nernstian behavior (54.1-58.2 mV/sec), wide dynamic range (mM-nM), and good signal stability (11.1±0.5 μA/h).

Example 1.19. Additional Data Related to the Characterization of MOFs

FIG. 3 shows scanning electron microscopy and energy dispersive X-ray spectroscopy of $M_3HHTP_2$ materials. FIG. 4 shows powder x-ray diffraction (pXRD) of $M_3HHTP_2$ MOFs. FIGS. 5, 6 and 7 show X-ray photoelectron spectroscopy (XPS) spectra of $M_3HHTP_2$ MOFs, $Ni_3HHTP_2$ MOFs, and $Cu_3HHTP_2$ MOFs, respectively.

The XPS spectra confirmed the presence of O and C along with the respective metals (Co, Cu and Ni) used for the preparation of $M_3HHTP_2$ MOFs and revealed that all materials are charge neutral, similar to other literature reports on the $M_3HITP_2$ MOF analogs. High-resolution XPS analysis further demonstrated that after washing with water and acetone, no traces of the precursors were detected in the $M_3HHTP_2$ MOFs, indicating the absence of potentially charge-balancing counter-ions.

In the high-resolution scan of Co 2p3 regions, Applicants observed two sets of peaks with binding energies of ~780 and ~795 eV, which describe the 2p3/2 and 2p1/2 levels in the theoretically expected 2:1 ratio. Further deconvolution of the 2p3 region revealed the presence of four distinct bands: the peaks at 781.4.2 and 794.1 eV were ascribed to $Co^{II}$, while the peaks found at 785.5 and 802.0 eV were assigned to $Co^{III}$ (28% of $Co^{I}$ and 72% of $Co^{III}$, FIG. 5). These findings indicate mixed valency in $Co_3HHTP_2$ MOFs, which are in good agreement with other studies on the cobalt based MOFs. High-resolution XPS analysis of $Cu_3HHTP_2$ MOFs also showed the presence of two peaks at 932.8 and 934.6 eV, which can be ascribed to $Cu^{I}$ and $Cu^{II}$ centers (55% of $Cu^{I}$, and 45% of $Cu^{II}$), respectively, and similarly to $Co_3HHTP_2$ MOFs, are indicative of mixed valency within the framework (FIG. 7).

The high-resolution scan of the Ni 2p region showed the presence of two peaks with binding energies of ~851 and ~870 eV, were assigned to the 2p3/2 and 2p1/2 levels, respectively (FIG. 6). The lack of charge-balancing counterions in the $Cu_3HHTP_2$ and $Co_3HHTP_2$ MOFs indicates that the variation from the 2+ oxidation state of the metal is compensated by the redox-active HHTP ligands, which are known to be able to accommodate a wide range of redox states. High-resolution spectrum of the Ni 2p region revealed only a single type of Ni, further confirming that no extraneous $Ni^{2+}$ ions are present within the analyzed samples.

Figure 2:
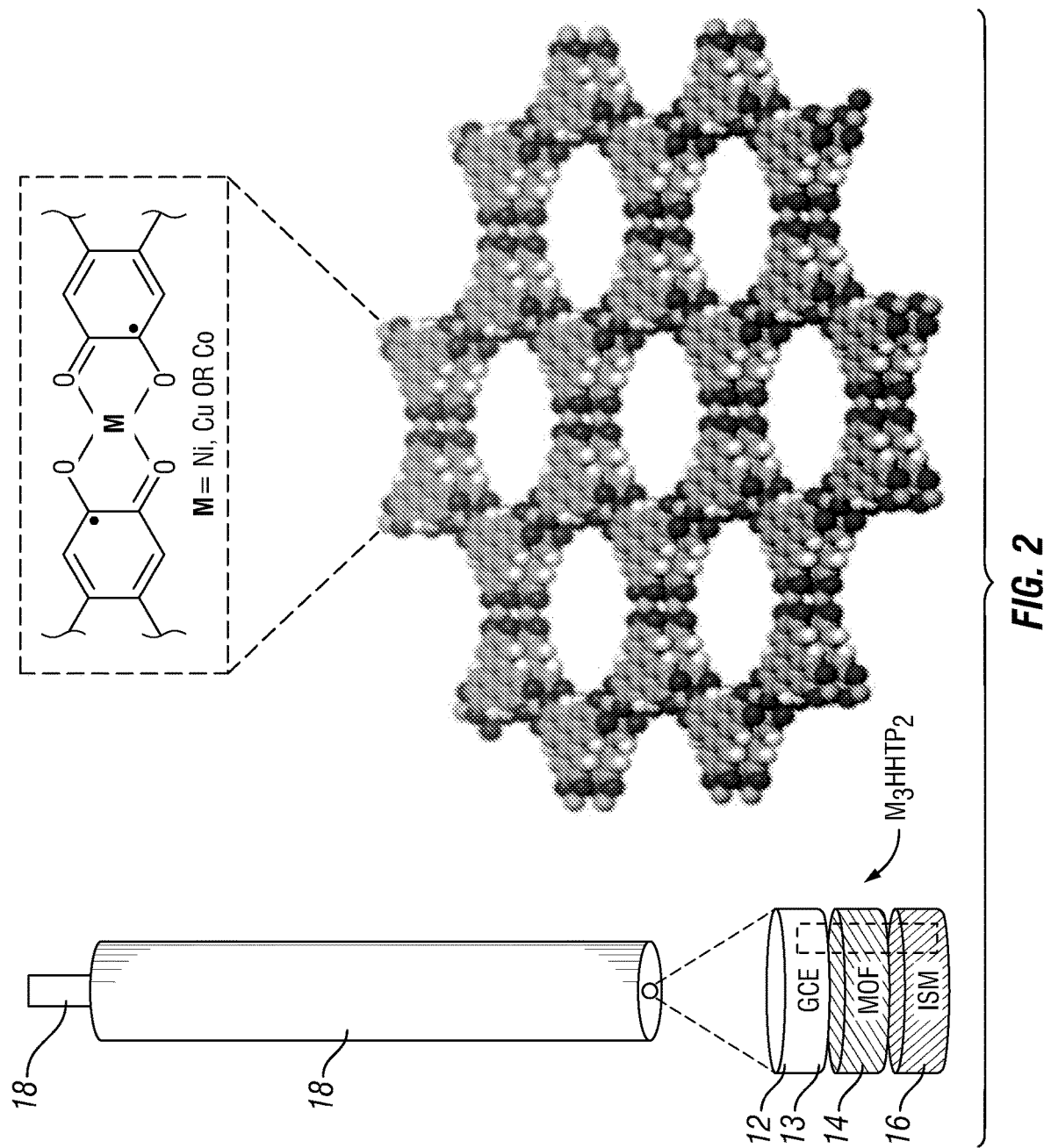
FIG. 2 provides a schematic representation of the layered device architecture employed in Example 1. A thin film of metal-organic framework (MOF) is drop casted directly on the top of a glassy carbon electrode (GCE), and then covered with an ion-selective membrane (ISM) to facilitate potentiometric ion sensing.

As such species are the only possible cations that could potentially balance a negatively charge material, these finding are thus strongly indicative of charge neutrality within $Ni_3HHTP_2$. Moreover, deconvoluted high resolution spectrum for O is revealed the presence of two different environments ~531 eV and ~532 eV, which were assigned to C—O and C=O, respectively. These two distinct types of O are expected for a charge neutral molecule in which the HHTP ligand can adapt semiquinone and quinone structures (FIG. 2).

Figure 9A:
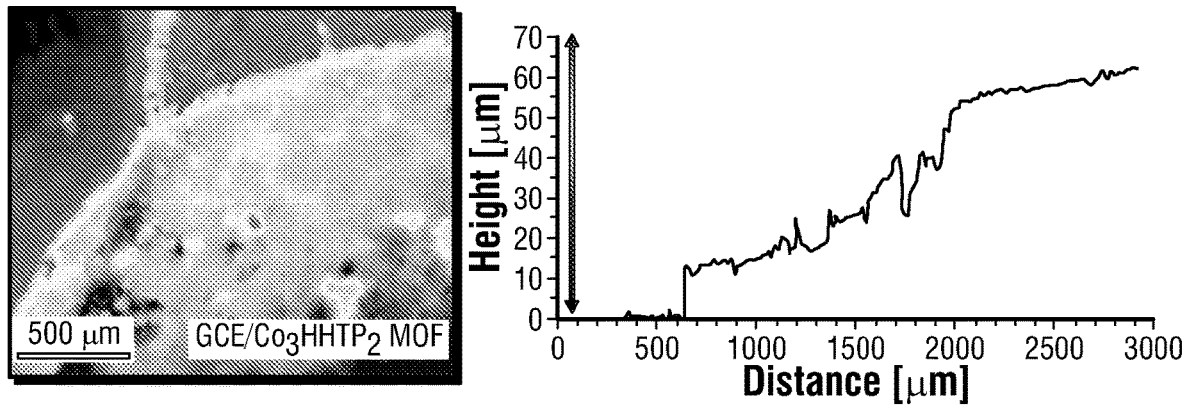
FIG. 9 shows interferometer data for the $GCE/M_3HHTP_2$ MOF (M=Co, Ni, Co) electrodes prepared by drop casting 10 μL of $Ni_3HHTP_2$-MOF suspension (1 mg/mL) onto a surface of glassy carbon electrodes. The difference in height between the blue and red regions were used to calculate thickness of the MOF layer.
Figure 9B:
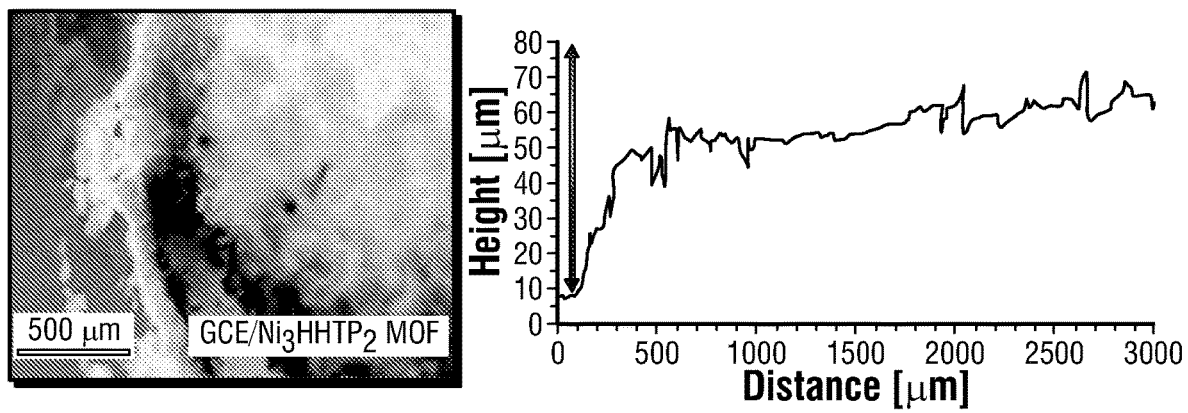
Figure 9C:
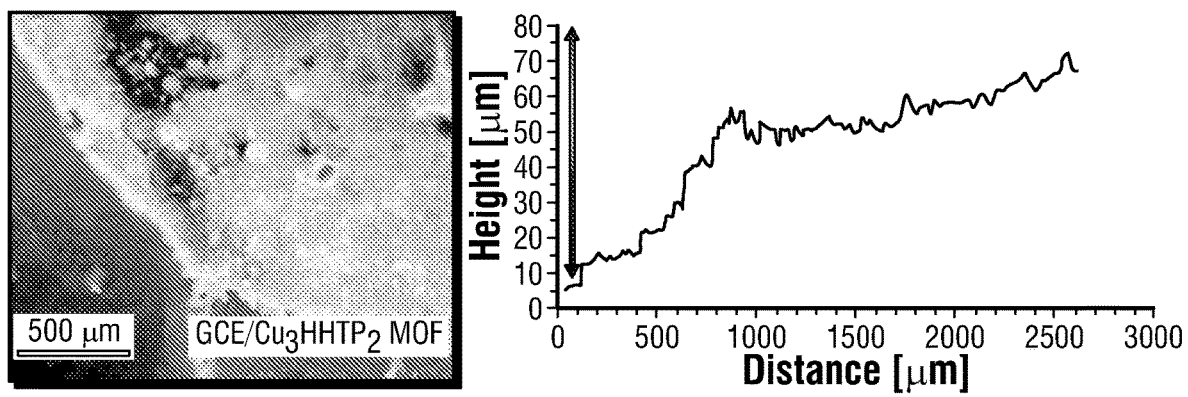

Example 1.20. Additional Data Related to the Characterization of GCE/MOF Electrodes FIGS. 9 and 10 provide data related to the interferometry of GCE/$Ni_3HHTP_2$ MOF electrodes. FIG. 11 provides cyclic voltammetry of MOFs deposited on glassy carbon electrodes. Electrochemical capacitors can store electrical energy by the i) electrochemical double layer in which charge accumulates at the interface between the electrodes and the electrolyte; or ii) through series of faradic reactions at the surface of electrode materials. Most importantly, in the electrochemical double layer capacitors, there is no electron flow between the solution and the electrode, whereas the interfacial electron transfer between the solution and the electrode, also better known as pseudocapacitance, is observed in the latter example. Therefore, the deliberate introduction of pseudocapacitive components may provide higher capacitance and thus result in more stable potentiometric response.

Cycling voltammetry of $M_3HHTP_2$ MOFs (FIG. 11) drop-cast onto GCE revealed the presence of one anodic peaks at 0.14 V and two cathodic redox waves at −0.02 V and −0.13 V in $Ni_3HHTP_2$, and two anodic peaks at −0.14 V and 0.13 V, together with two cathodic redox waves at −0.01 V and −0.34 V indicating the presence of faradic processes in the studied materials. No faradic reactions were observed for $GCE/Co_3HHHTP_2$ electrodes, thereby supporting the hypothesis that double layer charing is the primary mechanism responsible for the large capacitance of this material.

Without being bound by theory, these observed redox processes recorded for the $Ni_3HHTP_2$ and $Cu_3HHTP_2$ could originate from: i) redox activity of the metal centers or/and ligand within the MOF network; ii) co-existence of several active redox states due to the presence of defects in the MOF lattice (e.g., exposed-edges); and iii) redox active impurities that are embedded within the coordination network. PXRD and XPS data together (FIGS. 4-7), demonstrated that no metallic impurities/external species are present within the analyzed $M_3HHTP_2$ MOFs and thus they are not responsible for the observed redox activity.

Therefore, without being bound by theory, Applicants hypothesize that the observed redox transformations are due to the redox active nature of the ligand, as reported for the HHTP molecular precursors, which partially contributes to the overall recorded capacitance through the presence of pseudocapacitance. In the case of $Cu_3HHTP_2$, the presence of reversible redox waves indicate that the capacitive response of this MOF mainly proceeds through oxidation/reduction of the MOF. In light of these observations, the ion-to-electron transduction process may proceed through i) the formation of the electrical double layer in which one side carries charge in the form of ions, e.g., cations or anions from the ion-selective membrane, while the other side of the capacitor is formed by electrical charge—electrons or holes present in the solid contact; and/or ii) reversible oxidation/reduction (doping/undoping) of the MOF based transducer.

In the former situation, the interfacial potential at the ion-selective membrane and MOF interface may be solely defined by the quantity of charge stored at the electrical double layer rather than by ion partitioning or redox reactions. Therefore, Applicants anticipate that, by using highly porous materials such as $M_3HHTP_2$ MOFs, the interfacial contact between the polymeric membrane and the electrode will be increased giving rise to higher value of capacitance and thus support the hypothesis that signal transduction in $Ni_3HHTP_2$ and $Co_3HHTP_2$ mainly proceeds through the formation of electrical double layer as observed for other porous materials. This proposed transduction mechanism may be additionally supported by the XPS and PXRD evidence that revealed charge neutratility in $M_3HHTP_2$ MOFs and lack of extraneous associated counter-ions that could potentially participate in the ion-to-electron transduction process through the oxidation/reduction of the MOF based transducer. Likewise, the second transduction mechanism may be dominant in the $Cu_3HHTP_2$ MOFs in which reversible redox reaction of the MOF film would ensure stable interfacial potential.

FIG. 12 shows the electrochemical impedance spectroscopy of $GCE/Ni_3HHTP_2$ MOF at different applied potentials. FIG. 21 shows potentiometric responses obtained for the ISEs containing $M_3HHTP_2$ MOFs as the underlying conductive layer. FIG. 16 shows potentiometric slopes obtained for various cations and anions during selectivity measurements of potassium and nitrate selective electrodes.

Figure 23:
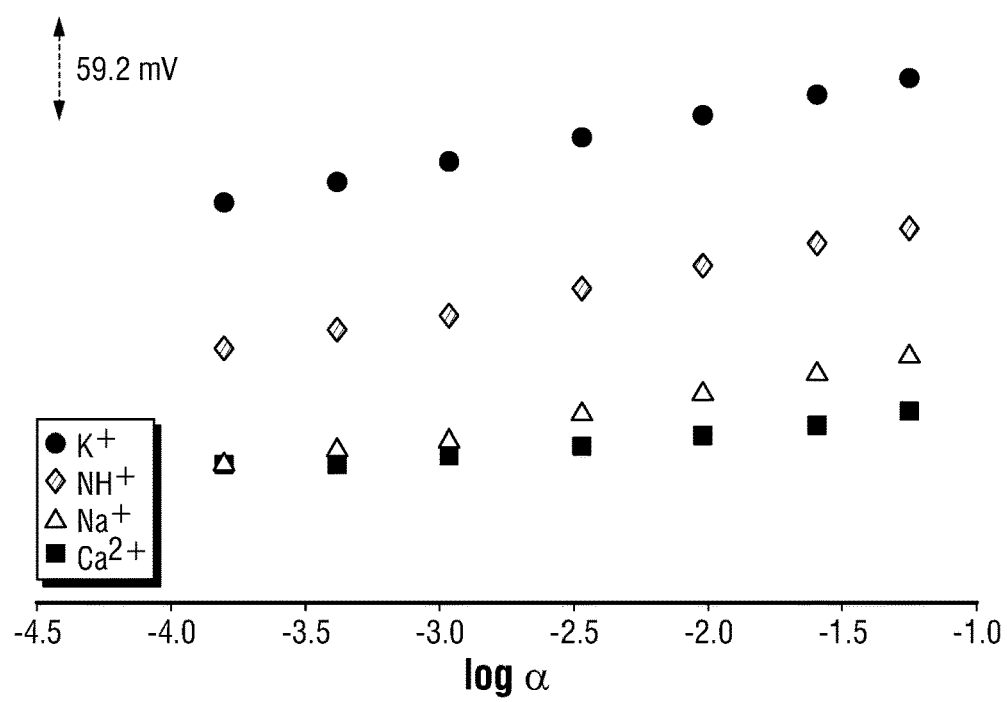
FIG. 23 shows potentiometric responses of glassy carbon electrodes coated with $Ni_3HHTP_2$ and then covered with the K+-ISM-I for various cations: K+ (blue circles), NH4+ (green diamonds), Na+ (black triangles) and Ca2+ (grey squares).

FIGS. 22-23 show selectivity coefficients and experimental slopes obtained for $K^+$ and $NO_3^-$—ISEs. FIG. 17 shows short-term stability measurement of $NO_3^-$—ISM electrodes with drop-cast layer of $Ni_3HHTP_2$ MOFs. FIG. 18 shows the long-term stability measurement of $NO_3^-$-ISM Electrodes with drop-cast layer of $Ni_3HHTP_2$ MOF.

Figure 25:
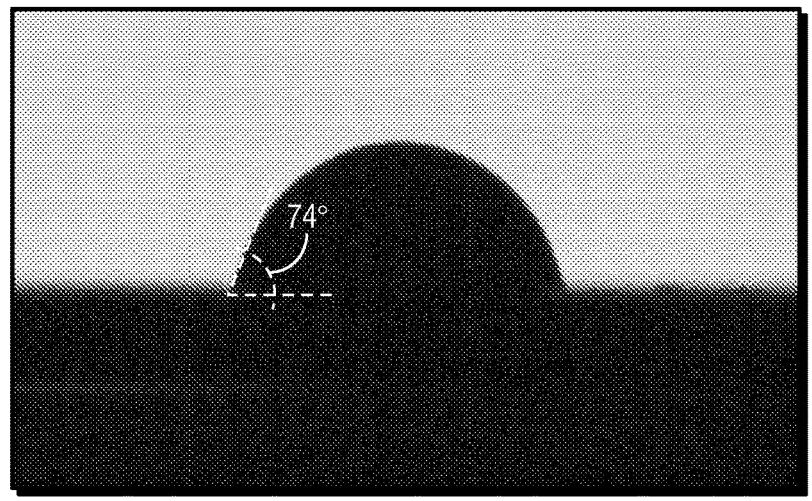
FIG. 25 shows a contact angle image of 2 µL of water placed on top of a $Ni_3HHTP_2$ coated glassy carbon electrode (GCE/$Ni_3HHTP_2$ MOF).

FIG. 19 shows light stability of $K^+$-ISM-II electrodes with drop-cast layer of $Ni_3HHTP_2$ MOF. FIG. 20 shows powder X-ray diffraction (pXRD) of $M_3HHTP_2$ MOFs after potentiometric measurements. FIG. 25 shows contact angle of water on the surface of $Ni_3HHTP_2$ coated electrodes.

Example 2. Conductive Metal-Organic Frameworks as Ion-Selective Electrodes in Potentiometric Measurements This Example demonstrates the implementation of conductive $M_3HHTP_2$ MOFs as both ion recognition centers and ion-to-electron transducers in potentiometric sensing. In particular, this Example features the integration of 2D conductive MOFs that includes of nickel and copper metal centers interjoined with 2,3,6,7,10,11-hexahydroxytriphenylene organic units organized into a Kagome lattice. These materials exhibit optimal electrical conductivity −0.2 S/cm as reported for $Cu_3HHTP_2$ MOF and can act as signal transducers in ISEs. However, their ability to simultaneously detect ions and transduce the response from ions into electrons has not been yet demonstrated.

Figure 26:
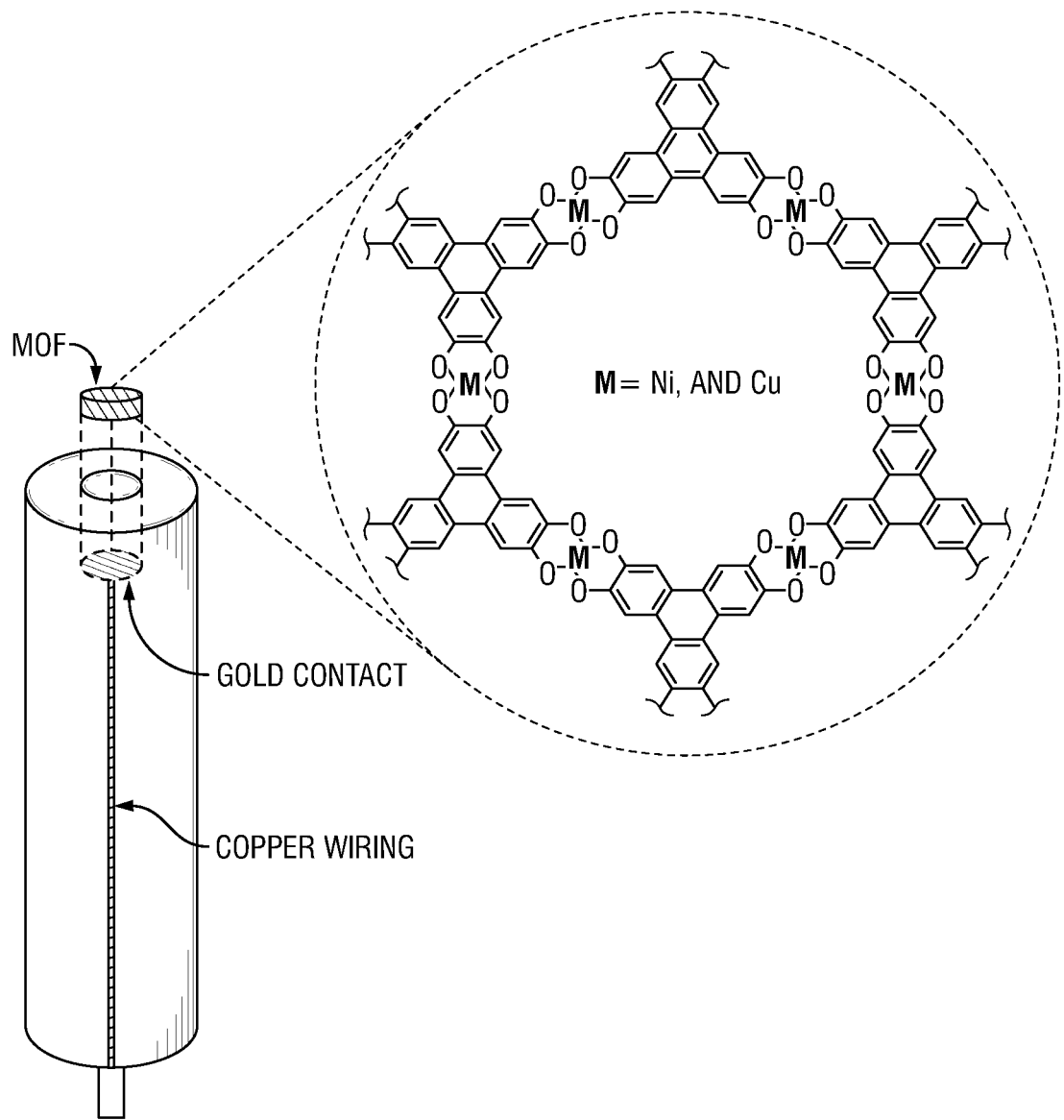
FIG. 26 shows a schematic representation of the experimental device architecture employed in Example 2. The conductive MOF powder is compressed directly on the surface of a gold electrode and then used for potentiometric ion sensing without any sample or electrode pretreatment.

Applicants focus on the use of $Cu_3HHTP_2$ MOFs and $Ni_3HHTP_2$ MOFs as model systems in the fabrication of one-component ion-selective sensors. For this purpose, Applicants integrated the MOFs into a single-piece electrodes by compressing the MOF powder directly onto the customized gold electrodes (FIG. 26). In this configuration, the resulting ISEs exhibited near-Nernstian behavior to a range of cationic and anionic analytes. Moreover, these materials show good potential stability, minimal photosensitivity and limited sensitivity to atmospheric gases.

Example 2.1. Materials

All metal salts were of analytical reagent grade and purchased from Sigma Aldrich. Solutions of metal ions were prepared in ultra-pure water obtained with Pico Pure 3 water system (resistance 18 MΩ $cm^{-1}$). Working solutions of different metal ions were prepared by serial dilutions of a 1 M stock solution. Customized gold electrodes (3 mm in diameter) with hollow opening (3 mm in depth) were fabricated at Dartmouth College.

Example 2.2. Synthesis of Conductive MOFs

The synthesis of 2D conductive metal-organic frameworks using organic linker 2,3,6,7,10,11-hexahydroxytriphenylene was adapted from a prior study (Chem. Mater. 2016, 28, 5989-5998). Briefly, to a 100 mL round bottom flask, 500 mg of HHTP and 767 mg of $Ni(OAc)_2.4H_2O$ were added. 70 mL of deionized water was then added to the round bottom flask. The resulting suspension was sonicated for 15 minutes. The reaction mixture was then heated for 24 h at 85° C. under stirring. The flask was left to cool for 1 h at room temperature and the reaction product was filtered with a ceramic funnel and a filter paper. The solid precipitate was then washed with ultra-pure water (1000 mL) and acetone (300 mL). The resulting black powder was transferred into a glass vial and dried overnight under vacuum (20 mTorr) at 85° C.

Example 2.3. Preparation of MOF-Based ISEs

For all electrochemical measurements, 10 mg of MOF powder was compressed for 1 h at 6900 $Nm^{-2}$ directly on the top of customized gold electrode. If not otherwise state the resulting electrodes were placed directly in the solution used for the potentiometric measurements without any prior conditioning.

Example 2.4. Potentiometric Measurements

Potentiometric measurements were performed using EmStat MUX16 potentiostat (Palm Instruments BV, Netherlands) at room temperature in a stirred solution against a double-junction Ag/AgCl reference electrode with a 1 M KCl bridge electrolyte (Sigma Aldrich).

Example 2.5. Ion-Exchange Properties of $Ni_3HHTP_2$ and $Cu_3HHTP_2$ MOF Pressed Electrodes The analytical applicability of the fabricated $Cu_3HHTP_2$ electrodes in direct potentiometric sensing of ionic species in solutions was assessed by measuring the EMF response in the presence of various cationic and anionic analytes. Applicants used the electrode configuration in which the conductive MOF was firstly pressed onto the top of a gold contact and then immersed in the sample solution directly without any electrode pretreatment (e.g. application of ion-selective membrane or conditioning).

Figure 27:
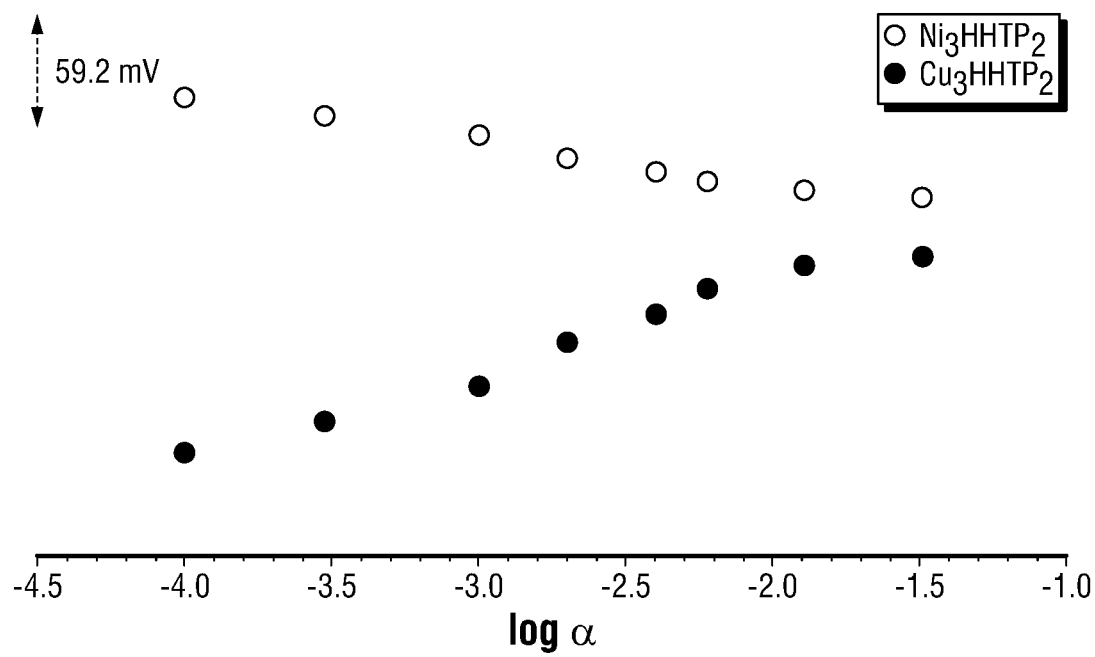
FIG. 27 shows potentiometric responses recorded for $Ni_3HHTP_2$ and $Cu_3HHTP_2$ MOFs for Na+ and Cl− ions. $Cu_3HHTP_2$ MOF in the form of pressed electrodes exhibited cationic responses to Na+, while $Ni_3HHTP_2$ responded preferentially to anionic species (Cl−).
Figure 28:
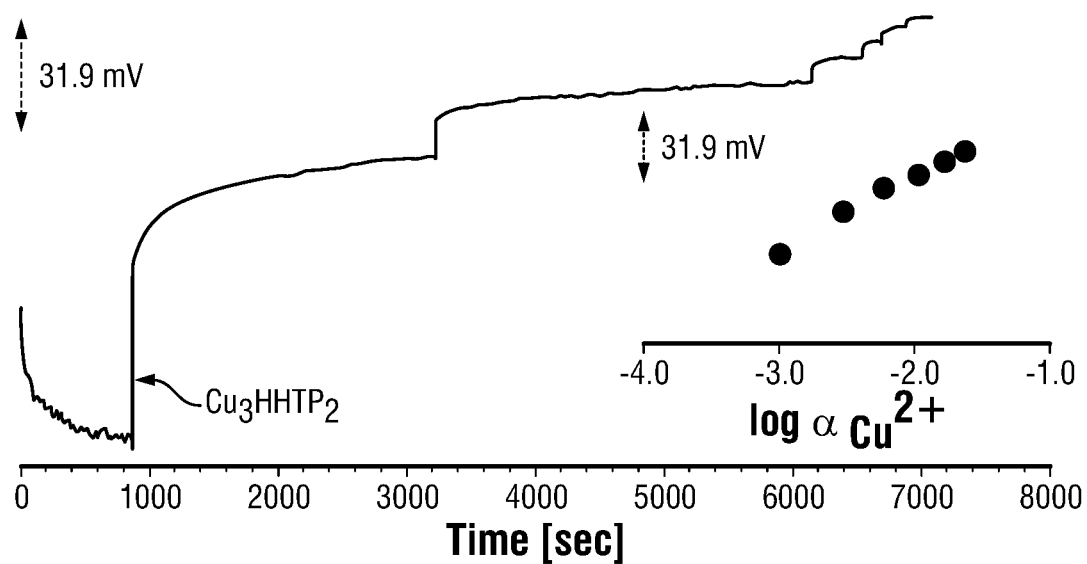
FIG. 28 shows the potentiometric response of $Cu_3HHTP_2$ pressed electrodes to copper (II) ions. The inset demonstrates a linear response range of the same electrode.

The first step of this Example was to investigate if either of the $Cu_3HHTP_2$ or $Ni_3HHTP_2$ MOFs exhibits ion-exchange properties. As it can be seen in FIG. 27, upon varying concentrations of $Na^+$ and $CF$ ions in the sample, $Cu_3HHTP_2$ based electrodes showed near-Nernstian response to $K^+$, ions while $Ni_3HHTP_2$ electrodes exhibited substantially sub-Nernstian response to Cr. As the metal-HHTP complexes are known to undergo reversible transformations between the catechol, semiquinone and quinone redox forms, the differences in the type of potentiometric signal recorded for both materials are likely to be attributed to varying oxidation states of each HHTP-based MOF. In the case of $Cu_3HHTP_2$, the observed cationic response indicates that this material is most likely to be present in its reduced form and thus have positively charged counter-ions to stabilize the overall charge on the molecule. The associated ions can then be exchanged by other cations giving rise to ion-exchange properties.

Without being bound by theory, Applicants hypothesize that a similar mechanism applies to $Ni_3HHTP_2$ MOF pressed electrodes. However, the observed anionic response may be due to the presence of exchangeable negatively charged ions associated with the $Ni_3HHTP_2$ material. The total amount of counter-ions introduced during the synthesis and consequently present in each studied MOF could not be yet quantified. Nonetheless, the observed ion-exchange properties highlight the potential of $M_3HHTP_2$ MOFs as direct potentiometric sensors.

Example 2.6. Potentiometric Response of $Cu_3HHTP_2$ Electrodes

The ionic responses of $Cu_3HHTP_2$ MOF pressed electrodes were tested against a number of cationic species ($Cu^{2+}$, $Ni^{2+}$, $Co^{2+}$, $Pb^{2+}$, $Zn^{2+}$, $Ca^{2+}$, $Mg^{2+}$, $K^+$, $Na^+$, and $NH_4^+$) using standard addition methods (Table 4).

TABLE 4

Potentiometric responses of $Ni_3HHTP_2$ pressed electrodes to various anionic species.

| Ion | Linear response range [M] | Slope [mV/decade] |
| --- | --- | --- |
| $Ca^{2+}$ | $3 \times 10^{-4}$-$2 \times 10^{-2}$ | 32.9 ± 0.7 |
| $Co^{2+}$ | $3 \times 10^{-4}$-$6 \times 10^{-3}$ | 31.3 ± 1.3 |
| $Mg^{2+}$ | $1 \times 10^{-3}$-$6 \times 10^{-3}$ | 18.0 ± 2.3 |
| $Zn^{2+}$ | $1 \times 10^{-3}$-$6 \times 10^{-3}$ | 22.1 ± 1.1 |
| $Pb^{2+}$ | $3 \times 10^{-4}$-$3 \times 10^{-2}$ | 34.1 ± 0.8 |
| $Ni^{2+}$ | $1 \times 10^{-3}$-$3 \times 10^{-2}$ | 31.2 ± 1.2 |
| $Cu^{2+}$ | $3 \times 10^{-4}$-$2 \times 10^{-2}$ | 31.9 ± 0.6 |
| $Na^+$ | $1 \times 10^{-4}$-$2 \times 10^{-2}$ | 47.3 ± 1.4 |
| $K^+$ | $1 \times 10^{-4}$-$2 \times 10^{-2}$ | 49.2 ± 0.9 |
| $NH_4^+$ | $1 \times 10^{-3}$-$2 \times 10^{-2}$ | 51.5 ± 2.3 |

On each occasion, an increase in the recorded electromotive force (EMF) was observed, confirming the cationic response mechanism of the $Cu_3HHTP_2$ electrodes. Regardless of the order of the electrolyte used for the measurements, the electrodes responded in the near-Nernstian fashion to all tested analytes. In traditional polymer based ISEs, such behavior may indicate that the ionophore acts as a non-specific ion-exchanger with selectivity pattern often following the Hofmeister selectivity order. However, in the case of $Cu_3HHTP_2$ electrodes, a large potential jump (73.4 mV) was observed upon the addition of $Cu^{2+}$ ions into the sample solution.

Without being bound by theory, Applicants hypothesize that the occurrence of this super-Nernstian response may directly reflect selectivity of the $Cu_3HHTP_2$ MOF pressed electrodes. As the electrode comes in contact with the ion to which it is more selective, the MOF-associated counter ion would be replaced by the primary ion, thus inducing an abnormally high increase in potential (bulk ion-exchange). Without being bound by theory, increased selectivity of $Cu_3HHTP_2$ MOF to copper ions may be due to: i) preferential electrostatic interactions of $Cu^{2+}$ with oxygen atoms embedded within the MOF network; ii) interactions between axially coordinated ligand (e.g. coordinated water) and targeted metal; iii) electrostatic interactions between the exposed edges of the MOF lattice (—OH groups) with copper ions; and iv) combined interactions including electrostatic, size exclusion, and metal-hydrogen bonding.

Example 2.7. Ionic Responses of $Ni_3HHTP_2$ Pressed Electrodes

Figure 29:
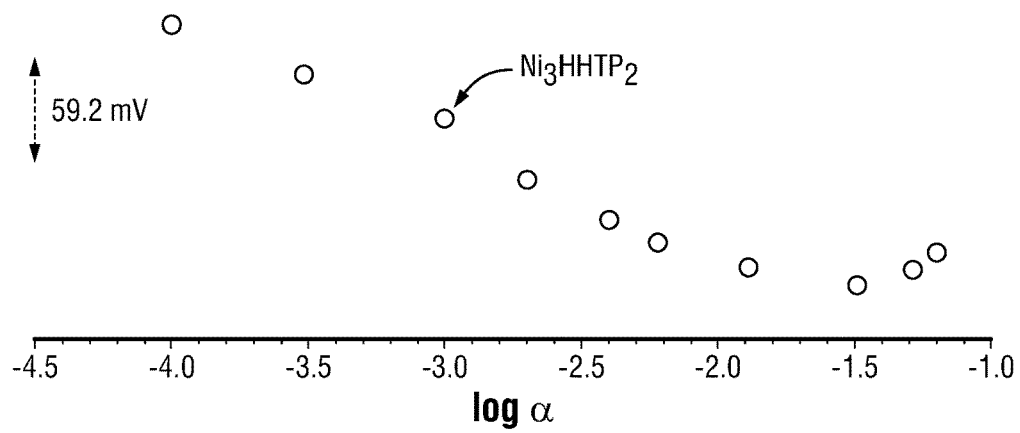
FIG. 29 shows the potentiometric response of pressed $Ni_3HHTP_2$ MOF electrodes for chloride ions. At high concentrations of Cr, the electrode stops responding to anions. Upon further addition of NaCl, the cationic type of response is observed.

To further demonstrate the applicability of MOFs in the anion detection, Applicants prepared fresh $Ni_3HHTP_2$ MOF pressed electrodes and then evaluated their response. Upon the initial exposure of $Ni_3HHTP_2$ MOF to $Na^+$ and $Cl^-$ ions, the electrodes showed sub-Nernstian response (−24.9±1.1 mV/decade) to chloride in the concentration range spanning from $1 \times 10^4$ M to M to $1 \times 10^{-2}$ M (FIG. 29). At the concentrations exceeding $1 \times 10^{-2}$ M of chloride in the solution, the electrodes stopped responding to the primary ions, indicating that upper detection limits of the $Ni_3HHTP_2$ MOF were reached. At higher concentrations of chloride, the recorded potentiometric response became inverted and the electrodes started responding primarily to cations.

The reversal of potentiometric response is not uncommon for polymer based ion-selective electrodes when the concentration of free analyte in the membrane exceeds the one dictated by the presence of ionophore. In this situation, the diffusion of primary ion into the membrane is accompanied by the co-extraction of the counter-ion from the sample resulting in Donnan exclusion failure. Furthermore, depending on the nature of the polymeric membrane (e.g. polarity, type of dissolved sensing components), various ion-pairing events may occur (ion-pair formation between ionic sites and primary ions) producing, for instance, a cationic response to anions in the solution. In the case of $Ni_3HHTP_2$ MOF, Applicants can hypothesize that at a high concentration of the electrolyte, $Cl^-$ can be axially-coordinated to Ni in the MOF network, facilitating the formation of 'ion-pairs', and thus producing a cationic response.

Applicants also tested the response of $Ni_3HHTP_2$ MOF to a range of anionic species (Table 5). Interestingly, the electrodes exhibited only limited response (sub-Nernstian) to anions with the exception of $NO_3^-$ to which $Ni_3HHTP_2$ MOF showed near-Nernstian ($-48.2 \pm 1.4$ mV/decade) behavior over a satisfactory response range. This surprisingly limited response to anions may be caused by i) high selectivity of the $Ni_3HHTP_2$ MOF to the associated counter-ions as if the targeted analyte cannot completely displace the complexed counter-ions from the phase boundary region of the electrode, and a sub-Nernstian response would be expected; ii) the electrode exhibits mixed selectivity to cations and anions, and the response characteristics for a specific ion would be dictated by the type of ions used in the measurements; iii) ionic impurities present within the MOF network may produce a partial response to cations, thus diminishing the magnitude of anionic response; and iv) metal-ion specific interactions (metal in the MOF network acts as either Bronsted or Lewis acid) that are depended on the type of ions present in the solution (axially coordinated ligands such as water or chloride).

TABLE 5

Potentiometric responses of $Ni_3HHTP_2$ pressed electrodes to various anionic species.

| Ion | Linear response range [M] | Slope [mV/decade] |
| --- | --- | --- |
| $CH_3COO^-$ | No response | N/A |
| $NO_3^-$ | $3 \times 10^{-4}$-$6 \times 10^{-3}$ | $-48.2 \pm 1.4$ |
| $ClO_4^-$ | $1 \times 10^{-3}$-$6 \times 10^{-3}$ | $33.4 \pm 3.1$ |
| $Cl^-$ | $1 \times 10^{-3}$-$6 \times 10^{-3}$ | $-24.9 \pm 1.1$ |
| $I^-$ | No response | N/A |
| $F^-$ | No response | N/A |
| $SO_4^{2-}$ | $1 \times 10^{-3}$-$6 \times 10^{-3}$ | $-7.6 \pm 2.0$ |
| $S_2O_8^{2-}$ | No response | N/A |
| $Cr_2O_7^{2-}$ | No response | N/A |

Figure 30:
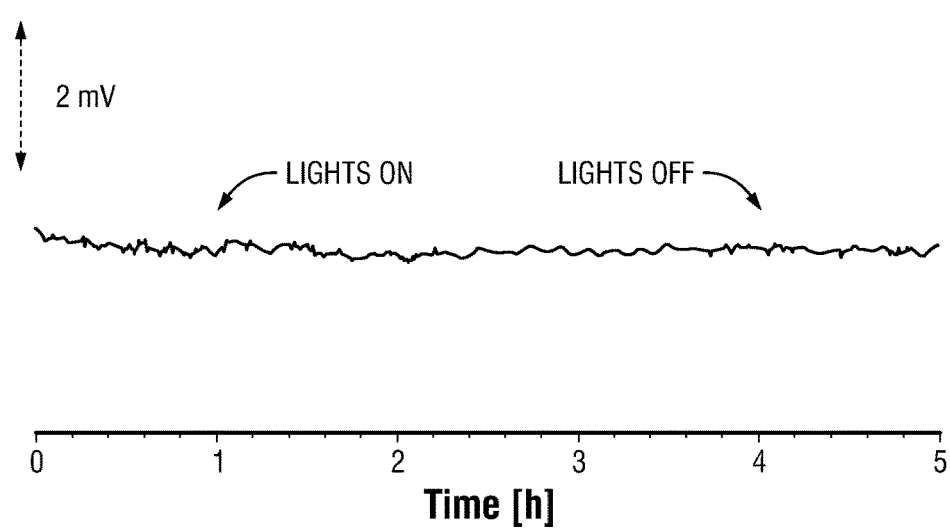
FIG. 30 shows the light stability of $Cu_3HHTP_2$ MOF electrodes immersed in 10 mM $CuSO_4$. Minimal potential drift was observed for the pressed electrodes upon switching the room lights on and off.

Example 2.8. Effect of Ambient Light on the Stability of Single-Component MOF Based Electrodes Solid contact electrodes can be photosensitive if the transducing layer (e.g. organic semiconductor) at the solid contact/polymeric membrane interface has a sufficient band gap to excite electrons from the valence band into the conduction bands. This process may result in the photooxidation of the material consequently leading to significant potential instability as reported for ISEs based on conductive polymers. To assess light sensitivity, $Cu_3HHTP_2$ and $Ni_3HHTP_2$ MOFs were pressed into the electrodes and immersed in the 10 mM $CuSO_4$ solution. During the experiments, the electrochemical cell was firstly exposed to ambient light for 1 h and then kept in the dark (3 h) until the electrodes were illuminated again with ambient light for 1 h. As shown in FIG. 30, no significant potential shifts were observed indicating that $M_3HHTP_2$ MOFs are insensitive to light.

Figure 31:
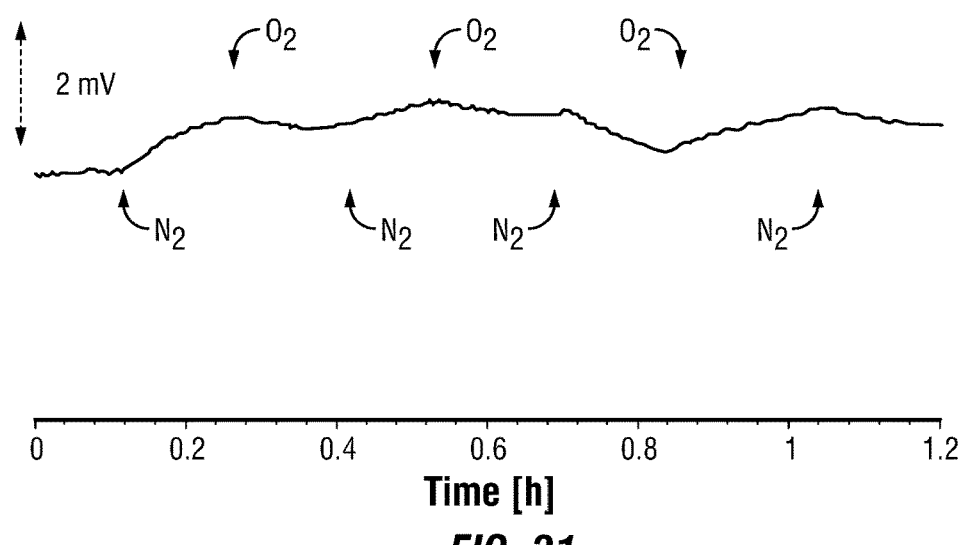
FIG. 31 shows the light stability of $Cu_3HHTP_2$ MOFs electrodes immersed in 10 mM $CuSO_4$. Minimal potential drift was observed for the pressed electrodes upon switching the room lights on and off.

Example 2.9. Influence of Oxygen on Potential Stability of $Cu_3HHTP_2$ Pressed Electrodes Applicants also studied the effect of oxygen on the potential stability of $Cu_3HHTP_2$ and $Ni_3HHTP_2$ MOFs electrodes. In conventional potentiometric solid-state ion-selective electrodes, oxygen may diffuse through the polymeric membrane to form an $O_2$ half-cell at the surface of the solid contact. As a result, substantial potential/signal instability may be encountered, precluding the application of ISEs as robust analytical devices. In this study, oxygen interference on the response of pressed electrodes to $Cu^{2+}$ ions was studied by immersing each electrode in 10 mM $CuSO_4$ solution while repeatedly bubbling oxygen and nitrogen through the sample. As demonstrated in FIG. 31, only a small change in the recorded potential is observed upon exposure of $Cu_3HHTP_2$ and $Ni_3HHTP_2$ MOFs to $N_2$ and $O_2$. This remarkable potential stability exceeds (100 times higher than for polypyrrole based ISEs) or is on par with those reported for nanoporous carbons.

Example 2.10. Chemicals and Solvents

All chemicals and solvents were purchased from Sigma Aldrich, TCI, Fisher, or Alfa Aesar and used as received. Scanning Electron Microscopy (SEM) and Energy Dispersive X-ray Spectroscopy (EDX) was performed using a Hitachi TM3000 SEM (Tokyo, Japan) equipped for X-ray microanalysis with a Bruker Edax light element Si(Li) detector (Billerica, Mass.). EmStat MUX16 potentiostat (Palm Instruments BV, Netherlands) was used for electrochemistry. The z-dimension (height) for all electrodes were collected using a Zygo NewView 7300 Light Interferometer equipped with a 10× lens.

Example 2.11. Synthesis of $Cu_3HHTP_2$ MOFs

To a 50 mL round bottom flask, 100 mg of HHTP and 154 mg of $CuSO_4 \cdot 5H_2O$ were added. 20 mL of deionized water was then added to the round bottom flask. The resulting suspension was sonicated for 15 minutes. The reaction mixture was then heated for 24 h at 70° C. under stirring. The flask was left to cool for 1 h at room temperature and the reaction product was filtered with a ceramic funnel and a filter paper. The solid precipitate was then washed with ultra-pure wate water (1000 mL) and acetone (300 mL). The resulting black powder was transferred into a glass vial and dried overnight under vacuum (20 mTorr) at 85° C.

Example 2.12. Synthesis of $Co_3HHTP_2$ MOFs

To a 50 mL round bottom flask 50 mg of HHTP and 74 mg of $CoCl_2 \cdot 6H_2O$ were added. 20 mL of deionized water was then added to the round bottom flask. The resulting suspension was sonicated for 15 minutes. The reaction mixture was then heated for 24 h at 70° C. under stirring. The flask was left to cool for 1 h at room temperature and the reaction product was filtered with a ceramic funnel and a filter paper. The solid precipitate was then washed with ultra-pure wate water (1000 mL) and acetone (300 mL). The resulting black powder was transferred into a glass vial and dried overnight under vacuum (20 mTorr) at 85° C.

Example 2.13. Choice of Materials

Figure 32:
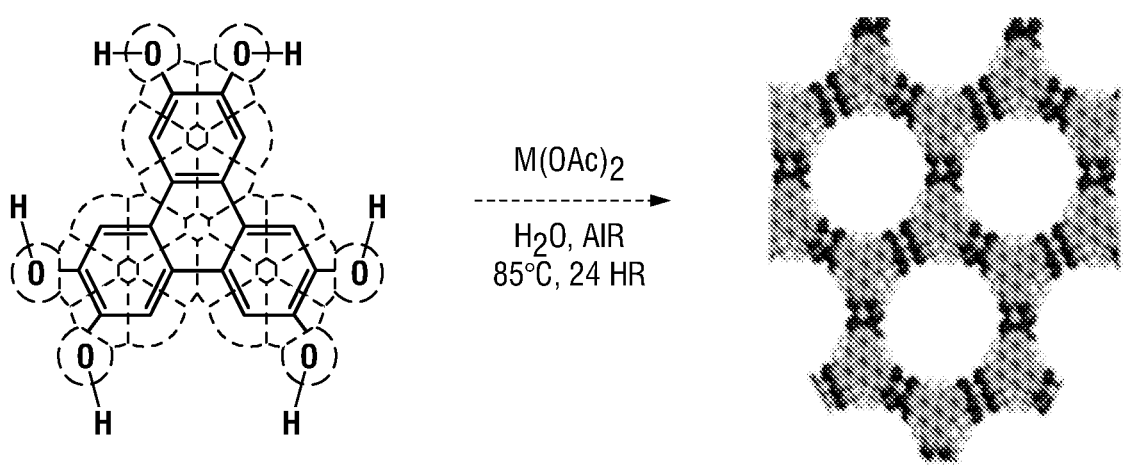
FIG. 32 shows the bottom-up synthesis of $M_3HHTP_2$ MOFs from HHTP and metal salts.

Applicants chose a class of modular MOFs that includes of metal centers (M=Cu, Ni) interconnected with —OH triphenylene ligands to fabricate single-piece ion-selective electrodes. This class of 2D dimensional materials deems appropriate for the applied investigation of ion-binding properties for at least six reasons: i) $M_3HHTP_2$ can be synthesized through bottom-up self-assembly from modular commercially available molecular building blocks (FIG. 32). This approach permits the investigation of the role of the metal center (e.g., Ni, Cu) and the role of the chalcogen atom in the ion-binding event; ii) The pore size of 2 nm in diameter in the synthesized MOFs is suitable for the rapid diffusion of small ionic species; iii) $M_3HHTP_2$ MOFs can transduce ionic signal into electronic output; iv) The MOFs implemented herein have large bulk capacitance, thus ensure sufficient signal stability in potentiometric measurements; v) Inherent conductivity of these materials enables their implementation as electrical components; and vi) These materials can be effectively compressed without the substantial loss of structural integrity, therefore allowing their implementation into devices.

Example 2.14. Electrochemical Measurements

Applicants chose to use potentiometry for characterizing the ability of MOFs pressed electrodes to interact with ions in the aqueous solution. This technique enables the fundamental investigation of ion-MOF specific interactions and permits the assessment of signal stability under different environmental conditions (e.g., photosensitivity, sensitivity to gaseous compounds). Applicants reasoned that compressing $M_3HHTP_2$ MOFs onto a gold customized electrodes will result in a robust electrical contact capable of withstanding long-term sample analysis in aqueous solutions.

Applicants adopted a common two electrode set-up with customized gold electrodes, and double junction Ag/AgCl reference electrode for all potentiometric measurements. As the measured potential is a direct function of the activity of ions in the investigated sample (Nernstian system), it allows both qualitative and quantitative analysis of species in the solution.

Example 2.15. Device Design

For the potentiometric determination of ionic species in aqueous solutions, Applicants integrated $M_3HHTP_2$ MOFs by compressing 10 mg of each material directly on the top of custom-made gold electrodes. Each electrode included of PVC body and a gold contact (3 mm in diameter) soldered to the copper wire. The gold contact was machined into the body of the electrode leaving a 3×3 mm cavity for powder loading. Applicants used a hydraulic press to compress the MOF, within the produced cavity, directly onto the gold contact (1 h at 6900 $Nm^{-2}$). In each device, Applicants utilized PVC body to establish a protective barrier between the electrical components and surrounding solution.

Applicants also used copper wiring and gold conductive substrate to establish an electrical contact between the MOF and the power supply. The use of these materials is highly advantageous for the proposed device architecture due to: i) optimal electrical conductivity; ii) widespread commercial availability, iii) compatibility with many electrical components; iv) low cost; and v) high resistivity to corrosion and dissolution of gold and PVC in aqueous solutions.

In this configuration (FIG. 26), the MOF is integrated onto the top of underlying gold substrate and it is directly in contact with the aqueous solution. Applicants reasoned that any changes in the activity of ions in the solution will be simultaneously recognized and transduced into electronic signal by the metal-organic frameworks and then directly recorded by the potentiostat.

Figure 33A:
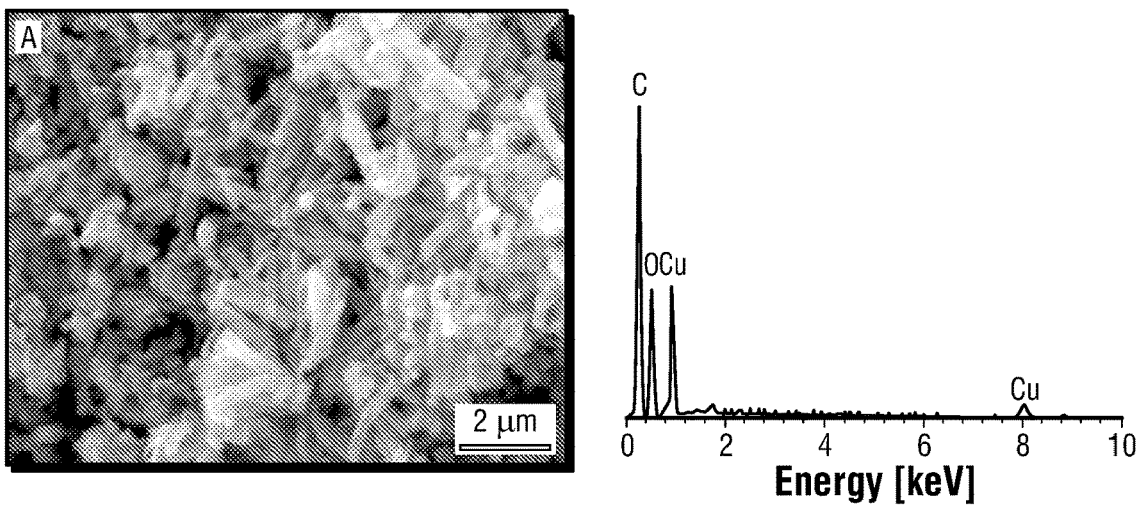
FIG. 33 shows SEM results and accompanied EDX analyses collected for $Cu_3(HHTP)_2$ MOF (FIG. 33A), $Ni_3(HHTP)_2$ MOF (FIG. 33B), and $Co_3(HHTP)_2$ MOF (FIG. 33C).
Figure 33B:
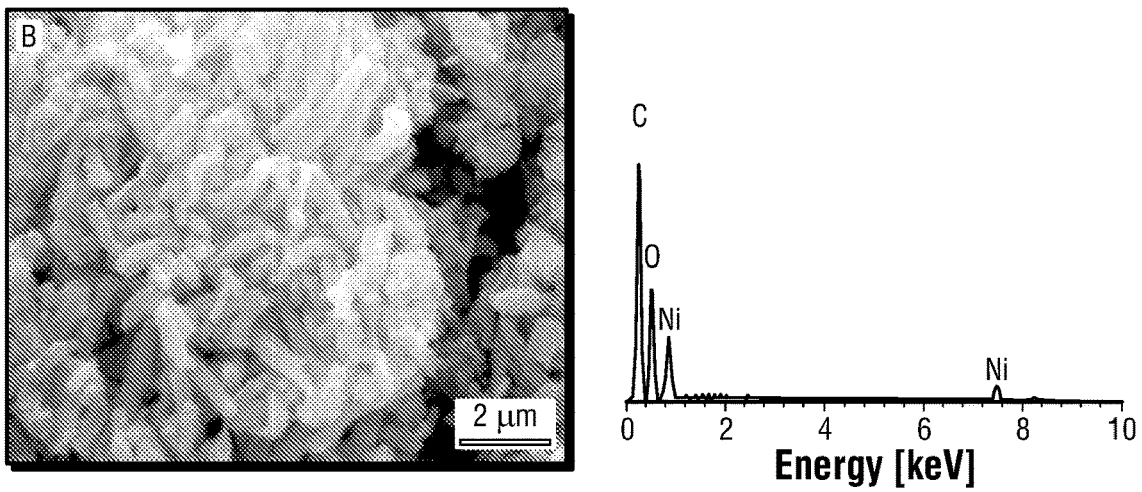
Figure 33C:
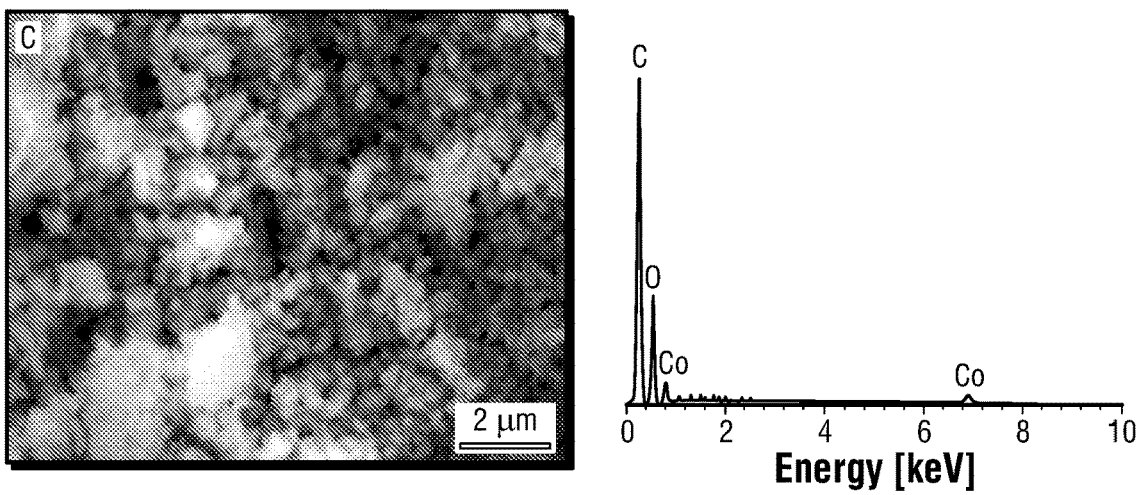

Scanning electron microsopy and energy dispersive X-ray spectroscopy of $Me_3HHTP_2$ MOFs are shown in FIG. 33. Upper detection limits of $Ni_3HHTP_2$ MOF pressed electrodes are illustrated in FIG. 29.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of detecting an ion in a sample, said method comprising:
    associating the sample with an ion-selective electrode comprising a metal-organic framework and an electrode surface,
        wherein the metal-organic framework comprises one or more metals and one or more ligands coordinated with the one or more metals,
        wherein the metal-organic framework is associated with the electrode surface in a manner that forms an interface between the metal-organic framework and the electrode surface,
        and wherein the metal-organic framework mediates ion-to-electron transduction through the interface;
    detecting the presence or absence of the ion in the sample,
        wherein the detecting comprises detecting a change in potential of the ion-selective electrode, and correlating the change in the potential to the presence or absence of the ion.

2. The method of claim 1, wherein the metal-organic framework serves as an ion membrane for capturing ions; wherein the metal-organic framework simultaneously serves as an ion recognition sensor, an ion-to-electron transducer, and an electrode; and wherein the metal organic framework simultaneously mediates ion sensing and ion-to-electron transduction through the interface.

3. The method of claim 1,
    wherein the metal-organic framework is in the form of a layer, a powder, a compressed powder, a pellet, a pencil-lead, a free-standing film, a substrate-supported film, a two-dimensional conductive network, a crystalline, or combinations thereof;

wherein the one or more metals are selected from the group consisting of divalent metals, transition metals, iron, nickel, copper, cobalt, zinc, manganese, platinum, palladium, gold, bismuth, chromium, magnesium, tin, and combinations thereof; and wherein the one or more ligands are selected from the group consisting of organic ligands, hexatopic ligands, polydentate functional groups, aromatic ligands, phthalocyanine-based ligands, metallophthalocyaline-based ligands, naphthalocyanine-based ligands, tridentate ligands, triphenylene-based ligands, triphenylene derivatives, hexahydroxytriphenylene-based organic linkers, hexaiminotriphenlyene-based organic linkers, thiol-based ligands, 2,3,5,6,10,11-hexahydroxytriphenylene (HHTP), 2,3,5,6,10,11-hexaiminotriphenylene (HITP), 2,3,5,6,10,11-hexathiotriphenylene (HTTP), and combinations thereof.

4. The method of claim 1, wherein the metal-organic framework is selected from the group consisting of $Co_3HTTP_2$, $Ni_3HTTP_2$, $Cu_3HTTP_2$, $Co_3HHTP_2$, $Ni_3HHTP_2$, $Cu_3HHTP_2$, and combinations thereof.

5. The method of claim 1, wherein the ion is selected from the group consisting of anions, cations and combinations thereof;

wherein the sample is in a gaseous form, a liquid form, a solid form, or combinations of such forms; and wherein the associating results in the reversible association of any ion in the sample with the metal-organic framework, or the selective association of a specific ion in the sample with the metal-organic framework.

6. The method of claim 1, wherein the ion is selected from the group consisting of $Ca^{2+}$, $Co^{2+}$, $Mg^{2+}$, $Zn^{2+}$, $Pb^{2+}$, $Ni^{2+}$, $Cu^{2+}$, $Na^+$, $K^+$, $NH_4^+$, $CH_3COO^-$, $NO_3^-$, $ClO_4^-$, $Cl^-$, $I^-$, $F^-$, $Br^-$, $SO_4^{2-}$, $S_2O_8^{2-}$, $Cr_2O_7^{2-}$, and combinations thereof.

7. The method of claim 1, wherein the metal-organic framework serves as the electrode surface.

8. The method of claim 1, wherein the electrode surface is in the form of a conductive substrate.

9. The method of claim 1, wherein the interface is hydrophobic.

10. The method of claim 1, wherein the change in the potential of the ion-selective electrode is detected by detecting a change in voltage of the ion-selective electrode over time.

11. The method of claim 1, wherein the change in the potential of the ion-selective electrode is correlated to the presence or absence of the ion by:

comparing the change in the potential to the change in potential of the ion-selective electrode in response to known ions, comparing the change in the potential to potentiometric slopes of known ions, or combinations thereof.

12. The method of claim 1, wherein the detecting comprises detecting the concentration of the ion.

13. The method of claim 1, further comprising an ion-selective membrane for capturing the ion, wherein the ion-selective membrane is associated with a surface of the metal-organic framework, and wherein the surface is opposite of a surface associated with the electrode surface.

14. An ion-selective electrode comprising:

a metal-organic framework and an electrode surface, wherein the metal-organic framework comprises one or more metals and one or more ligands coordinated with the one or more metals, wherein the metal-organic framework is associated with the electrode surface in a manner that forms an interface between the metal-organic framework and the electrode surface, and wherein the metal-organic framework is capable of mediating ion-to-electron transduction through the interface.

15. The ion-selective electrode of claim 14, wherein the metal-organic framework serves as the electrode surface.

16. The ion-selective electrode of claim 14, wherein the electrode surface is in the form of a conductive substrate, and wherein the interface is hydrophobic.

17. The ion-selective electrode of claim 14, wherein the metal-organic framework serves as an ion membrane for capturing ions, wherein the metal-organic framework simultaneously serves as an ion recognition sensor, an ion-to-electron transducer, and an electrode, and wherein the metal organic framework simultaneously mediates ion sensing and ion-to-electron transduction through the interface.

18. The ion-selective electrode of claim 14, wherein the ion-selective electrode is selected from the group consisting of carbon electrodes, glassy carbon electrodes, gold electrodes, solid contact electrodes, and combinations thereof;

wherein the metal-organic framework is in the form of a layer, a powder, a compressed powder, a pellet, a pencil-lead, a free-standing film, a substrate-supported film, a two-dimensional conductive network, a crystalline, or combinations thereof;

wherein the one or more metals are selected from the group consisting of divalent metals, transition metals, iron, nickel, copper, cobalt, zinc, manganese, platinum, palladium, gold, bismuth, chromium, magnesium, tin, and combinations thereof; and wherein the one or more ligands are selected from the group consisting of organic ligands, hexatopic ligands, polydentate functional groups, aromatic ligands, phthalocyanine-based ligands, metallophthalocyaline-based ligands, naphthalocyanine-based ligands, tridentate ligands, triphenylene-based ligands, triphenylene derivatives, hexahydroxytriphenylene-based organic linkers, hexaiminotriphenlyene-based organic linkers, thiol-based ligands, 2,3,5,6,10,11-hexahydroxytriphenylene (HHTP), 2,3,5,6,10,11-hexaiminotriphenylene (HITP), 2,3,5,6,10,11-hexathiotriphenylene (HTTP), and combinations thereof.

19. The ion-selective electrode of claim 14, wherein the metal-organic framework is selected from the group consisting of $Co_3HTTP_2$, $Ni_3HTTP_2$, $Cu_3HTTP_2$, $Co_3HHTP_2$, $Ni_3HHTP_2$, $Cu_3HHTP_2$, and combinations thereof.

20. The ion-selective electrode of claim 14, wherein the ion-selective electrode further comprises:

a wiring and a potentiostat, wherein the wiring electrically connects the electrode surface to the potentiostat;

an output display, wherein the output display is electrically connected to the potentiostat; and an ion-selective membrane for capturing an ion, wherein the ion-selective membrane is associated with a surface of the metal-organic framework, wherein the surface is the surface opposite of the surface associated with the electrode surface.

* * * * *